US005926156A

United States Patent [19]

Katoh et al.

[11] Patent Number: 5,926,156

[45] Date of Patent: Jul. 20, 1999

[54] MATRIX TYPE IMAGE DISPLAY USING BACKUP CIRCUITRY

[75] Inventors: Kenichi Katoh, Tenri; Yasushi Kubota, Sakurai; Hiroshi Yoneda, Ikoma; Osamu Sasaki; Ichiro Shiraki, both of Tenri, all of Japan

[73] Assignee: Sharp Kabushiki Kaisha, Osaka, Japan

[21] Appl. No.: 08/556,140

[22] Filed: Nov. 9, 1995

[30] Foreign Application Priority Data

| | | | |
|---|---|---|---|
| Dec. 28, 1994 | [JP] | Japan | 6-328799 |
| May 17, 1995 | [JP] | Japan | 7-118604 |
| Jun. 26, 1995 | [JP] | Japan | 7-159697 |

[51] Int. Cl.[6] .......... G09G 3/36; G02F 1/136

[52] U.S. Cl. .......... 345/55; 345/100

[58] Field of Search .......... 345/55, 93, 100, 345/92, 152, 33, 90, 99, 94; 349/42, 50, 38, 139, 192, 193; 327/526; 359/59

[56] References Cited

U.S. PATENT DOCUMENTS

| | | | |
|---|---|---|---|
| 4,890,097 | 12/1989 | Yamashita et al. | 345/93 |
| 5,111,060 | 5/1992 | Asada | 327/526 |
| 5,260,818 | 11/1993 | Wu | 359/59 |
| 5,274,446 | 12/1993 | Ashida | 358/139 |
| 5,335,102 | 8/1994 | Kanemori et al. | 345/93 |
| 5,392,143 | 2/1995 | Akiyama et al. | 345/93 |
| 5,619,223 | 4/1997 | Lee et al. | 345/93 |

FOREIGN PATENT DOCUMENTS

| | | |
|---|---|---|
| 2-13316 | 4/1990 | Japan . |
| 5-66418 | 3/1993 | Japan . |
| 6-14253 | 2/1994 | Japan . |
| 6-67200 | 3/1994 | Japan . |
| 6-83286 | 3/1994 | Japan . |

*Primary Examiner*—Steven J. Saras
*Assistant Examiner*—John Suraci
*Attorney, Agent, or Firm*—Nixon & Vanderhye P.C.

[57] ABSTRACT

A driving circuit in a matrix type image display apparatus including a plurality of groups each including four standard unit circuits and one backup unit circuit. Each standard unit circuit includes disconnecting means for isolating the standard unit circuit from the driving circuit, and the backup unit circuit includes connecting means for connecting the backup unit circuit to an input signal line and an output signal line of any of the standard unit circuits within a group. The number of the backup unit circuits can be changed in accordance with a conforming ratio of each unit circuit, which makes it possible to eliminate idle backup unit circuits while maintaining a high overall conforming ratio of the driving circuit, thereby enhancing manufacturing efficiencies and reducing manufacturing costs.

48 Claims, 54 Drawing Sheets

A
B
C
11
12
13
14
14a
15
16
17
18
19
20

MATRIX TYPE IMAGE DISPLAY USING BACKUP CIRCUITRY

FIELD OF THE INVENTION

The present invention relates to a matrix type image display apparatus capable of troubleshooting a fault occurred in the apparatus's driving circuit by introducing a redundant technique.

BACKGROUND OF THE INVENTION

An image display apparatus driven by the active-matrix driving method is known, and example of which is shown in FIG. 30. This type of image display apparatus comprises a pixel array ARY, a data signal line driving circuit SD and a scanning signal line driving circuit GD for driving pixel array ARY, and a timing signal generating circuit TIM for generating a timing signal inputted into data signal line driving circuit SD and scanning signal line driving circuit GD. A video signal DATA and a synchronizing signal SYN are inputted into data signal line driving circuit SD and timing signal generating circuit TIM, respectively.

FIG. 31(*a*) shows pixel array ARY, data signal line driving circuit SD, and scanning signal line driving circuit GD of FIG. 30 in a more specific manner. The image display apparatus includes a plurality of scanning signal lines $GL_j$s and a plurality of data signal lines $SL_i$s which cross with each other at right angles, and a matrix of pixels PIXs which is provided in such a manner that each pixel is encircled by two adjacent scanning signal lines and two adjacent data signal lines. In other words, a data signal line is provided for each column and a scanning signal line is provided for each row in the matrix.

In case of a liquid crystal display device, each pixel PIX comprises a pixel transistor SW serving as a switching element, and a pixel capacity composed of a liquid crystal capacity CL and an optional auxiliary capacity CS as shown in FIG. 31(*b*). In case of an active-matrix type liquid crystal display device, liquid crystal capacity CL and auxiliary capacity CS are generally placed in parallel to obtain a stable display. Auxiliary capacity CS is provided to minimize adverse effects resulted from a leak current of liquid crystal capacity CL or pixel transistor SW, changes in a pixel's displacement caused by a parasitic capacity such as a gate-source capacity of pixel transistor SW, or liquid crystal capacity CLs dependency on display data.

In FIG. 31(*b*), data signal line $SL_i$ is connected to one of the electrodes of the pixel capacity through the drain and source of pixel transistor SW serving as the switching element. Gate of pixel transistor SW is connected to scanning signal line $GL_j$. The other electrode of liquid crystal capacity CL is connected to an opposing electrode with a liquid crystal cell in between, while the other electrode of auxiliary capacity CS is connected to either a common electrode line shared by all the pixels, or an adjacent scanning signal line.

As shown in FIG. 31(*a*), data signal line driving circuit SD samples an input video signal DATA in sync with a start pulse signal SPS. Then, data signal line driving circuit SD amplifies input video signal DATA in an adequate manner, and writes the same into each data signal line $SL_i$. Scanning signal line driving circuit GD sequentially selects scanning signal lines $GL_j$s in sync with start pulse signal SPS and controls an opening/closing action of the switching element in each pixel PIX, thereby writing video signal DATA written into each data signal line $SL_i$ into each pixel PIX to be held therein. Scanning signal line driving circuit GD and data signal line driving circuit SD are driven by power sources VGH/VGL and VSH/VSL, respectively.

In other words, data signal line driving circuit SD outputs a video signal DATA to data signal line $SL_i$ for each pixel or each horizontal scanning period (1H line). When scanning signal line $GL_j$ is activated, pixel transistor SW is turned on, thereby allowing video signal DATA sent via data signal line $SL_i$ to be written into the pixel capacity. When scanning signal line $GL_j$ is de-activated, pixel transistor SW is turned off, thereby allowing the pixel to maintain the display.

Data signal line driving circuit SD is driven by either the dot sequential driving system or line sequential driving system. In the dot sequential driving system shown in FIG. 32, video signals DATAs are readily written into data signal line $SL_i$s through sampling switches SWTs controlled by the outputs from scanning circuits (i.e., shift register SRs). Thus, the dot sequential driving system downsizes the driving circuit but shortens a writing time in turn, and therefore is not suitable for a large-sized screen. Sample switching SWT generally comprises a single transistor or two parallel transistors of different conduction types. However, it is preferable to use a sample switching SWT of the CMOS structure to enhance sampling capability and reduce video signal's level fluctuation.

On the other hand, in the line sequential driving system shown in FIG. 33, video signals DATAs are sampled during the horizontal scanning period, and a line of sampled video signals DATAs are transferred to each amplifier circuit AMP during a horizontal retrace line period and written into data signal line $SL_i$ during the following horizontal scanning period. Thus, the line sequential driving system increases the size of the driving circuit but secures a sufficiently long writing time, and therefore is suitable for a large-sized screen. FIGS. 34(*a*) and 34(*b*) show typical structures of amplifier circuit AMP: the operation amplifier type and the source follower type, respectively.

A typical structure of scanning signal line driving circuit GD is shown in FIG. 35. Here, an AND signal of an output signal from the scanning circuit (i.e., shift register SR) and a gate pulse GPS regulating the width of a scanning signal is amplified by a buffer circuit BUF and outputted to scanning signal line $GL_i$.

Data signal line driving circuit SD shown in FIGS. 32 and 33 and scanning signal line driving circuit GD shown in FIG. 35 use shift registers SRs as the scanning circuits, whose structure is shown in FIG. 36. Each shift register SR in one stage comprises one inverter and two clocked inverter, so that start pulse signal SPS is steadily transferred to the next stage in sync with the rise and fall of a clock signal CLK.

Besides shift register SR, a decoder type circuit can serve as the scanning circuit, and an example of which is shown in FIG. 37. This type of circuit serves as the scanning circuit by outputting an AND signal of a plurality of address signals A1, A2, . . . or their inverse signals /A1, /A2, . . . , in other words, the decoder type circuit serves as the scanning circuit by inputting a different address signal to each stage.

Here, /A1 represents an inverse signal of address signal A1, which is indicated in the drawing as:

$$\overline{A1}(/A1=\overline{A1}).$$

The inverse signals are indicated in the same manner below.

In most of the conventional active-matrix type liquid crystal display devices, the switching element of a pixel section comprises an amorphous silicon thin film transistor formed on a glass substrate, and the switching elements of scanning signal line driving circuit GD and data signal line driving circuit SD comprise a plurality of outboard driver ICs.

In contrast, to meet the recent demands for a more downsized, reliable, inexpensive image display apparatus, there has been developed a technique for monolithically assembling scanning signal line driving circuit GD, data signal line driving circuit SD, and pixel array ARY on a single substrate. In this technique, a field effect transistor using a silicon thin film of single crystal or non-single crystal (e.g., polycrystal or amorphous) is used as an active element. A polycrystalline silicon thin film transistor is used in most of the practical applications, because it can cover a large area and produce a sufficient high-power for driving scanning signal line driving circuit GD and data signal line driving circuit SD. To further upsize the display screen and save the mounting costs, a trial device is formed atop of a polycrystalline silicon thin film placed on a glass substrate at a processing temperature below a point of glass distortion (approximately 600° C.).

However, unlike a transistor formed on a single-crystalline silicon substrate used in an LSI or the like, the manufacturing process of the non-single-crystalline silicon thin film transistor such as the polycrystalline silicon thin film transistor has not been fully established. Thus, the non-single-crystalline silicon thin film transistor has a problem that it easily causes faults such as a short and line disconnection. Also, although it depends on a screen size, the size of a substrate is increased considerably when the driving circuit and pixel array are formed monolithically on the substrate, and so are the probabilities of faults.

Incidentally, faults referred herein include a defective dot, a defective line, and a defective plane. When there occurs a defective plane, such a failing image display apparatus is discarded as a defective item in most cases. Because the defective plane involves a number of faults and troubleshooting each fault, if possible at all, demands a great deal of money and manpower.

In contrast, a defective dot can be neglected in some cases. Because the defective dot is caused by a failing pixel and a small number of defective dots will not show. Nevertheless, the defective dot can be prevented by a method of troubleshooting a fault in the pixel switch. In an example method disclosed in Japanese Laid-Open Patent Application No. 5-66418(1993), transistors are provided in pairs in each pixel, so that a failing transistor can be disconnected from the driving circuit.

Unlike the defective dot, the defective line is easy to see, and therefore even a small number of defective lines should be corrected. Primary causes of the defective line are the faults in the data signal lines and scanning signal lines such as line disconnection and a short, and the faults in the data signal line driving circuit and scanning signal line driving circuit. Each of the data signal lines and scanning signal lines is a simple wire, whereas the data signal line driving circuit and scanning signal line driving circuit include a great number of elements, wires, and contacting areas. Thus, the driving circuits have higher probability of faults than the lines driven by these driving circuits. Further, as previously mentioned, there has been no establishment in the process of manufacturing the polycrystalline silicon thin film transistor for the data signal line driving circuit and scanning signal line driving circuit. Accordingly, such an incomplete manufacturing process has higher probabilities of faults compared with the manufacturing process of the driver IC formed on the single-crystalline silicon substrate.

Thus, reducing the defective lines, and in particular, reducing the fault ratio in the driving circuit are crucial to improve the yield of the image display apparatus. Therefore, parallel with the improvement of the manufacturing process in reducing the faults, a redundant technique must be adopted to enable the driving circuit to operate as if there were no fault in the event a fault occurs therein.

A detailed explanation of a conventional driving circuit will be given in the following. As shown in FIG. 6, a scanning signal line driving circuit includes a scanning circuit section comprising serially connected n latch circuits 241*a*–24*na* which correspond to output signal lines 241*c*–24*nc*, respectively. Latch circuit 241*a* in the first stage is connected to a scanning signal line 241*b*. Thus, latch circuit 241*a* receives a pulse signal through scanning signal line 241*b* and transfers the same to latch circuit 242*a* in the next stage through a scanning signal line 242*b* based on a clock signal inputted through a timing control signal line 250. Buffer circuits 241*g*–24*ng* are respectively connected to latch circuits 241*a*–24*na* in their output side, and output the pulse signals from latch circuits 241*a*–24*na* to output signal lines 241*c*–24*nc*, respectively.

A data signal line driving circuit is of the same structure except that sample holding circuits are respectively connected to latch circuits 241*a*–24*na* in their output side instead of buffer circuit 241*g*–24*ng*.

In the above-structured conventional scanning signal line driving circuit or data signal line driving circuit, an output from a unit circuit (i.e., latch circuit) is inputted into another unit circuit in the next stage. Thus, a fault in an output of any stage makes the driving circuit inoperative. In addition, let a conforming ratio per stage be x and the number of outputs be n, then an overall conforming ratio of the driving circuit will be reduced to $x^n$.

Since there has been an increasing demand for a larger, high-definition display screen, it is not surprising if a liquid crystal display or the like employing the above driving circuit includes as many as 1000 output stages. In this case, even a conforming ratio per stage is as high as 0.999 (99.9%), a simple overall conforming ratio of the driving circuit is reduced to $0.999^{1000} \approx 0.368$ (36.8%). If the number of the outputs is slashed to half (500 stages), still the overall conforming ratio is reduced to $0.999^{500} \approx 0.606$(60.6%).

In short, a matrix type image display apparatus employing the conventional driving circuit has a problem that the overall conforming ratio of the driving circuit is lowered as the number of outputs increases, thereby making a large-sized or high-definition display apparatus expensive.

Especially, in case of a monolithic display device whose driving circuit and image display section are formed on a single substrate, components such as the driving circuit can not be replaced with a new one once they are assembled, meaning that a fault in the driving circuit triggers a fault in the display device.

Accordingly, Japanese Examined Patent Publication No. 2-13316(1990) discloses a display apparatus devised to eliminate the above problem. Herein, a scanning circuit section includes switching transistors made of the same silicon material making up the switching transistors connected to pixel electrodes, and the scanning circuit section is composed of a plurality of blocks of serially connected circuits featuring the same function; the blocks are aligned in parallel and the signal output terminals of the circuits in the same stage in all the blocks are directly connected to one of conducting wires forming the image display section.

More precisely, as shown in FIG. 7, latch circuits 241*a*'–24*na*' are respectively provided in parallel with latch circuits 241$a$–24$na$ in the scanning circuit section. For example, latch circuit 241$a$ and latch circuit 241$a'$ in the first stage are connected directly to each other in the output side, and the pulse signals therefrom are inputted into latch circuit 242$a$ and latch circuit 242$a'$, in the next stage, respectively.

According to this structure, if latch circuit 241$a$ fails, a wire 241$d$ in the output side of latch circuit 241$a$ is disconnected to isolate latch circuit 241$a$ from the other terminals electrically, thereby enabling the driving circuit to operate as if there were no fault. In other words, the overall conforming ratio of the driving circuit is improved by allowing an operable latch circuit alone to output a pulse signal to another latch circuit in the next stage.

In this method, however, a latch circuit is always paired with the latch circuit provided in parallel. Thus, if both latch circuits 241$a$ and 241$a'$ fail, any other latch circuit can not serve as an alternate circuit, thereby making the driving circuit defective. Also, if there is a fault in any of the circuits beyond the scanning circuits, for example, buffer circuits 241$g$–24$ng$, although the output from the failing circuit does not affect the outputs of the others, it eventually makes the driving circuit defective.

In addition, since a plurality of blocks each having a plurality of unit circuits are aligned in parallel, if all the unit circuits operate properly, the unit circuits other than those forming a main block become useless. Moreover, since a plurality of identical unit circuits are aligned in the parallel blocks, there is a problem that the size of the driving circuit is inevitably increased.

To solve the above problem, a variety of techniques are proposed. For example, Japanese Examined Patent Publication No. 2-708(1990) discloses a liquid crystal display device, in which a pair of peripheral driving circuits are provided symmetrically with a display area in between, and the pair of the peripheral driving circuits are connected to a signal wire of the same portion in the display area.

Also, Japanese Examined Patent Publication No. 6-14253 (1994) discloses a liquid crystal display device, in which a pair of scanning signal line driving circuits are provided symmetrically with a display area in between, and the outputs of shift register cells, one from each driving circuit, are connected to each other to be further connected to one scanning single line. When any of the shift register cells fails, the failing cell alone is laser-trimmed and separated from the driving circuit to enable the driving circuit to operate as if there were no fault.

The above liquid crystal display devices include a plurality of driving circuits, so that, if one driving circuit fails, another driving circuit can supply a signal to each pixel cell, thereby making it possible to produce a non-defective image.

Besides the above-explained image display apparatuses, Japanese Laid-Open Patent Application No. 6-67200(1994) discloses an image display apparatus, in which the scanning signal line driving circuits and data signal line driving circuits are provided respectively in pairs and each driving circuit is connected to all the wires. Thus, when one of the driving circuits in pairs fails, such a failing driving circuit is isolated electrically and the other driving circuit enables the image display apparatus to operate as if there were no fault.

However, when a pair of identical driving circuits are provided in this way, an area occupied by the peripheral circuits is increased two-fold, thereby causing an increase in the manufacturing costs. Moreover, since only a single fault can isolate the driving circuit entirely from the image display apparatus, both the driving circuits in paris are isolated if each has a fault, which makes it impossible to troubleshoot the faults, and thus puts a firm cap on the troubleshooting rate.

Another example is shown in Japanese Laid-Open Patent Application No. 6-83286(1994). Herein, the driving circuit is divided into a plurality of blocks each including two shift register series: regular and backup. According to this structure, when a regular shift register fails, the failing regular shift register is switched to a corresponding backup shift register to ensure a normal operation. This type of redundant technique is advantageous in that the driving circuit can operate as if there were no faults when the driving circuit has a number of faults in the shift registers substantially in as many blocks.

However, since this redundant technique is effective in troubleshooting the faults only in the shift registers, it must be combined with another technique to troubleshoot the faults in the entire driving circuit. Because the shift registers occupy a relatively small area in the driving circuit, the faults are more likely to occur in the circuits other than the shift registers. Therefore, a priority should be placed on to troubleshoot the faults in the other circuits.

Additionally, compared with a transistor formed on a substrate made of single-crystalline silicon, the transistor formed monolithically on the polycrystalline silicon thin film generally retains a small mobility, and a low driving capability due to its high threshold voltage. As a result, the monolithic transistor makes it difficult to widen a band of a video signal, such as an increase in an amount of data or reproduction of a moving picture.

If the phase of the clock signal is shifted and a plurality of shift register series, for example, a shift register series A and a shift register series B, are operated in parallel as shown in FIG. 53(*a*), an apparent response speed can be increased two-fold as shown in FIG. 53(*b*).

However, if such circuits are provided in the above-explained manner to improve the yield, the number of elements is increased approximately two-fold and there occurs a problem that not only the manufacturing costs but also a non-display area on the display panel is increased.

Also, in a driving circuit having such a polyphase shift register circuit, if an input side and an output side of a failing shift register (i.e., shift register A2) are simply shorted as shown in FIG. 54(*a*), an output timing inputted into the output stage of shift register A1 is also inputted into the output stage of shift register A2. Thus, as shown in FIG. 54(*b*), not only the time series are transposed among the shift register series, but also a video signal which should have been outputted from shift register A2 is outputted from an unillustrated shift register A4 in the form of an output signal $a_4$, thereby causing displacements of the video signal.

SUMMARY OF THE INVENTION

It is therefore at least one object in accordance with the present invention to provide a matrix type image display apparatus of a simple structure which can enhance a conforming ratio without increasing the number of elements more than necessary.

The above object can be fulfilled by a matrix type image display apparatus characterized by comprising:

(1) a matrix of display pixels;

(2) a data signal line driving circuit for supplying a video signal to each pixel; and (3) a scanning signal line driving circuit for controlling a writing operation to each pixel, (4) wherein at least one of the two driving circuits is composed of at least one group including a standard unit circuit and a backup unit circuit, the standard unit circuit and the backup unit circuit having a same function and a same structure, the backup unit circuit being isolated electrically from the driving circuit, and (5) wherein each group includes switching means for switching, when a failure occurs in the standard unit circuit, the failing standard unit circuit to the backup unit circuit by disconnecting the failing standard unit circuit from the driving circuit and connecting the backup unit circuit as a replacement.

According to the above structure, the driving circuit of the matrix type image display apparatus is divided into groups, each of which includes the backup unit circuit. Thus, when there occurs a failure in one of the standard unit circuits in a block, the failing standard unit circuit can be switched to the backup unit circuit. As a result, the driving circuit can operate as if it were faultless, thereby enhancing a confirming ratio.

Moreover, the backup unit circuit can be connected to any of the standard unit circuits in the group, a ratio of the number of the standard unit circuits and that of the backup unit circuits within the group can be set in accordance with a conforming ratio of each unit circuit. Thus, the above structure can reduce the number of idle backup unit circuits while maintaining a high overall conforming ratio of the driving circuit.

Also, the matrix type image display apparatus characterized by comprising the items (1), (2), and (3) may be arranged in such a manner that:

(6) the data signal line driving circuit is composed of at least one block including a scanning circuit for outputting a pulse signal in time series and a video signal output circuit for capturing a video signal in sync with the pulse signal to output the video signal to a data signal line; and (7) each block includes:

regular video signal output circuits in an equal number of the scanning circuits and data signal lines;

at least one backup video signal output circuit; and switching means for selectively connecting each scanning circuit and each data signal line to any of a plurality of adjacent video signal output circuits.

According to the above structure, when there is no failure in the regular video signal output circuits in each block, the regular video signal output circuits are connected to their respective scanning circuits and data signal lines, and thus none of the scanning circuits and data signal lines is connected to the backup video signal output circuit. On the other hand, when there occurs a failure in any of the regular video signal output circuit in the block, the failing regular video signal output circuit is disconnected from its corresponding scanning circuit and data signal line, and the regular video signal output circuits beyond (or ahead of) the failing regular video signal output circuit are sequentially re-connected to the adjacent scanning circuits and data signal lines, and the backup video signal output circuit is connected to its corresponding scanning circuit and data signal line.

Thus, a failure in a block can be troubleshooted in the block. As a result, even when a number of failures occurs in a block, the data signal line driving circuit can operate as if it were faultless if the backup video signal output circuits in the block outnumber the faults.

Also, the switching means can re-connect the video signal output circuits beyond the fault to the adjacent scanning circuits by re-connecting one wire sequentially, thereby reducing the labor and costs required for the troubleshooting.

In addition, it is a failure in the video signal output circuit occupying the largest area in the data signal line driving circuit that can be troubleshoot. Therefore, the conforming ratio of the data signal line driving circuit can be enhanced significantly.

Also, the matrix type image display apparatus characterized by comprising the items of (1), (2), and (3) may be arranged in such a manner that:

(8) the data signal line driving circuit is composed of at least a block including a scanning circuit for outputting a pulse signal in time series, and a video signal output circuit for capturing a video signal in sync with the pulse signal to output the video signal to a data signal line, and (9) each block includes:

regular scanning circuits and regular video signal output circuits both in an equal number of the data signal lines;

at least one backup scanning circuit and at least one backup video signal output circuit;

switching means for selectively connecting each data signal line to any of a plurality of adjacent video signal output circuits; and second switching means for connecting each scanning circuit to any of a plurality of adjacent video signal output circuits.

According to the above structure, when there is no failure in the regular scanning circuits and regular video signal output circuits in each block, the regular video signal output circuits are connected to their respective scanning circuits and data signal lines, and thus none of the scanning circuits and data signal lines is connected to the backup video signal output circuit. Under these conditions, the backup scanning circuit is interlaced-scanned. On the other hand, when there occurs a failure in any of the regular scanning circuits and regular video signal output circuits, the regular video signal output circuit affected by the failure is disconnected from its corresponding data signal line, and the regular video signal output circuits beyond (or ahead of) the failure are sequentially re-connected to the adjacent data signal lines, and the backup video signal output circuit is connected to its corresponding data signal line. At the same time, the scanning circuit affected by the failing circuit is interlaced-scanned, while the backup scanning circuit is incorporated into the driving circuit instead, thereby enabling the data signal line driving circuit to operate as if there were no faults.

Thus, in addition to the effects realized by items (6) and (7), failures occurred in any circuit element making up the data signal line driving circuit can be troubleshoot, thereby making it possible to enhance the confirming ratio of the data signal line driving circuit significantly.

Also, the structure of items (6), (7), (8), and (9) can be applied to the scanning signal driving circuit if the video signal output circuit, which captures the video signals to output the same to the data signal lines, is replaced with the scanning signal output circuit that outputs the scanning signals sequentially to the scanning signal lines.

Also, the matrix type image display apparatus characterized by comprising the items of (1), (2), and (3) may be arranged in such a manner that:

(10) each of the two driving circuits is composed of a plurality of shift register series each having a different clock phase, the shift register series and the pixels being formed on a substrate monolithically,

(11) at least one of the driving circuits includes:

disconnecting means for disconnecting an input into and output from each shift register in each shift register series; and conducting means for connecting an output stage of a preceding shift register in one shift register series to an output signal line of a following shift register in another shift register series, an output timing of the following shift register coming next to the preceding shift register, the conducting means being usually disconnected electrically from the driving circuit.

According to this structure, the image display apparatus accelerates the display operation by forming the pixels and a plurality of shift register series each having different clock phase in parallel in a monolithic manner. Thus, if there occurs a failure in a shift register (i.e., preceding shift register), an output signal can be supplied from another shift register (i.e., following shift register) in another shift register series. Thus, the shift registers beyond the preceding shift register in the same shift register series can operate properly.

As a result, it is no longer necessary to provide a backup shift register, thereby making it possible to improve the operation of each shift register series without increasing an area of a non-display portion.

For a fuller understanding of the nature and advantages of the invention, reference should be made to the ensuing detailed description taken in conjunction with the accompanying drawings.

BRIEF DESCRIPTION OF THE DRAWINGS

FIG. 1(*b*) is a block diagram showing an operation of the driving circuit when it has a fault;

FIG. 2(*b*) is a cross sectional view taken on line 2(*b*)—2(*b*) of FIG. 2(*a*);

FIG. 2(*c*) is a plan view showing another example of the switching method;

FIG. 2(*d*) is a cross sectional view taken on line 2(*d*)—2(*d*) of FIG. 2(*c*);

FIG. 2(*e*) is a plan view showing another example of the switching method;

FIG. 2(*f*) is a cross sectional view taken on line 2(*f*)—2(*f*) of FIG. 2(*e*);

FIG. 3(*b*) is a cross sectional view taken on line 3(*b*)—3(*b*) of FIG. 3(*a*);

FIG. 3(*c*) is a plan view showing another example of the switching method;

FIG. 3(*d*) is a cross sectional view taken on line 3(*d*)—3(*d*) of FIG. 3(*c*);

FIG. 3(*e*) is a plan view showing another example of the switching method;

FIG. 3(*f*) is a cross sectional view taken on line 3(*f*)—3(*f*) of FIG. 3(*e*);

FIG. 4(*b*) shows a schematic circuit diagram of a switch employed to control an OFF→ON switching action;

FIG. 4(*c*) shows a schematic circuit diagram of switching means for controlling ON←→OFF switching action using a memory element;

FIG. 8(*b*) is a block diagram showing an operation of the data signal line driving circuit when it has a fault;

FIGS. 11(*d*) through 11(*f*) are views explaining a structure of an anti-fuse;

FIG. 12(*b*) is a block diagram showing an operation of the data signal line driving circuit when it has a fault;

FIG. 24(*b*) is a block diagram showing an operation of the scanning signal line driving circuit when it has a fault;

FIG. 27(*b*) is a block diagram showing an operation of the scanning signal line driving circuit when it has a fault;

FIG. 31(*b*) is a schematic circuit diagram showing a structure of a pixel of the above image display section;

FIG. 38(*b*) is a timing chart of signals inputted into and outputted from the above polyphase shift register circuit;

FIG. 40(*b*) is a plan view showing an example of a method of directly connecting signal lines with each other;

FIG. 40(*c*) is a plan view showing another example of the method of directly connecting signal lines with each other;

FIG. 40(*d*) is a cross sectional view taken on line X—X of FIG. 40(*a*);

FIG. 40(*e*) is a cross sectional view taken on line Y—Y of FIG. 40(*b*);

FIG. 41(*b*) is a timing chart of signals inputted into and outputted from the above polyphase shift register circuit;

FIG. 42(*b*) is a timing chart of signals inputted into and outputted from the above polyphase shift register circuit;

FIG. 45(*b*) is a timing chart of signals inputted into and outputted from the above polyphase shift register circuit;

FIG. 46(*b*) is a timing chart of signals inputted into and outputted from the above polyphase shift register circuit;

FIG. 47(*b*) is a timing chart of signals inputted into and outputted from the above polyphase shift register circuit;

FIG. 48(*b*) is a timing chart of signals inputted into and outputted from the above polyphase shift register circuit;

FIG. 49(*b*) is a view explaining a video signal separated in accordance with the number of shift register series;

FIG. 53(*b*) is a timing chart of signals inputted into and outputted from the above shift register circuit;

FIG. 54(*b*) is a timing chart of signals inputted into and outputted from the above shift register circuit.

DETAILED DESCRIPTION OF EMBODIMENTS

First Embodiment

Referring to FIGS. 1 through 4, the following description describes an example first embodiment in accordance with the present invention. Note that, like the buffer circuits and sample holding circuits, a unit circuit of a driving circuit in a matrix type image display apparatus of the present embodiment does not input an output therefrom into another unit circuit.

Figure 1A:
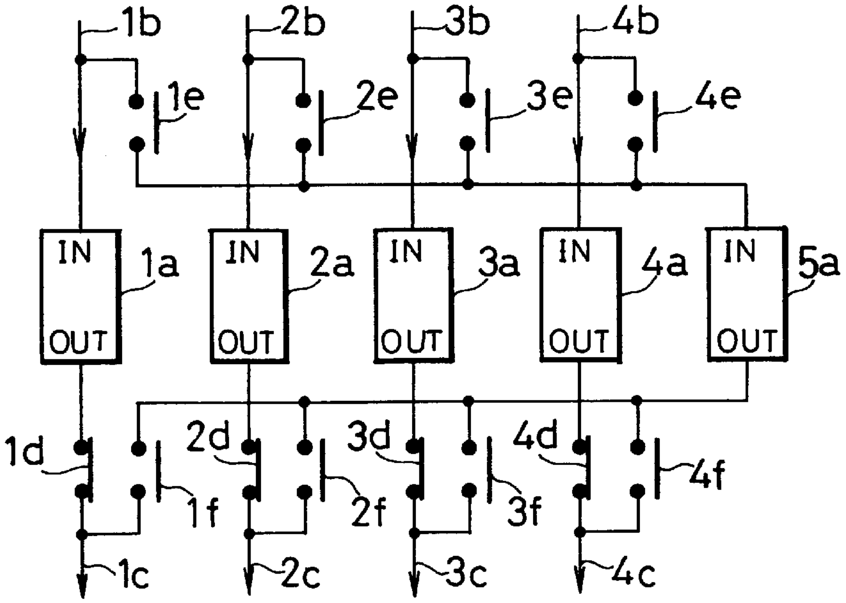
FIG. 1(*a*) is a block diagram depicting an initial structure of a driving circuit of a matrix type image display apparatus in accordance with the first embodiment of the present embodiment.
Figure 1B:
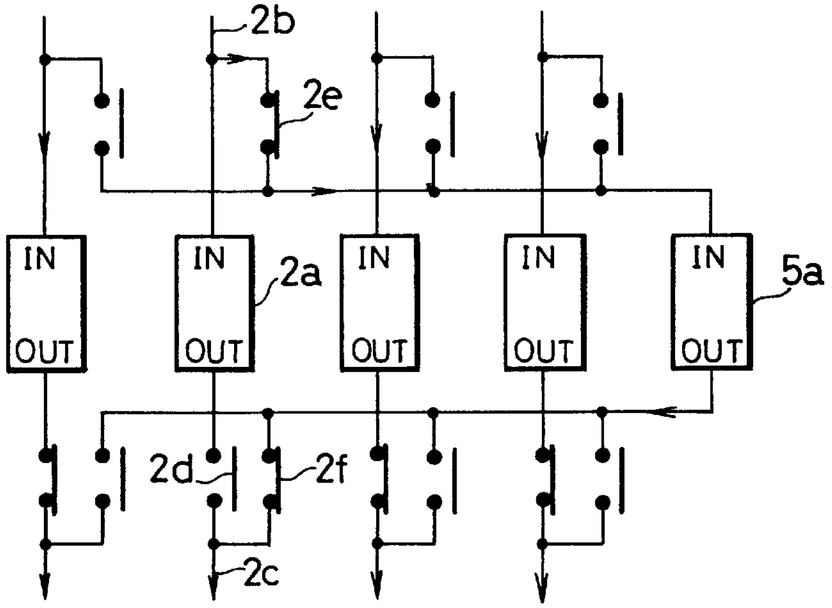

FIG. 1(*a*) is a view showing a group in the driving circuit in the matrix type image display apparatus of the present embodiment. One group comprises four standard unit circuits 1*a*–4*a* and their backup unit circuit 5*a*. Standard unit circuits 1*a*–4*a* are respectively connected to input signal lines 1*b*–4*b* in their input side and to output signal lines 1*c*–4*c* in their output side by means of signal output switches 1*d*–4*d*. Backup unit circuit 5*a* is connected to input signal lines 1*b*–4*b* in the input side by means of signal input switches 1*e*–4*e* and to output signal lines 1*c*–4*c* in the output side by means of signal output switches 1*f*–4*f*.

The driving circuit is made in such a manner that signal output switches 1*d*–4*d* are usually turned on while signal input switches 1*e*–4*e* and signal output switches 1*f*–4*f* are all turned off. Thus, if standard unit circuits 1*a*–4*a* are all operable, the ON/OFF state of signal input switches 1*e*–4*e* and signal output switches 1*d*–4*d* 1*f*–4*f* does no have to be changed.

In case that one of standard unit circuits 1*a*–4*a*, for example, standard unit circuit 2*a*, fails and backup unit circuit 5*a* is operable, the ON/OFF state of the switches is changed as shown in FIG. 1(*b*): signal input switch 2*e* and signal output switch 2*f* are turned on whereas signal output switch 2*d* is turned off.

As a result, standard unit circuit 2*a* is isolated from the driving circuit and backup unit circuit 5*a* is incorporated into the driving circuit as its replacement, thereby enabling the driving circuit to operate as if it were faultless.

Here, let us find an overall conforming ratio of the driving circuit assuming that the driving circuit comprises l groups, each being composed of m standard unit circuits and n backup unit circuits.

Note that a group's probability of being non-defective equals to a probability that the operable backup unit circuits out of n outnumber the failing standard unit circuits out of m in the group.

Let a conforming ratio of a unit circuit be $x (0 \leqq x \leqq 1)$, then a probability that b unit circuits out of a are operable is found by ${}_aC_b \times (1-x)^{a-b} \times x^b$.

Likewise, a probability that b unit circuits out of a have faults is found by ${}_aC_{b\times(}1-x)^b \times x^{a-b}$. Here, ${}_aC_b$ is the number of combinations and expressed as:

$${}_aC_b = a!/((a-b)! \times b!).$$

Then, with the above equation, a conforming ratio of the group, $P_{GRP}$, is expressed as:

$$P_{GRP} = x^m + \sum_{k=1}^{n}\left({}_mC_k \times (1-x)^k \times x^{m-k} \times \sum_{j=k}^{n}({}_nC_j \times (1-x)^{n-j} \times x^j)\right) \quad (1)$$

where $n \leqq m$, and $$P_{GRP} = x^m + \sum_{k=1}^{m}\left({}_mC_k \times (1-x)^k \times x^{m-k} \times \sum_{j=k}^{n}({}_nC_j \times (1-x)^{n-j} \times x^j)\right) \quad (2)$$

where $n > m$. Since an overall conforming ratio $P_{all}$ of the driving circuit is expressed as:

$$P_{all} = (P_{GRP})^l \quad (3)$$

Thus, Equation (1) is substituted into Equation (3) when $n \leqq m$, which yields $$P_{all} = \left(x^m + \sum_{k=1}^{n}\left({}_mC_k \times (1-x)^k \times x^{m-k} \times \sum_{j=k}^{n}({}_nC_j \times (1-x)^{n-j} \times x^j)\right)\right)^l \quad (4)$$

and Equation (2) is substituted into Equation (3) when $n > m$, which yields $$P_{all} = \left(x^m + \sum_{k=1}^{m}\left({}_mC_k \times (1-x)^k \times x^{m-k} \times \sum_{j=k}^{n}({}_nC_j \times (1-x)^{n-j} \times x^j)\right)\right)^l \quad (5)$$

Let $$\sum_{k=1}^{n}\left({}_mC_k \times (1-x)^k \times x^{m-k} \times \sum_{j=k}^{n}({}_nC_j \times (1-x)^{n-j} \times x^j)\right)$$

and $$\sum_{k=1}^{m}\left({}_mC_k \times (1-x)^k \times x^{m-k} \times \sum_{j=k}^{n}({}_nC_j \times (1-x)^{n-j} \times x^j)\right)$$

be A in Equations (4) and (5), respectively, then $P_{all}$ is expressed as:

$$P_{all} = (x^m + A)^l \quad (6)$$

$$= x^{l\times m} + \sum_{j=K}^{n}({}_lC_k \times x^{(l-k)\times m} \times A^k$$

The first term of Equation (6) equals to the overall conforming ratio of the driving circuit when no backup unit circuit is provided and the second term of Equation (6) is positive. Thus, it is understood that the overall conforming ratio of the driving circuit is increased compared with the case where no backup unit circuit is provided.

Let l=250, m=4, and n=1 to make 1000 output stages, then the conforming ratio $P_{all}$ of the driving circuit is found as follows:

$$P_{all} = (x^4 + 4 \times (1-x) \times x^3 \times x)^{250} = ((1 + 4 \times (1-x)) \times x^4)^{250} = (1 + 4 \times (1-x))^{250} \times x^{1000}.$$

Here, $x^{1000}$ is the confirming ratio of a 1000-stage driving circuit when no backup unit circuit is provided, and therefore, it is understood that the conforming ratio of the driving circuit in the present embodiment is increased by a factor of $(1+4\times(1-x))^{250}$.

For example, let the conforming ratio x of the unit circuit be 0.999 (99.9%), then the overall conforming ratio $P_{all}$ of the driving circuit is found by:

$$P_{all}=((1+4\times(1-0.999))\times0.999^4)^{250}=0.9975.$$

When no backup unit circuit is provided, $$x^{1000}=0.999^{1000}=0.368.$$

Thus, the overall conforming ratio of the driving circuit is increased approximately by a factor of 2.7 compared with the case where no backup unit circuit is provided.

In other words, providing backup unit circuits as many as one-fourth of the number of the standard unit circuits makes almost all the driving circuits faultless. As a result, the yield is enhanced and a resulting driving circuit becomes less expensive.

Following is a reason why m, the number of the standard unit circuits, is set to four, and n, the number of the backup unit circuits is set to one herein when the conforming ratio x is 0.999.

Since the backup unit circuit serves as a failing standard unit circuit, the operable backup unit circuits must outnumber the failing standard unit circuits. Let x represent a conforming ratio of each unit circuit, then (1−x) represents a ratio of failing unit circuits. Thus, an expected value for the failing unit circuits out of m standard unit circuits is found by m·(1−x), while an expected value for the conforming unit circuits out of n backup unit circuits is found by n·x. Therefore, a following equation is given as a condition:

$$n\cdot x\geqq m\cdot(1-x).$$

However, m·(1−x) and n·x are only the expected values, that is, an average number of the failing standard unit circuits and an average number of the faultless backup unit circuits, respectively.

In other words, a probability that the number of the failing standard unit circuits is equal to m·(1−x) or more and a probability that the number of the conforming backup unit circuits is equal to n·x or less are about 50%. For this reason, the expected value of the conforming unit circuits out of n backup unit circuits must be sufficiently large with respect to the expected value for the failing unit circuits out of m standard unit circuits.

In practical terms, a standard deviation $\delta_m$ of the number of the failing unit circuits out of m standard unit circuits, and a standard deviation $\delta_n$ of the number of the operable unit circuits out of n backup unit circuits are respectively expressed as:

$$\left.\begin{aligned}\delta_m &= \sqrt{m\cdot x\cdot(1-x)}\\ \delta_n &= \sqrt{n\cdot x\cdot(1-x)}\end{aligned}\right\} \quad (7)$$

Thus, if x follows a normal distribution, a conforming ratio as high as 99% can be obtained in the group when n backup unit circuits are provided for m standard unit circuits so as to satisfy the following equation:

$$n\cdot x-3\delta_n\geqq m(1-x)+3\delta_m \quad (8)$$

which can be converted as follows by substituting Equation (7) into Equation (8):

$$n\cdot x-3\sqrt{n\cdot x\cdot(-x)}\geq m\cdot(1-x)+3\sqrt{m\cdot x\cdot(1-x)} \quad (9)$$

Since x=0.999 and m=4 herein, $$n\times0.999-3\sqrt{n\times0.999\times0.001}\geq 4\times0.001+3\sqrt{4\times0.999\times0.001}.$$

Given √n=α, it can be rewritten as:

$$999\cdot\alpha^2-3\alpha\sqrt{999}-\left(4+6\sqrt{999}\right)\geq 0.$$

Since a>0, $$\alpha\geq\frac{3\sqrt{999}+\sqrt{9\times999+4\times999\times\left(4+6\sqrt{999}\right)}}{2\times999}\approx0.49.$$

In other words, n must satisfy:

$$n\geqq0.49^2=0.2401.$$

As n is a natural number, n≧1, which sets the number of the backup unit circuits in the group to one in the above example.

Note that Equation (9) was given as an example, and it must be changed depending on an overall conforming ratio of the driving circuit, the number m of the standard unit circuits in the group, a conforming ratio of each unit circuit, etc.

In the following, structures of signal output switches 1*d*–4*d* and 1*f*–4*f* and signal input switches 1*e*–4*e* in the above-explained circuit will be explained in a more specific manner with reference to FIGS. 2(*a*) through 2(*f*) and FIGS. 3(*a*) through 3(*f*).

Figures 2A, 2B, 2C, 2D, 2E, 2F:
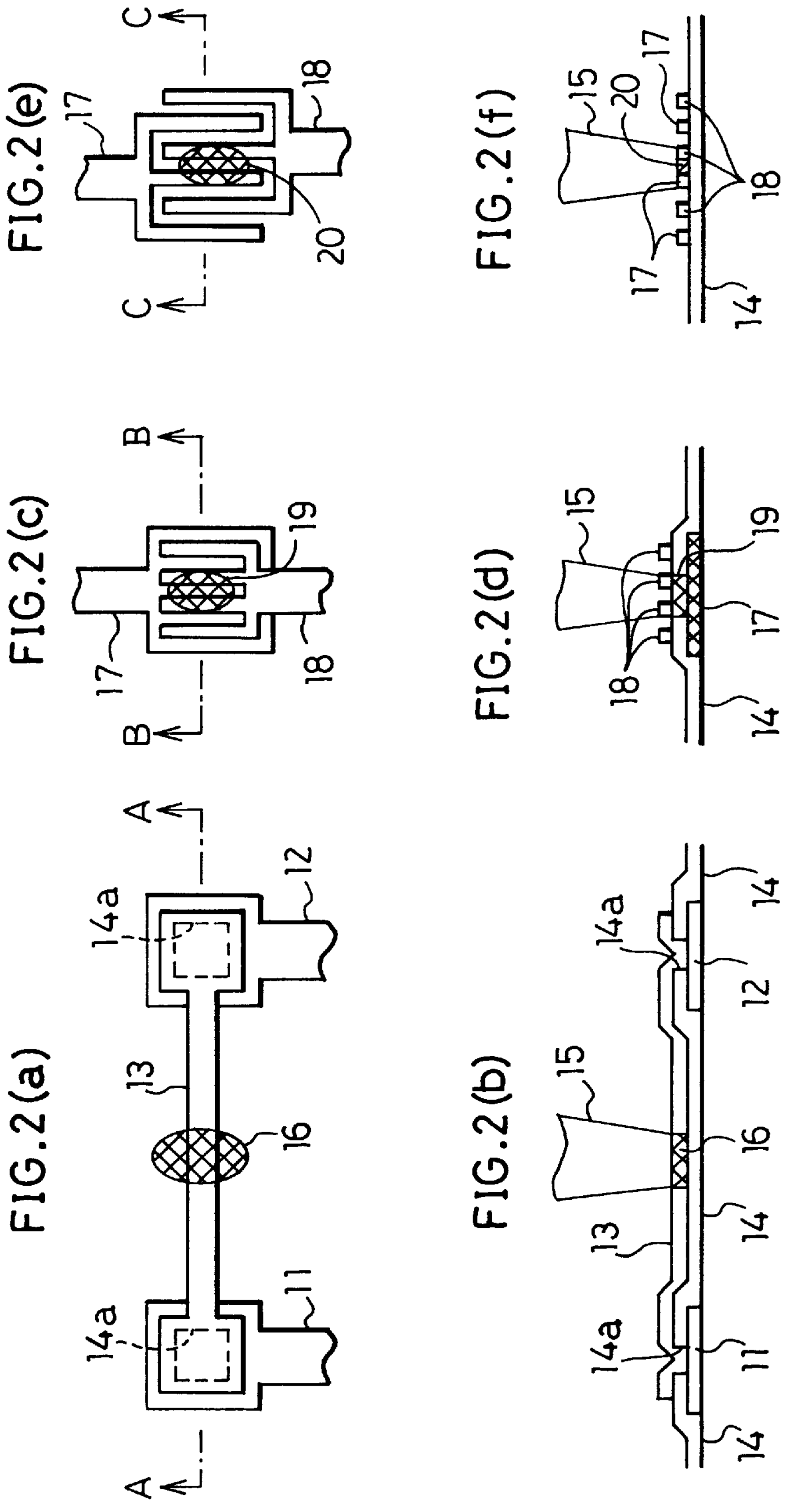
FIG. 2(*a*) is a plan view showing an example of a switching method in the above driving circuit.

FIGS. 2(*a*) through 2(*f*) show methods, in which wires are connected or disconnected by sublimating and evaporating or melting a wiring pattern or insulating film through irradiation of laser beams.

Like signal output switches 1*d*–4*d* of FIG. 1(*a*), a switch that isolates a failing standard unit circuit from the driving circuit is of the structure shown in FIGS. 2(*a*) and 2(*b*). Herein, a conductive layer 11 and a conductive layer 12 are connected to each other by a conductive layer 13. Conductive layers 11 and 12, which will serve as the switch terminals, are adequately spaced apart. An insulating layer 14 covering the top end of conductive layers 11 and 12 has contact holes 14*a* and 14*a* which are connected to each other by conductive layer 13. Thus, conductive layers 11 and 12 are brought into contact with conductive layer 13 to establish conductivity therebetween. According to this structure, a laser beam 15 is irradiated to a disconnecting portion 16 to sublimate and evaporate conductive layer 13 in that portion, whereby conductive layer 13 is disconnected.

On the other hand, like signal output switches 1*f*–4*f* and signal input switches 1*e*–4*e*, a switch that connects the backup unit circuit to the driving circuit is of the structure shown in FIGS. 2(*c*) and 2(*d*): conductive layers 17 and 18 which form a switch terminal are layered with insulating layer 14 in between. According to this structure, laser beam 15 is irradiated to a connecting portion 19 to sublimate and evaporate insulating layer 14 and melt conductive layers 17 and 18, whereby conductive layers 17 and 18 are connected to each other.

Alternatively, to make a switch that connects the backup unit circuit to the driving circuit, conductive layers 17 and 18 may be placed adjacently as close as possible as shown in FIGS. 2(*e*) and 2(*f*). According to this structure, laser beam 15 is irradiated to a connecting portion 20 to melt conducive layers 17 and 18 in this portion, whereby conducive layers 17 and 18 are connected to each other.

In any case, it is preferable to place the conductive layers on which laser beam 15 is irradiated on the top. More specifically, it is preferable to place conductive layer 13 of FIG. 2(*a*), conductive layer 18 of FIG. 2(*c*), and conductive layers 17 and 18 of FIG. 2(*e*) on the top, on which laser beam 15 is irradiated at disconnecting portion 16 and connecting portions 19 and 20, respectively. An electron beam, ion beam, light emanated from a lamp may be used instead of laser beam 15 for the above sublimating and evaporating, and melting processes.

Figures 3A, 3B, 3C, 3D, 3E, 3F:
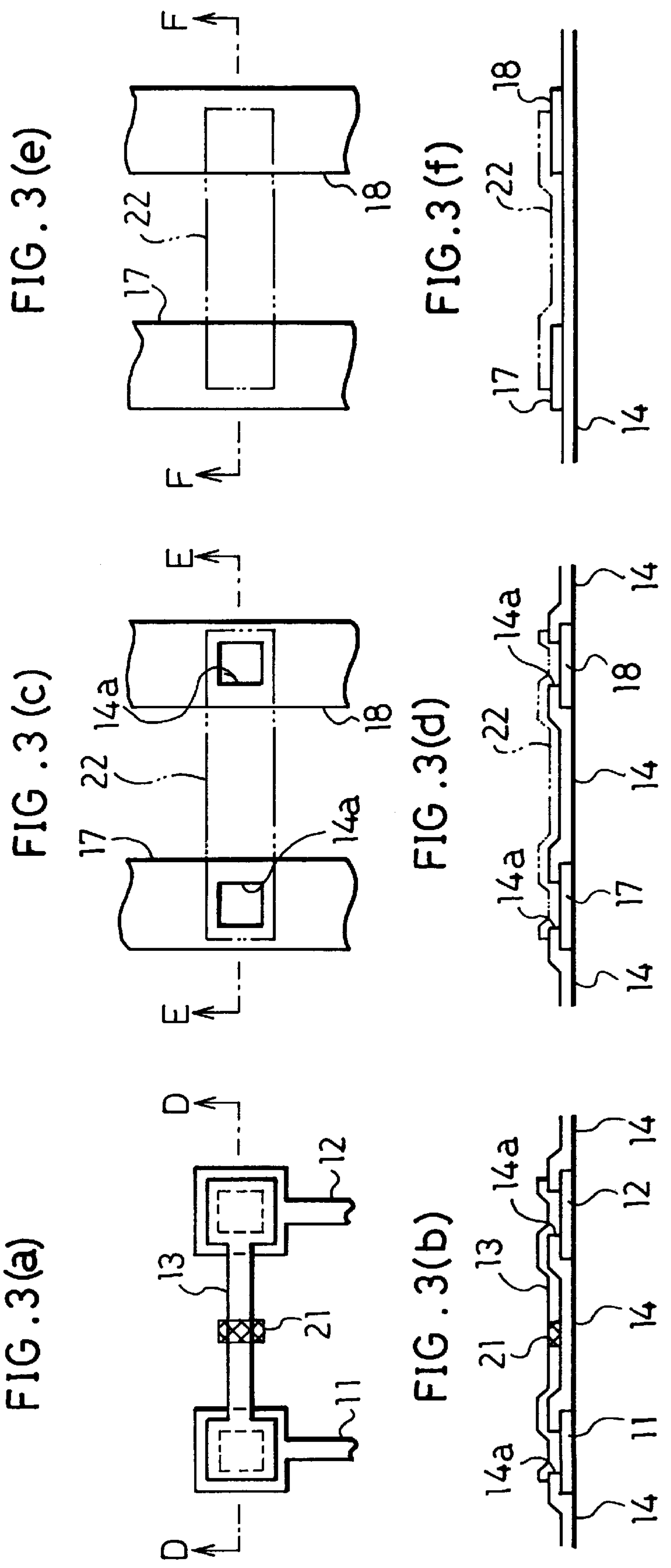
FIG. 3(*a*) is a plan view showing another example of the switching method.

FIGS. 3(*a*) through 3(*f*) show methods in which wires are connected or disconnected by the film forming process or etching process.

Like signal output switches 1*d*–4*d* of FIG. 1(*a*), a switch that isolates a failing standard unit circuit from the driving circuit is of the structure shown in FIGS. 3(*a*) and 3(*b*): conductive layers 11 and 12 are connected to each other by conductive layer 13, which is identical with the structure of FIGS. 2(*a*) and 2(*b*). According to this structure, either an entire surface other than a disconnecting portion 21 is masked by a resist to etch a pattern into the mask, or an ion beam, laser beam, or light emanated from a lamp is irradiated to disconnecting portion 21 in a gas atmosphere to etch a pattern into that portion alone, whereby conductive layer 13 is disconnected.

On the other hand, like signal output switches 1*f*–4*f* and signal input switches 1*e*–4*e*, a switch that connects the backup unit circuit to the driving circuit is of the structure shown in FIGS. 3(*c*) and 3(*d*): contact holes 14*a* and 14*a* are formed through insulating layer 14 covering conductive layers 17 and 18. According to this structure, either a conductive layer 22 is formed by covering the above layers entirely with a conductive layer, masking the wiring portion with a resist, and etching a pattern into the conductive layer except for the wiring portion, or conductive layer 22 is formed on the wiring portion alone using CVD or the like capable of localized film-forming, whereby conductive layers 17 and 18 are connected to each other. Note that conductive layer 22 is formed to cover contact holes 14*a* and 14*a*.

When both conductive layers 17 and 18, which are adequately spaced apart on insulating layer 14, are placed on the top, conductive layer 22 may be formed in the above explained manner without making the contact holes or the like.

Next, a method in which the signal input switches and signal output switches are connected and disconnected using active elements will be explained with reference to FIGS. 4(*a*) through 4(*c*).

The above method includes two methods. A first method is shown in FIGS. 4(*a*) and 4(*b*), in which a gate electrode 31*a* of a field-effect transistor 31 is connected to a power source line through a resistor 32. A second method is shown in FIG. 4(*c*), in which gate electrode 31*a* is connected to a memory element 33, so that the ON/OFF action is controlled based on the data stored in memory element 33.

In case of the first method, an initial ON/OFF state is determined whether gate electrode 31*a* is directly connected to the power source line or the grounding.

Figure 4A:
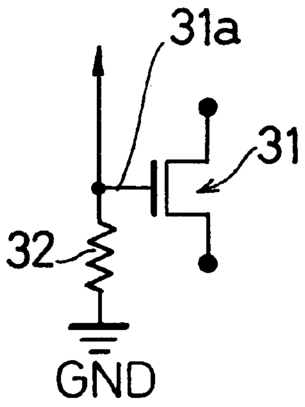
FIG. 4(*a*) shows a switching method using a field-effect transistor, and shows a schematic circuit diagram of a switch employed to control an ON→OFF switching action.
Figure 4B:
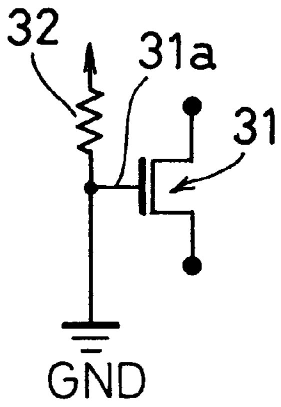
Figure 4C:
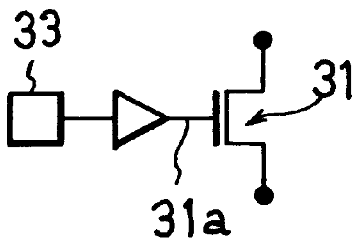

FIG. 4(*a*) shows the structure of a switch, such as signal output switches 1*d*–4*d*, that isolates a failing standard unit circuit from the driving circuit. According to this structure, gate electrode 31*a* is directly connected to the power source line while it is connected to the grounding side through resistor 32, whereby a voltage is applied to gate electrode 31*a*, and therefore the switch is turned on. When the power source line side is disconnected under these conditions, a potential of gate electrode 31*a* becomes equal to a potential in the grounding side, and therefore the switch is turned off.

FIG. 4(*b*) shows the structure of a switch, such as signal output switches 1*f*–4*f* and signal input switches 1*e*–4*e*, that connects the backup unit circuit to the driving circuit. In contrast to the method shown in FIG. 4(*a*), gate electrode 31*a* is directly connected to the grounding while it is connected to the power source line side through resistor 32, whereby the switch is turned off. When the grounding side is disconnected under these conditions, a voltage is applied to gate electrode 31*a*, and therefore the switch is turned on.

The above disconnecting action can be done by sublimating and evaporating the conductive layer or etching a pattern into the conductive layer in the above-explained manner. In this method, the switch is turned on or off only by disconnecting either the grounding or power source line, and this can be done only by providing disconnecting means on the driving circuit, thereby simplifying a layer structure of a substrate forming the driving circuit.

The second method shown in FIG. 4(*c*) includes two methods. In one method, a volatile memory element 33 such as a dynamic RAM or static RAM is used to write in the data stored in an external non-volatile memory when energized. In the other method, the data are written into a nonvolatile memory such as an ultraviolet-ray writing ROM or flash memory after the driving circuit is inspected.

For example, when the driving circuit of a matrix type image display apparatus is manufactured to include the switch mechanism shown in FIG. 4(*c*) and inspected to obtain information as to the normality and abnormality of the standard unit circuit, then the processes for producing a conforming driving circuit for a matrix type display apparatus can be incorporated into a sequence of assembly-line by providing the obtained information during the switching process between the standard unit circuit and backup unit circuit. As a result, a manufacturing efficiency is upgraded.

Herein, an n-channel field-effect transistor was used as the active element; however, a p-channel filed-effect transistor, TFT (thin-film transistor), or thyristor may be used instead.

Note that the above-explained methods are particularly effective for a driver monolithic type display apparatus whose driving circuit and image display section are formed on a single substrate.

Second Embodiment

Figure 5:
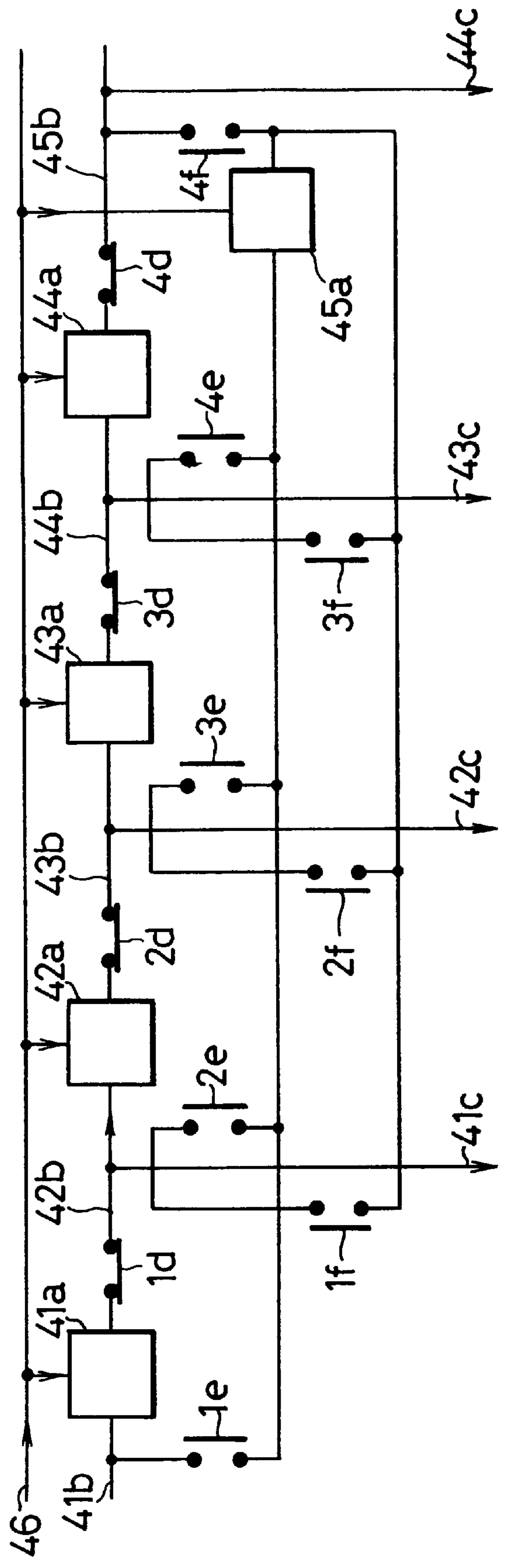
FIG. 5 is a block diagram depicting a structure of a scanning circuit section of a driving circuit of a matrix type image display apparatus in accordance with the second embodiment of the present invention.
Figure 6:
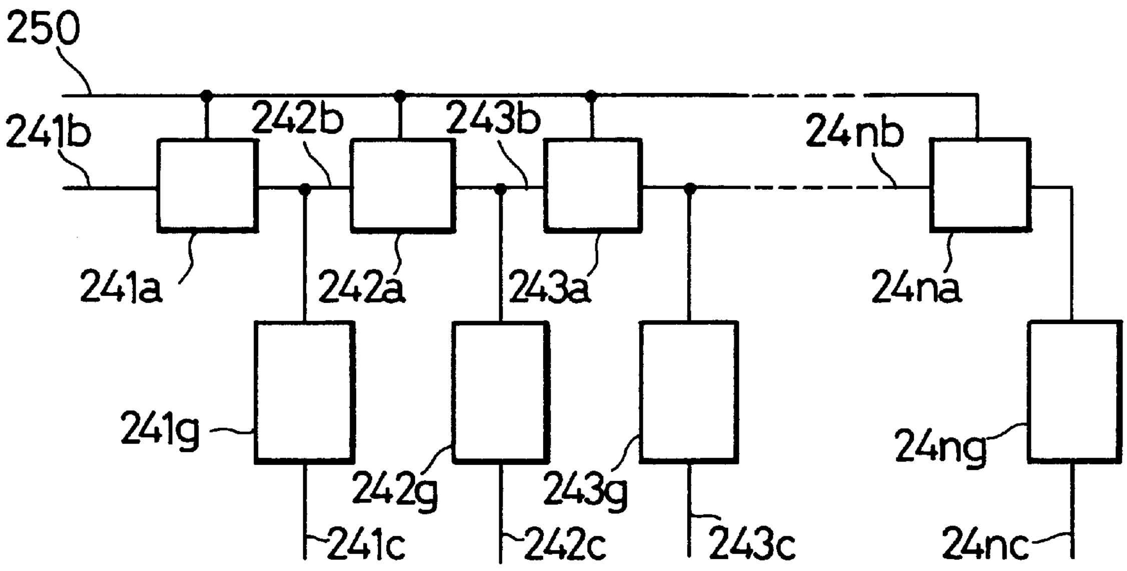
FIG. 6 is a block diagram showing an example of a driving circuit of a conventional matrix type image display apparatus.
Figure 7:
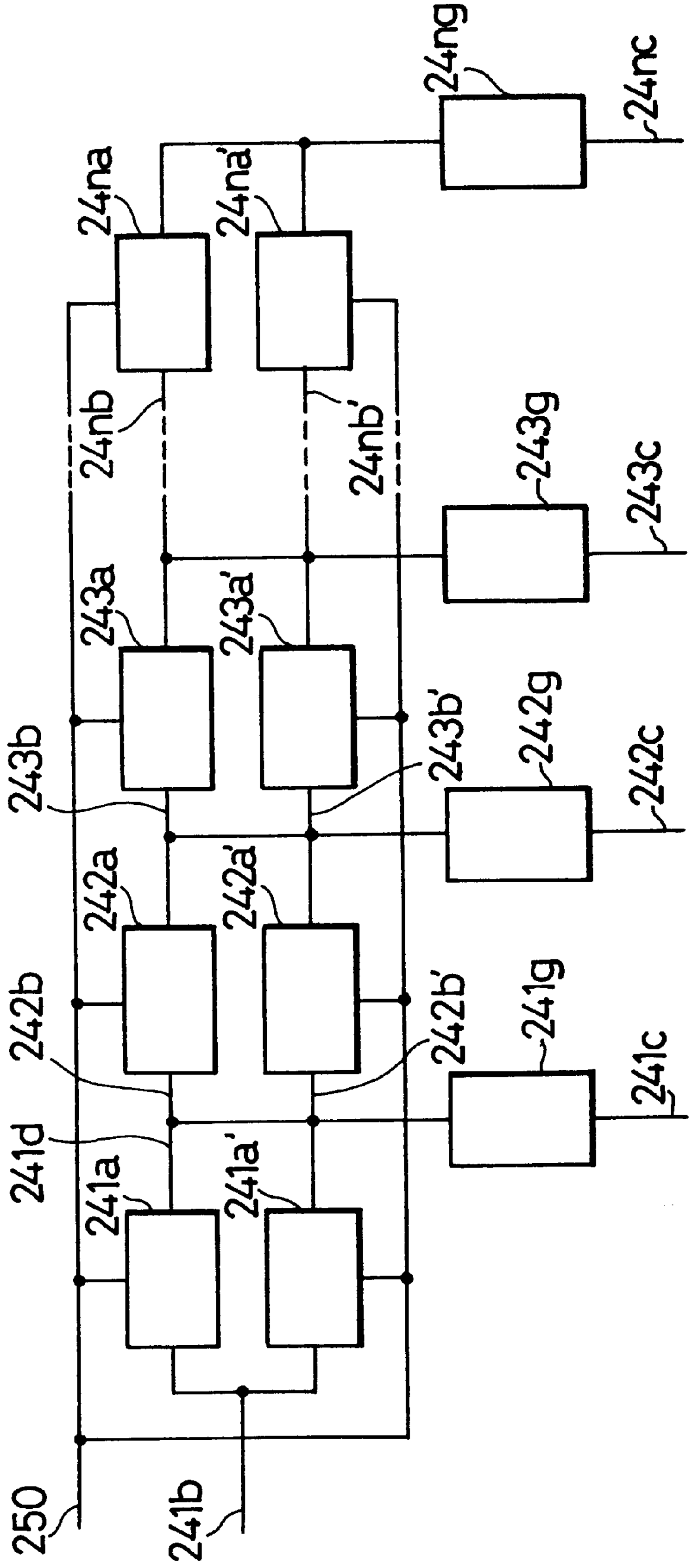
FIG. 7 is a block diagram showing another example of the conventional matrix type image display apparatus.

Referring to FIG. 5, the following description will discuss the second embodiment in accordance with the present invention. Hereinafter, like components are labeled with like reference numerals with respect to the above embodiment, and the description of these components is not repeated for the explanation's convenience.

Unit circuits that do not have to input their outputs to another, such as the buffer circuits and sample holding circuits, can be structured as shown in FIG. 1(*a*) of the first embodiment. However, unit circuits that have to input their outputs to another, such as the scanning circuits, must be structured as shown in FIG. 5.

As shown in the drawing, one group comprises four standard unit circuits 41*a*–44*a* and their backup unit circuit 45*a*. Standard unit circuit 41*a* is connected to a scanning signal line 41*b* in the input side, and the other standard unit circuits 42*a*–44*a* are respectively connected to scanning signal lines 42*b*–44*b* having their respective signal output switches 1*d*–3*d*, so that standard unit circuits 42*a*–44*a* receive outputs from their respective preceding standard unit circuits through scanning signal lines 42*b*–44*b*, respectively. A scanning signal line 45*b* having a signal output switch 4*d* is connected to an output side of the standard unit circuit 44*a*. Signal output lines 41*c*–44*c* are provided immediately after signal output switches 1*d*–4*d* on scanning signal lines 42*b*–45*b*.

In addition, signal input switches 1*e*–4*e* and output signal switches 1*f*–4*f* are provided to connect backup unit circuit 45*a* to standard unit circuits 41*a*–44*a* individually, so that, when any of standard unit circuits 41*a*–44*a* fails, a pulse signal will be sent sequentially by bypassing the failing one. In other words, the input side of backup unit circuit 45*a* is connected to scanning signal line 41*b* through signal input switch 1*e*. Likewise, backup unit circuit 45*a* is connected to scanning signal lines 42*b*–44*b* through signal input switches 2*e*–4*e*, respectively. The output side of backup unit circuit 45*a* is connected to signal output lines 41*c*–44*c* through signal output switches 1*f*–4*f*, respectively. Also, a clock signal is inputted into standard unit circuits 41*a*–44*a* and backup unit circuit 45*a* individually through a timing control signal line 46.

Assume that standard unit circuit 42*a* fails, then signal output switch 2*d* is turned off while signal input switch 2*e* and signal output switch 2*f* are turned on. As a result, standard unit circuit 42*a* is isolated from the driving circuit and backup unit circuit 45*a* is connected to standard unit circuit 43*a* to serve as its replacement. In short, the output from standard unit circuit 41*a* is not inputted into standard unit circuit 42*a* but backup unit circuit 45*a*, while the output form backup unit circuit 45*a* is outputted through signal output line 42*c*.

Each switch is structured and connected and disconnected in the same manner as the first embodiment, and the explanation thereof is omitted herein.

The present invention is applicable to a wide range of circuits from logical circuits such as the shift registers to analogue circuits such as buffer circuits. The present invention is particularly effective to a display apparatus whose image display section and driving circuit are formed on a signal substrate using high-performance element such as SiTFT, because a fault ratio of the driving circuit alone can be reduced.

As has been explained, the driving circuit of the matrix type image display apparatus includes a plurality of unit circuits whose function and structure are identical, and the plurality of the unit circuits are divided into a set of groups each including the standard unit circuits and backup unit circuit. The standard unit circuits activate the driving circuit when all the plurality of unit circuits are operable, and when any of the standard unit circuits fails, the failing standard unit circuit is switched to the backup unit circuit which is usually isolated from the driving circuit. Each standard unit circuit includes disconnecting means for disconnecting the failing standard unit circuit from the driving circuit, and the backup unit circuit includes connecting means for connecting the backup unit circuit to the signal lines that transfer the output from and input into any of the standard unit circuits without being disconnected by the disconnecting means, whereby the failing standard unit circuit is switched to the backup unit circuit.

According to this structure, the driving circuit of the matrix type image display apparatus includes a plurality of groups each having the backup unit circuit. Thus, when any of the standard unit circuits in the group fails, the failing one can be switched to the backup unit circuit, thereby enabling the driving circuit to operate as if there were no fault. As a result, the conforming ratio can be increased.

Moreover, since the backup unit circuit can be connected to any of the standard unit circuits in the same group in the event a fault occurs, a ratio of the backup unit circuits to the standard unit circuits in number within the group can be set in accordance with the conforming ratio of the unit circuit. Thus, the driving circuit as a whole can maintain a high overall conforming ratio while reducing the number of idle backup unit circuits.

Further, let the conforming ratio of the unit circuit be x and the number of the standard unit circuits in one group be m, then the number of the backup unit circuits in the group is n such that satisfies $n \geqq m \cdot (1-x)/x$.

When a group is formed in this manner, the overall conforming ratio of the driving circuit can be enhanced by determining the number of the backup unit circuits in the group regardless of a value of x. Accordingly, the manufacturing efficiency can be enhanced while the manufacturing costs can be slashed.

The substrate of the driving circuit may include switching means that connects and disconnects a signal line, which is formed on a single substrate together with the unit circuits, when the state of a material making up the signal line changes as thermal energy is conferred thereto.

Alternatively, the substrate of the driving circuit may include switching means that connects and disconnects a signal line, which is formed on a single substrate together with the unit circuits, through film-forming and etching processes.

According to these structures, the switching means is formed on substrate together with the driving circuit. Thus, the switching action from the standard unit circuit to the backup unit circuit by the switching means can be easily incorporated into the assembling line, thereby making the assembling line more flexible.

The driving circuit may include switching means for connecting and disconnecting the signal line by turning on or off the active elements formed on the substrate together with the unit circuits and signal lines. Further, a memory element may be provided to store the data as to the control of the ON/OFF action of the switching means.

According to these structures, the standard unit circuit is switched to the backup unit circuit by the active elements. Thus, either a wire connecting the signal line and power source line that control the ON/OFF action of the active elements is disconnected, or the ON/OFF data are stored into the memory element that outputs a signal to the signal line controlling the ON/OFF action of the active elements. In other words, the unit circuits can be switched through a signal process: the disconnection of the wire, or writing of the data into the memory element. In consequences, the manufacturing efficiency can be enhanced.

Third Embodiment

Referring to FIGS. 8 through 11, the following description describes an example third embodiment in accordance with the present invention.

Figure 8A:
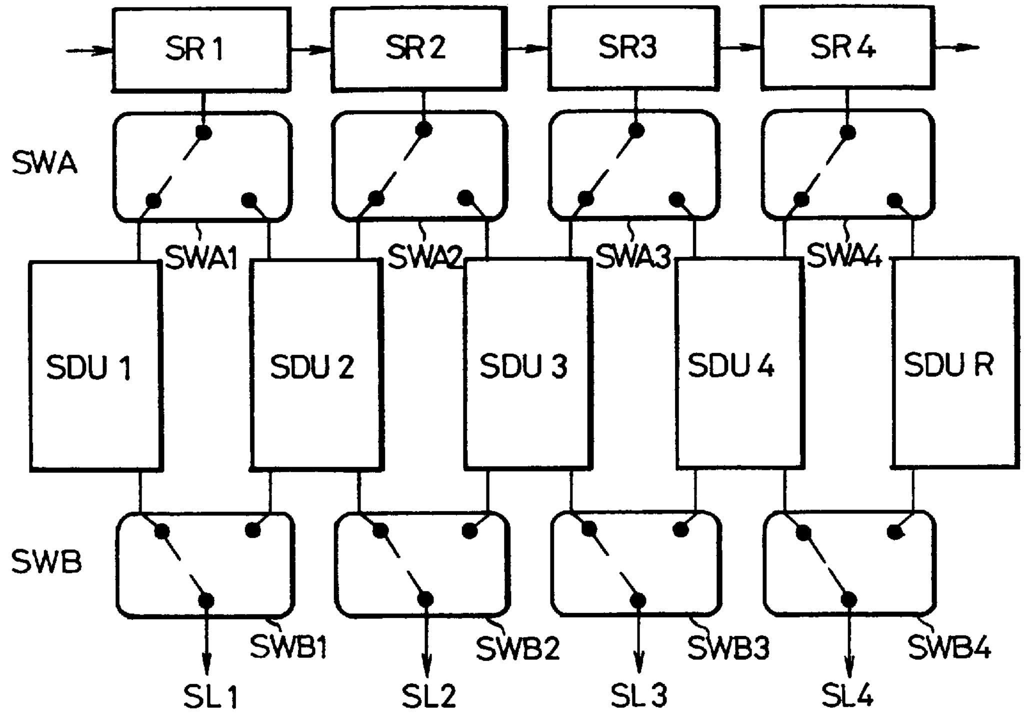
FIG. 8(*a*) is a block diagram depicting an initial structure of a block in a data signal line driving circuit of a matrix type image display apparatus in accordance with the third embodiment of the present invention.
Figure 8B:
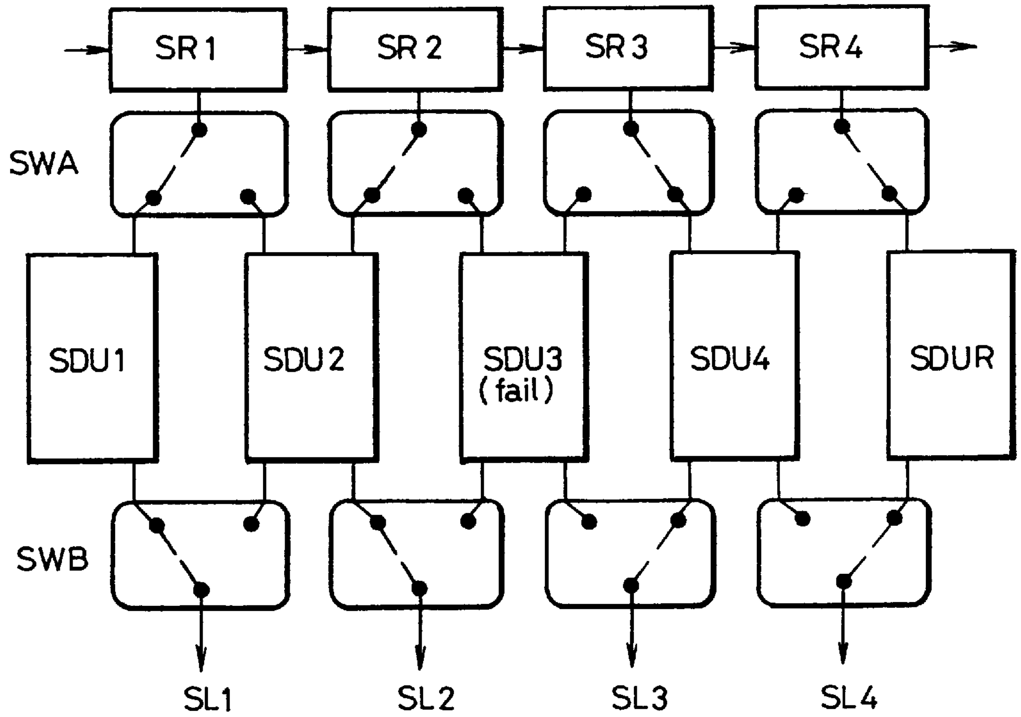

FIG. 8(*a*) is a view showing an exemplar structure of a data signal line driving circuit of a matrix type image display apparats in accordance with the present invention, and shows a block therein. The driving circuit of the present embodiment comprises four shift registers SR1–SR4 (which are collectively referred to as SR), four regular video signal output circuits SDU1–SDU4 (which are collectively referred to as SDU), one backup video signal output circuit SDUR, four switch circuits SWA1–SWA4 (which are collectively referred to as SWA), and four switch circuits SWB1–SWB4 (which are collectively referred to as SWB).

Figure 32:
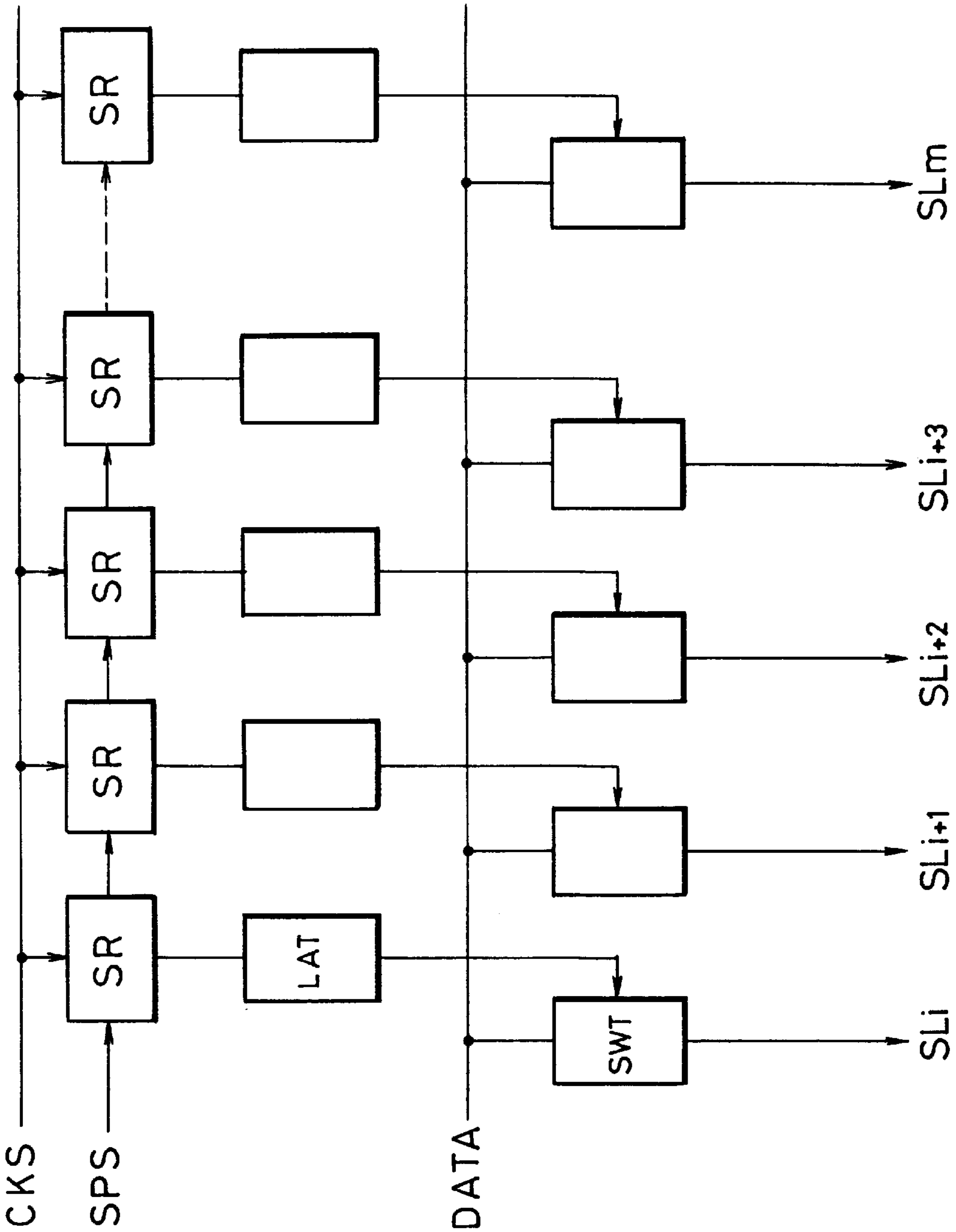
FIG. 32 is a block diagram depicting a structure of a data signal line driving circuit driven by the dot sequential driving system in a conventional matrix type image display apparatus.
Figure 33:
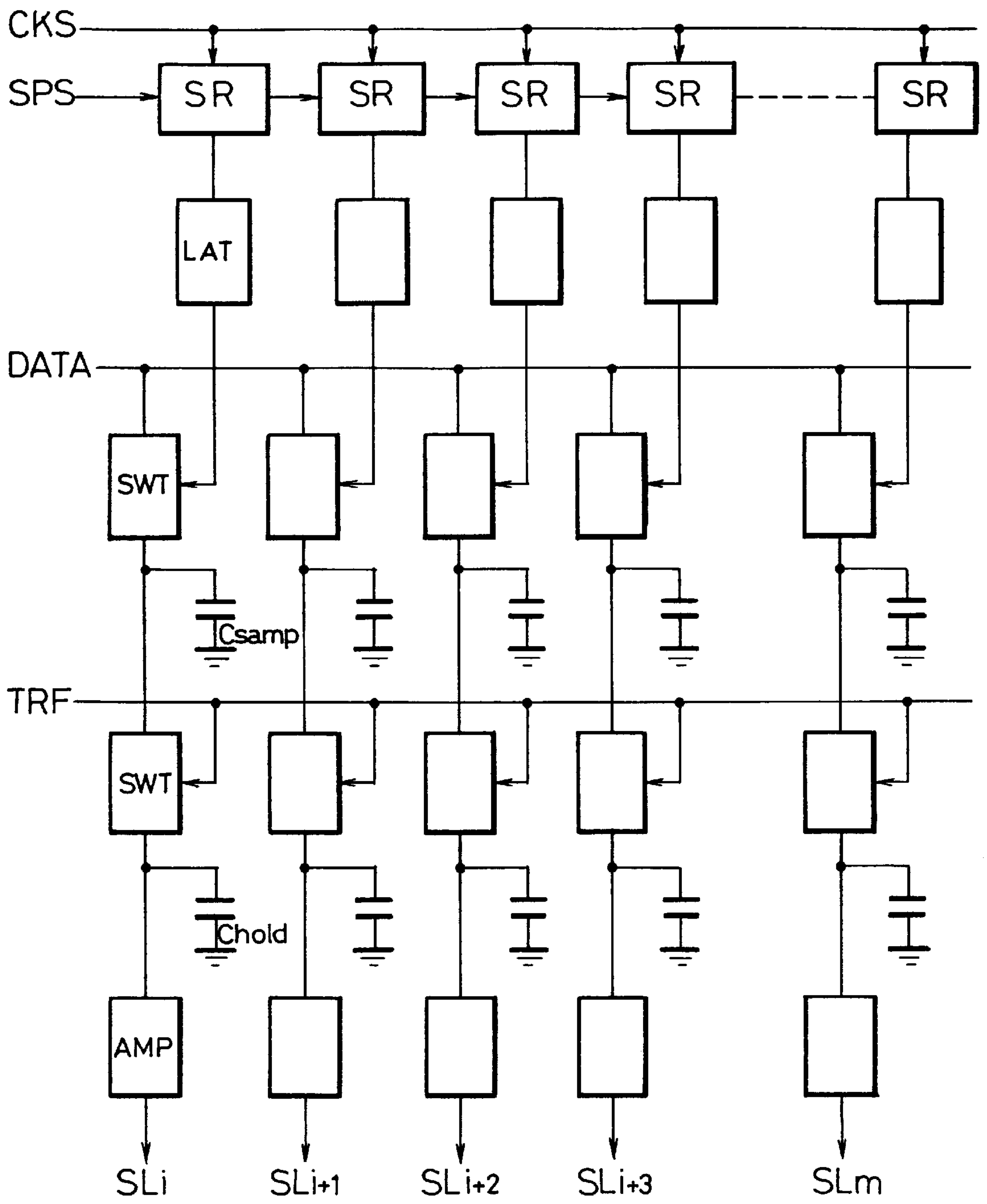
FIG. 33 is a block diagram depicting a structure of a data signal line driving circuit driven by the line sequential driving system in a conventional matrix type image display apparatus.
Figure 34B:
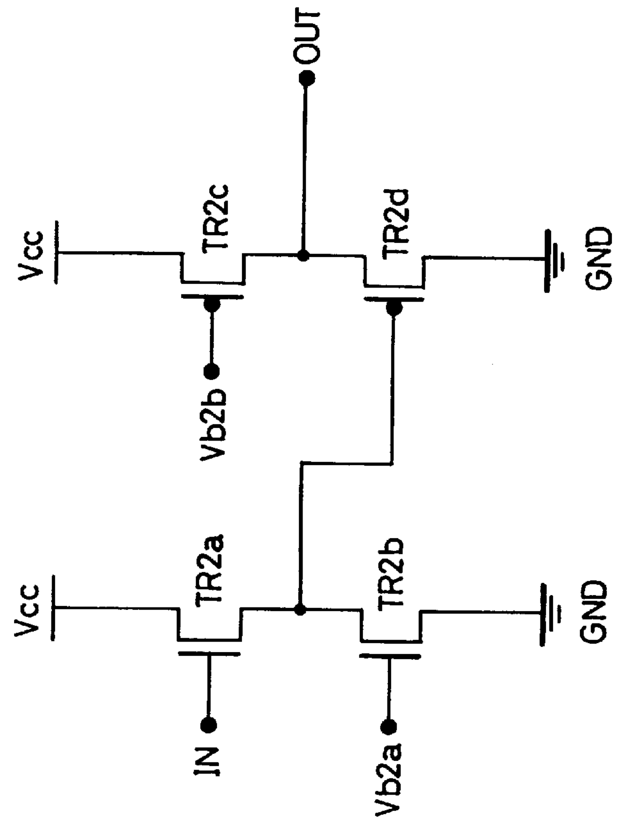
FIGS. 34(*a*) and 34(*b*) are schematic circuit diagrams showing structures of an amplifier circuit in the data signal line driving circuit of FIG. 33.
Figure 34A:
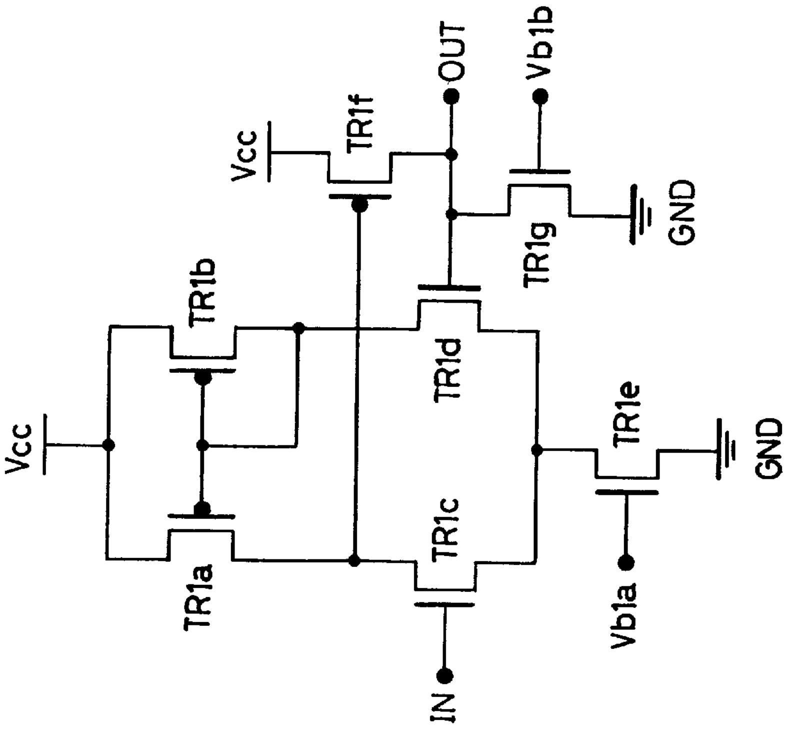

Regular video signal output circuits SDU and backup video signal output circuit SDUR correspond to the components in the data signal line driving circuits excluding shift registers SR. To be more specific, these video signal output circuits are latch circuits LAT and sampling switches SWT in the data signal line driving circuit of FIG. 32, and latch circuits LAT, sampling switches SWT, and amplifier circuits AMP in the data signal line driving circuit of FIG. 33, which were referred to in the prior art column.

Switch circuits SWA control the connection between shift registers SR and the video signal output circuits. More specifically, switch circuit SWA1 controls the switching action between regular video signal output circuits SDU1 and SDU2, and connects one of them to shift register SR1. Likewise, switch circuits SWB controls the connection between data signal lines SL1–SL4 (which are collectively referred to as SL) and the video signal output circuits. More specifically, switch circuit SWB1 controls the switching action between regular video signal output circuits SDU1 and SDU2, and connects one of them to data signal line SL1.

As shown in FIG. 8(*a*), when there is no fault, all of the outputs from shift registers SR are inputted into regular video signal output circuits SDU through switch circuits SWA, respectively, and data signal lines SL are connected to regular video signal output circuits SDU through switch circuits SWB, respectively. Thus, none of shift registers SR and data signal lines SL is connected to backup video signal output circuit SDUR.

On the other hand, as shown in FIG. 8(*b*), when there is a fault in, for example, regular video signal output circuit SDU3, the failing video signal output circuit SDU3 is isolated from its corresponding shift register SR3 and data signal line SL3, and regular video signal output circuit SDU4 beyond the failing regular video signal output circuit SDU3 is re-connected to shift register SR3 and data signal line SL3 which have been connected to its preceding regular video signal output circuit SDU3 through switch circuits SWA3 and SWB3. Further, the backup video signal output circuit SDUR placed in the bottom of the block is also connected to corresponding shift register SR4 and data signal line SL4.

Thus, the circuit units beyond the fault are switched to their adjacent circuit units, respectively, thereby enabling the block to maintain its function.

Next, the structure of switch circuits SWA and SWB of FIG. 8(*a*) will be explained in a more specific manner with reference to FIG. 9.

Control signals of switch circuits SWA and SWB are generated by four fuses FUS1–FUS4 (which are collectively referred to as FUS) and a resistance element RES which are serially interposed between a power source VCC and a grounding GND. Fuses FUS are usually turned on, and turned off only when a treatment (e.g., laser beams) is applied externally.

Figures 11A, 11B, 11C, 11D, 11E, 11F:
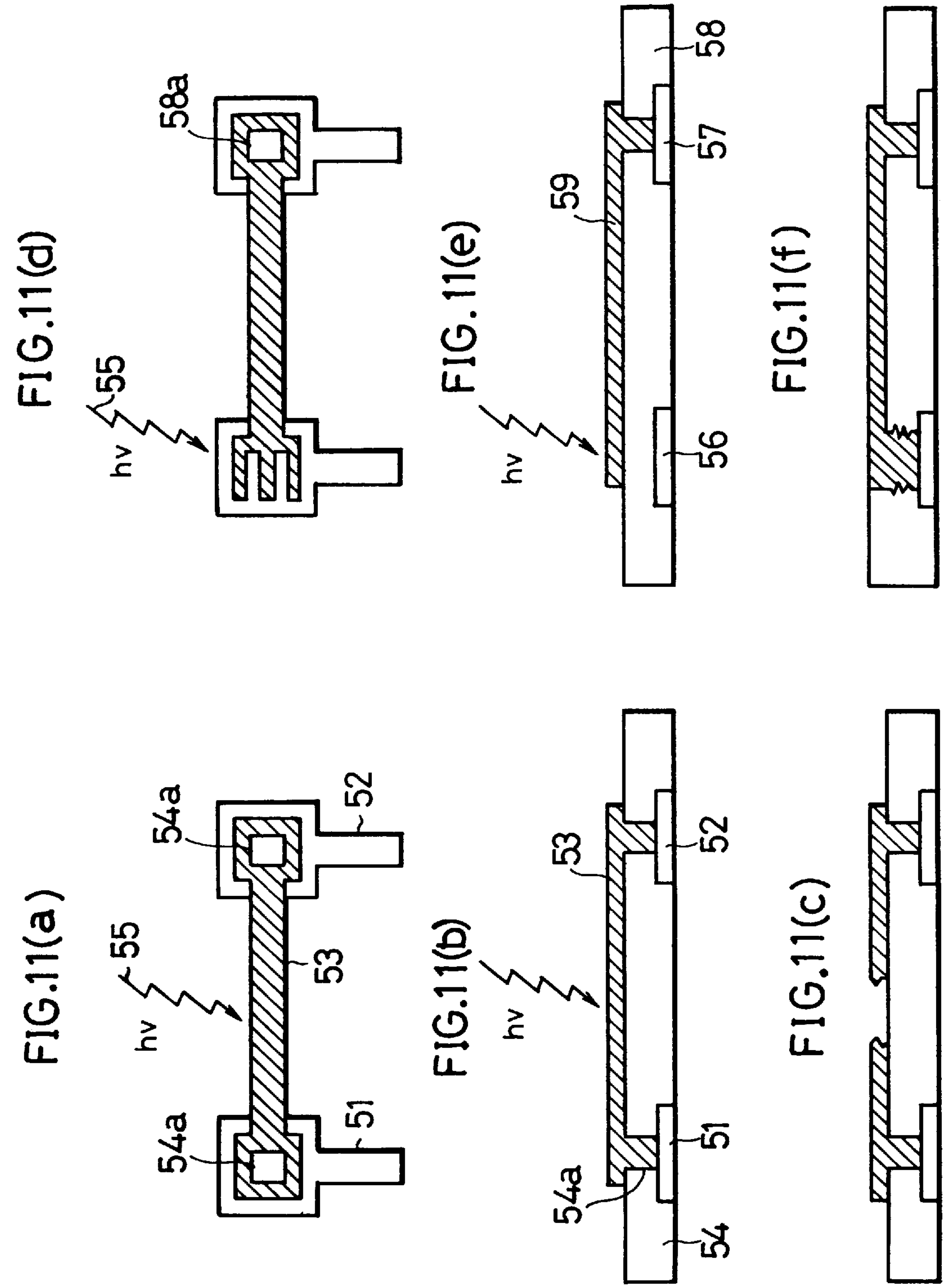
FIGS. 11(*a*) through 11(*c*) are views explaining a structure of a fuse.

Fuses FUS are actually made of metal wires (generally, metal wires on the top layer) in easily-cut length and width as shown in a plan view and a front view in FIGS. 11(*a*) and 11(*b*), respectively. To be more specific, each fuse comprises metal wires 51 and 52 on which an insulting film 54 and a metal wire 53 are laminated in this order. Contact holes **54*a* and 54*a* are respectively made through insulating film 54 overlying the top ends of metal wires 51 and 52, so that metal wires 51 and 52 and metal wires 53** are connected to each other.

Each fuse is turned off when metal wire 53 is disconnected as shown in FIG. 11(*c*) as it sublimes and evaporates through irradiation of laser beam 55. Note that Fuses FUS are placed apart from the other elements (e.g., transistors) so as not to affect their properties when they are disconnected.

Figure 9:
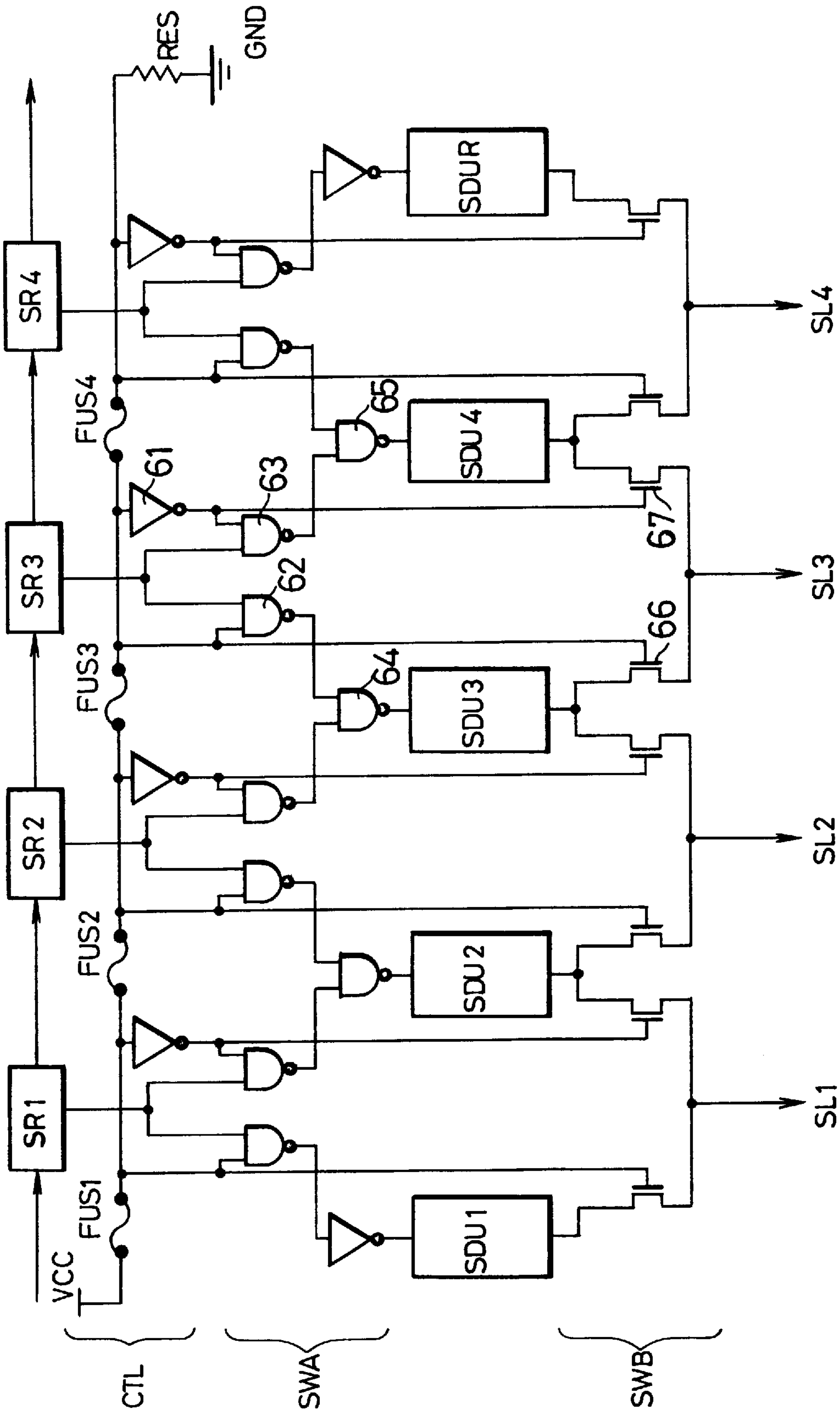
FIG. 9 is a block diagram showing the above data signal line driving circuit in a more specific manner.

As shown in FIG. 9, each of switch circuits SWA, which control the connection between shift registers SR and video signal output circuits SDU and SDUR, comprises an inverter circuit and NAND (negative AND) circuits. Each of switch circuits SWB, which control the connection between video signal output circuits SDU and SDUR and data signal lines SL, comprises a transfer gate. For example, switch circuit SWA3 comprises an invertor circuit 61 and NAND circuits 62–65, while switch circuit SWB3 comprises switching elements 66 and 67.

According to the above structure, no fuses FUS are turned off when none of video signal output circuits SDU has a fault. Thus, all the control signals will have a high level due to resistance element RES. Under these conditions, all shift registers SR and data signal lines SL are connected to their respective video signal output circuits SDU.

For example, the output from shift register SR3 is inputted into regular video signal output circuit SDU3 through NAND circuits 62 and 64 and into regular video signal output circuit SDU4 through NAND circuits 63 and 65. The output from one of regular video signal output circuits SUD3 and SUD4 is inputted into switching element 66 and 67, respectively. Here, invertor circuit 61 makes the level of the gate of switching element 66 high whereas that of the gate of switching element 67 low. Thus, the output from shift register SR3 is outputted to data signal line SL3 through regular video signal output circuit SDU3.

On the other hand, when video signal output circuits SDU3 fails, a corresponding fuse (the third one from the left) is turned off. Accordingly, the control signals beyond the disconnected portion will have a low level. In other words, the level of the gate of switching element 66 becomes low while that of switching element 67 becomes high. Thus, the output from shift register SR3 is outputted from regular video signal output circuit SDU4.

That is to say, shift registers SR1 and SR2 and data signal lines SL1 and SL2 ahead of the disconnected portion are connected to video signal output circuits SDU1 and SDU2, respectively, whereas shift registers SR3 and SR4 and signal lines SL3 and SL4 beyond the disconnected portion are connected to video signal output circuits SDU4 and SDUR.

As has been explained, even there is a fault in any of video signal output circuits SDU, the block in the data signal line driving circuit can operate as if there were no faults.

The switching element in FIG. 9 is an n-channel transistor. However, in terms of the driving power, the most preferred structure for the switching element of switch circuit SWB transferring transfers a video signal is the CMOS structure in which an n-channel transistor and a p-channel transistor are connected in parallel. The same can be the in the following embodiments.

Figure 10:
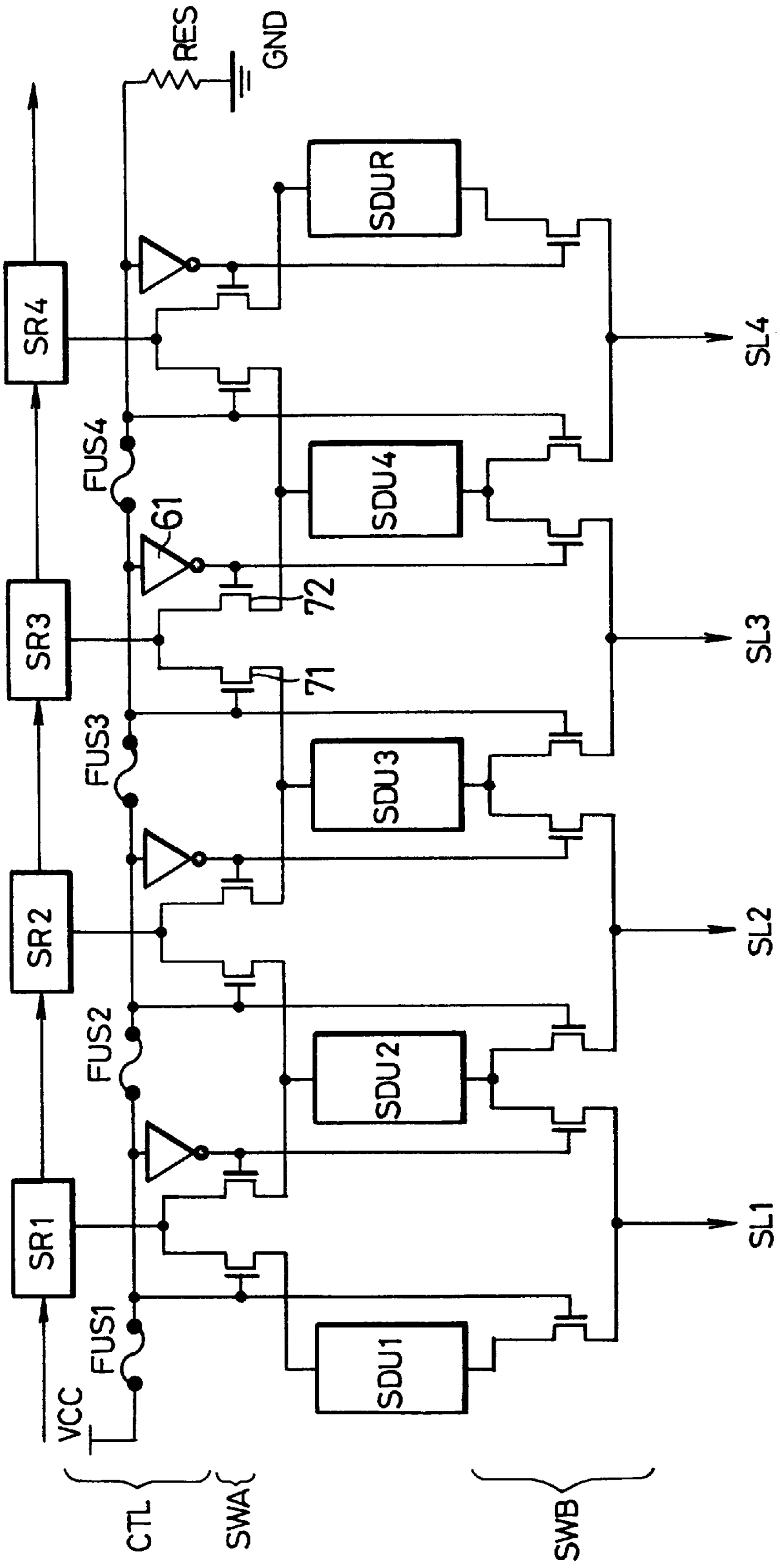
FIG. 10 is another block diagram showing the above data signal line driving circuit in a more specific manner.

Next, another exemplar structure of switch circuits SWA and SWB of FIG. 8(*a*) will be explained in a more specific manner with reference to FIG. 10.

The control signals from switch circuits SWA and SWB and their operating principles are identical with those explained with reference to FIG. 9, and the explanation thereof is omitted herein.

Switch circuits SWA and SWB are made of transfer gates. More specifically, in switch circuit SWA3, a switching element 71 and a switching element 72 replace with the NAND circuits 62 and 64 and NAND circuits 63 and 65 of FIG. 9, respectively. The structure of the rest is identical with that of FIG. 9.

In this embodiment, it is a fault in video signal output circuits SDU only that can be troubleshooted (the faults in the scanning circuits such as the shift registers or the like can not be troubleshooted). However, since most of the space in a typical data signal driving circuit is occupied by regular video signal output circuits SDU, regular video signal output circuits SDU have considerably high probabilities of faults, and introducing the redundant technique to the regular video signal output circuits SDU alone is sufficiently effective. The redundant technique for the shift register section will be explained in the fourth embodiment. Alternatively, the present embodiment may be combined with a technique disclosed in Japanese Laid-Open Patent Application No. 6-83286(1994).

Fourth Embodiment

Figure 12A:
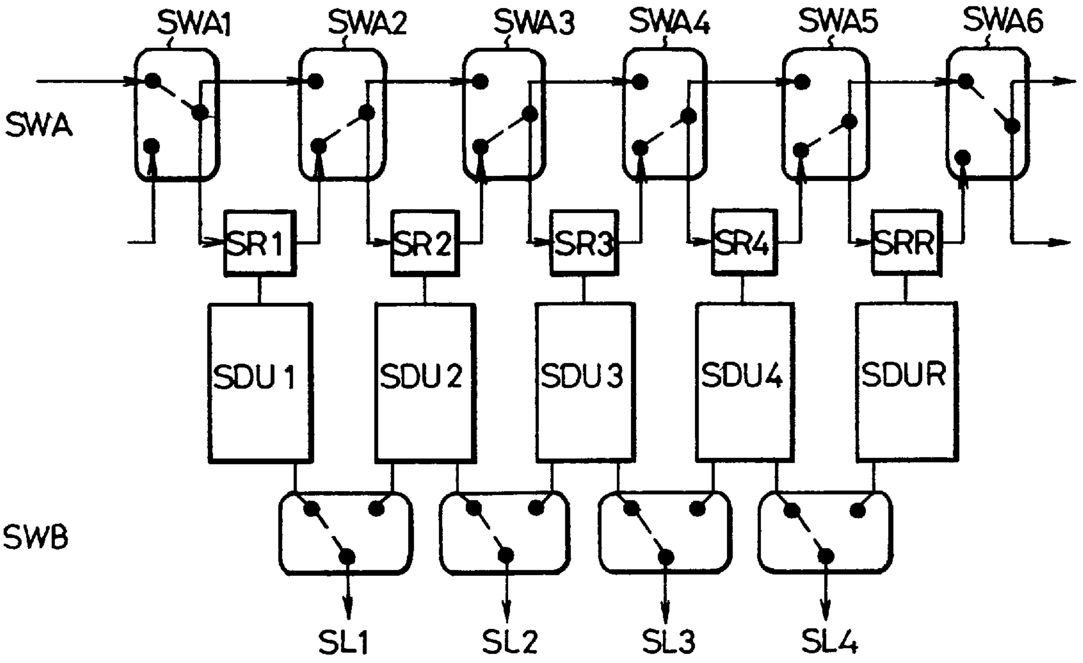
FIG. 12(*a*) is a block diagram depicting an initial structure of a block in a data signal line driving circuit of a matrix type image display apparatus in accordance with the fourth embodiment of the present invention.
Figure 12B:
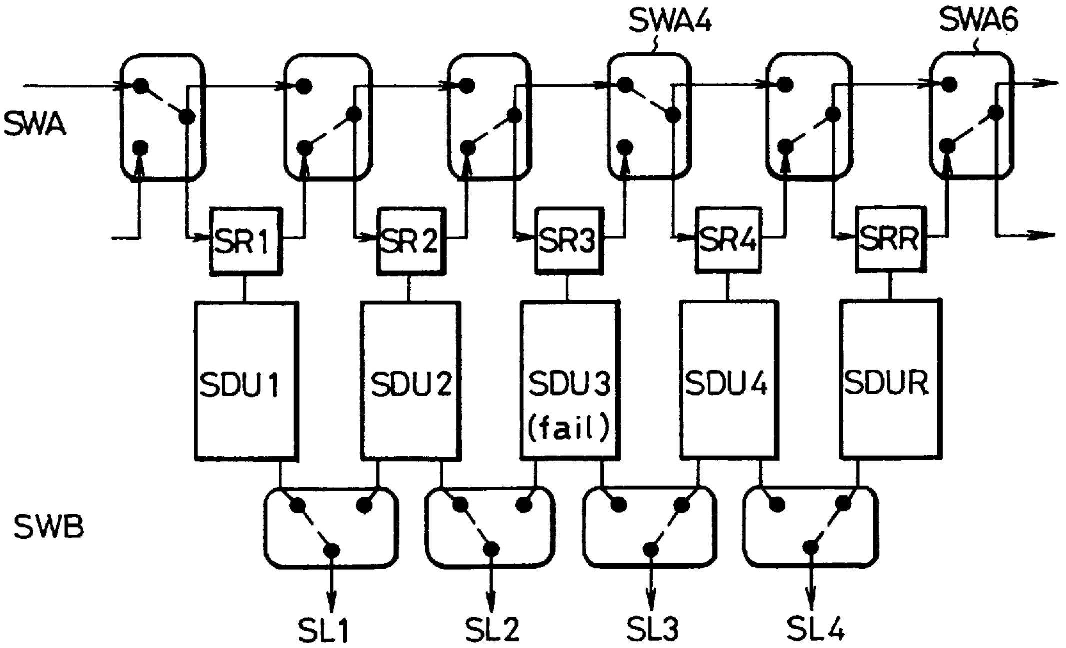
Figure 13:
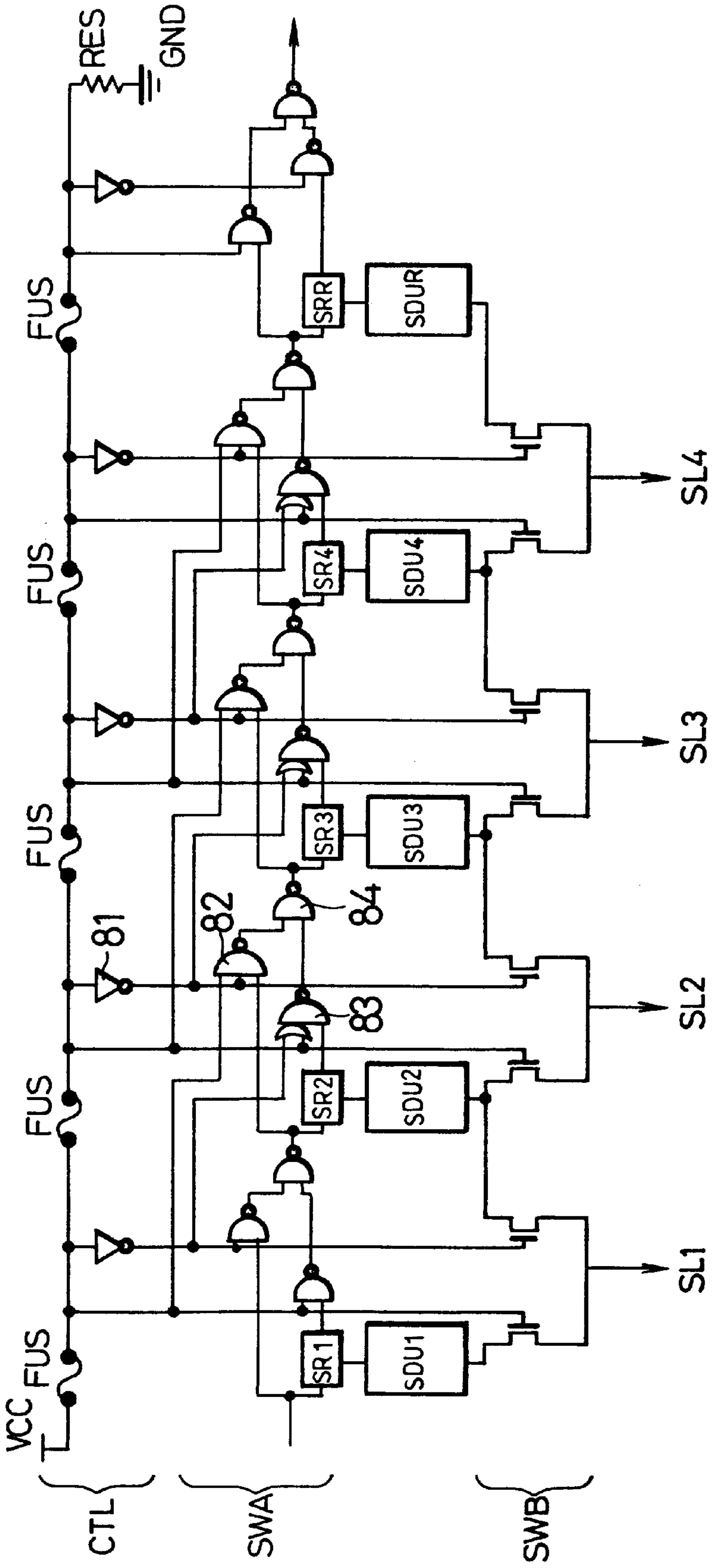
FIG. 13 is a block diagram showing the above data signal line driving circuit in a more specific manner.
Figure 14:
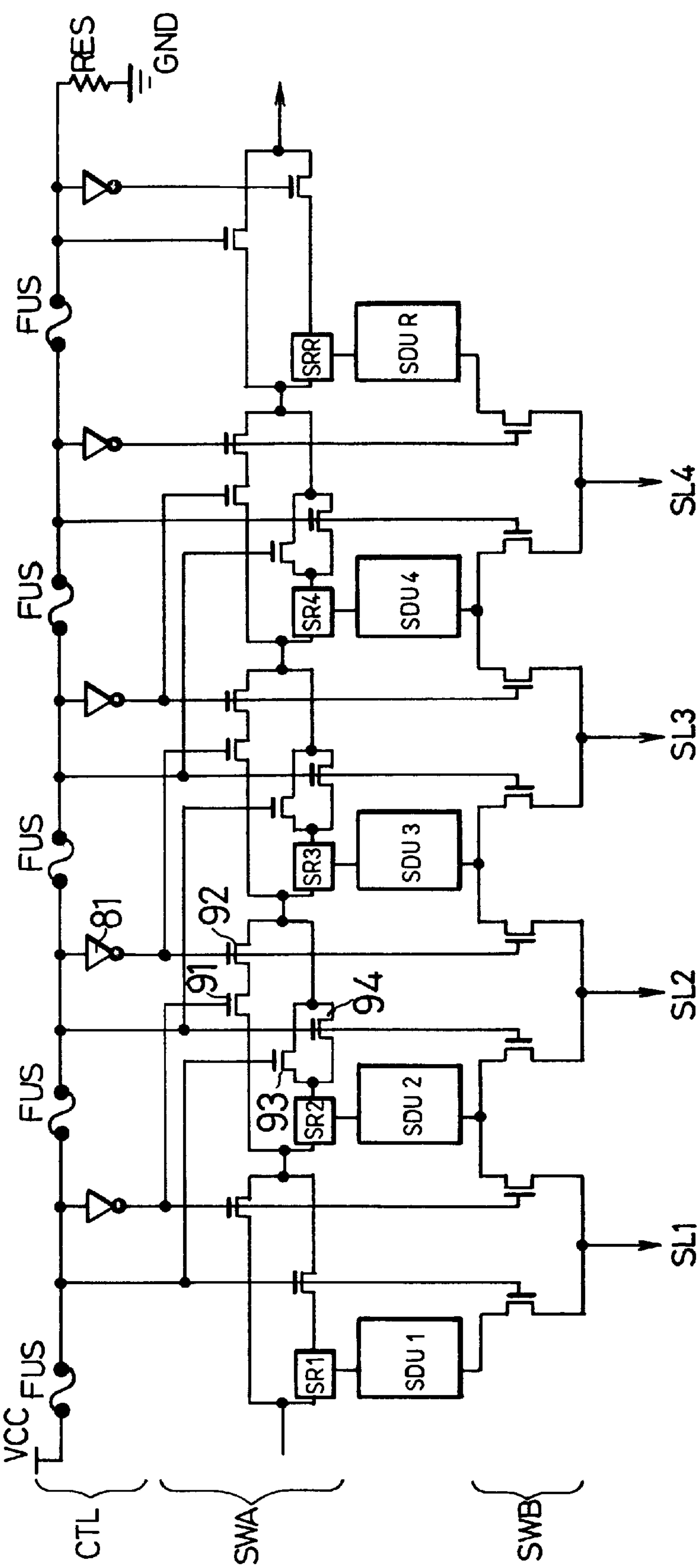
FIG. 14 is another block diagram showing the above data signal line driving circuit in a more specific manner.

Referring to FIGS. 12 through 14, the following description describes an example fourth embodiment in accordance with the present invention. Hereinafter, like components are labeled with like reference numerals with respect to the above embodiments, and the description of these components is not repeated for the explanation's convenience.

FIG. 12(*a*) is a view showing another exemplar structure of the data signal driving circuit in the matrix type image display apparatus in accordance with the present invention and shows a block therein. In this embodiment, a block comprises four regular shift registers SR1–SR4, one backup shift register SRR, four regular video signal output circuits SDU1–SDU4, one backup video signal output circuit SDUR, six switch circuits SWA1–SWA6, and four switch circuits SWB1–SWB4.

Like the third embodiment, regular video signal output circuits SDU1–SDU4 and backup video signal output circuit SDUR in FIG. 12(*a*) correspond to the components of the data signal line driving circuit excluding the shift registers SR, and each shift register is fixedly connected to their respective video signal output circuits.

When there is no fault as shown in FIG. 12(*a*), all regular shift registers SR1–SR4 are activated and backup shift register SRR is interlaced-scanned. All data signal lines SL1–SL4 are connected to their respective regular video signal output circuits SDU1–SDU4 which are connected to regular shift registers SR1–SR4, respectively. Thus, none of data signal lines SL1–SL4 is connected to backup video signal output circuit SDUR.

On the other hand, when either regular shift register SR3 or regular video signal output circuit SDU3 fails as shown in FIG. 12(*b*), failing regular shift register SR3 is interlaced-scanned by switching switch circuit SWA4 and backup shift register SRR is incorporated into the driving circuit by switching switch circuit SWA6. At the same time, regular video signal output circuit SDU4 and backup video signal output circuit SDUR beyond the fault are reconnected to data signal line SL3 and connected to data signal line SL4 by switching switch circuits SWB3 and SWB4, respectively.

In other words, when any of regular shift registers SR1–SR4 or regular video signal output circuit SDU1–SDU4 fails, the failing shift register or the shift register connected to the failing video signal output circuit is interlaced-scanned. At the same time, the regular video signal output circuits beyond the fault are re-connected to the data signal lines SLs which have been connected to their preceding regular video signal output circuits respectively. Further, backup shift register SRR is activated and backup video signal output circuit SDUR placed in the bottom is connected to the corresponding data signal line.

As has been explained, the failing circuit unit is interlaced-scanned and the circuit units beyond the fault are switched to their respective adjacent circuit units, thereby enabling the block to maintain its function.

Next, the structure of the switch circuits SWA and SWB of FIG. 12(*a*) will be explained in a more specific manner with reference to FIG. 13, although switch circuit SWA1 is omitted in the drawing.

Like the third embodiment, the control signals of switch circuits SWA and SWB are generated by a plurality of fuses FUS and resistance RES which are serially interposed between power source VCC and grounding GND.

Each of switch circuits SWA controlling the interlaced-scanning of shift registers SR1–SR4 and SRR comprises an invertor circuit, NAND (negative AND) circuits, and an OR-NAND (logical OR/negative AND) circuit. For example, switch circuit SWA3 includes an invertor circuit 81, NAND circuits 82 and 84, and an OR-NAND circuit 83.

Each of switch circuits SWB controlling the connection between video signal output circuits SDU1–SDU4 and SDUR and data signal lines SL1–SL4 comprises a transfer gate like in the third embodiment.

According to the above structure, when there is no fault in shift registers SR1–SR4 or video signal output circuits SDU1–SDU4, no fuses FUS are turned off. Thus, all the control signals will have a high level due to resistance element RES. Under these conditions, all regular shift registers SR1–SR4 operate normally, and backup shift register SRR is interlaced-scanned. Data signal lines SL1–SL4 are connected to regular video signal output circuits SDU1–SDU4 in their left, and thus none of data signal lines SL1–SL4 is connected to the backup video signal output circuit SDUR.

On the other hand, when either regular shift register SR3 or video signal output circuit SDU3 fails, the corresponding fuse FUS is turned off, so that the control signals beyond the fault will have a low level. Accordingly, shift register SR3 corresponding to the fault is interlaced-scanned, and backup shift register SRR is activated. Also, data signal line SL3 which has been connected to the disconnected portion is re-connected to regular video signal data output circuit SDU4, while data signal line SL4 beyond the disconnected portion is reconnected to video signal output circuit SDU or SDUR (herein video signal output circuit SDUR).

As has been explained, the block in the data signal line driving circuit can operate normally when any of the shift registers or video signal output circuits fails.

Next, another exemplar structure of the switch circuits SWA and SWB of FIG. 12(*a*) will be explained with reference to FIG. 14.

The control signals of switch circuits SWA and SWB and their operating principles are identical with those explained with reference to FIG. 13.

Each of switch circuits SWA controlling the interlaced-scanning of the shift registers SR1–SR4 and SRR and switch circuits SWB controlling the connection between video signal output circuits SDU1–SDU4 and SDUR and signal data lines SL1–SL4 comprises a transfer gate. For example, switch circuit SWA3 comprises four switching elements 91–94 instead of the NAND circuits 82 and 84 and OR-NAND circuit 83 of FIG. 13.

As has been explained, the faults not only in the video signal output circuits but also in the scanning circuits (shift registers) can be troubleshooted in the present embodiment, thereby further increasing the troubleshooting ratio.

Fifth Embodiment

Figure 15:
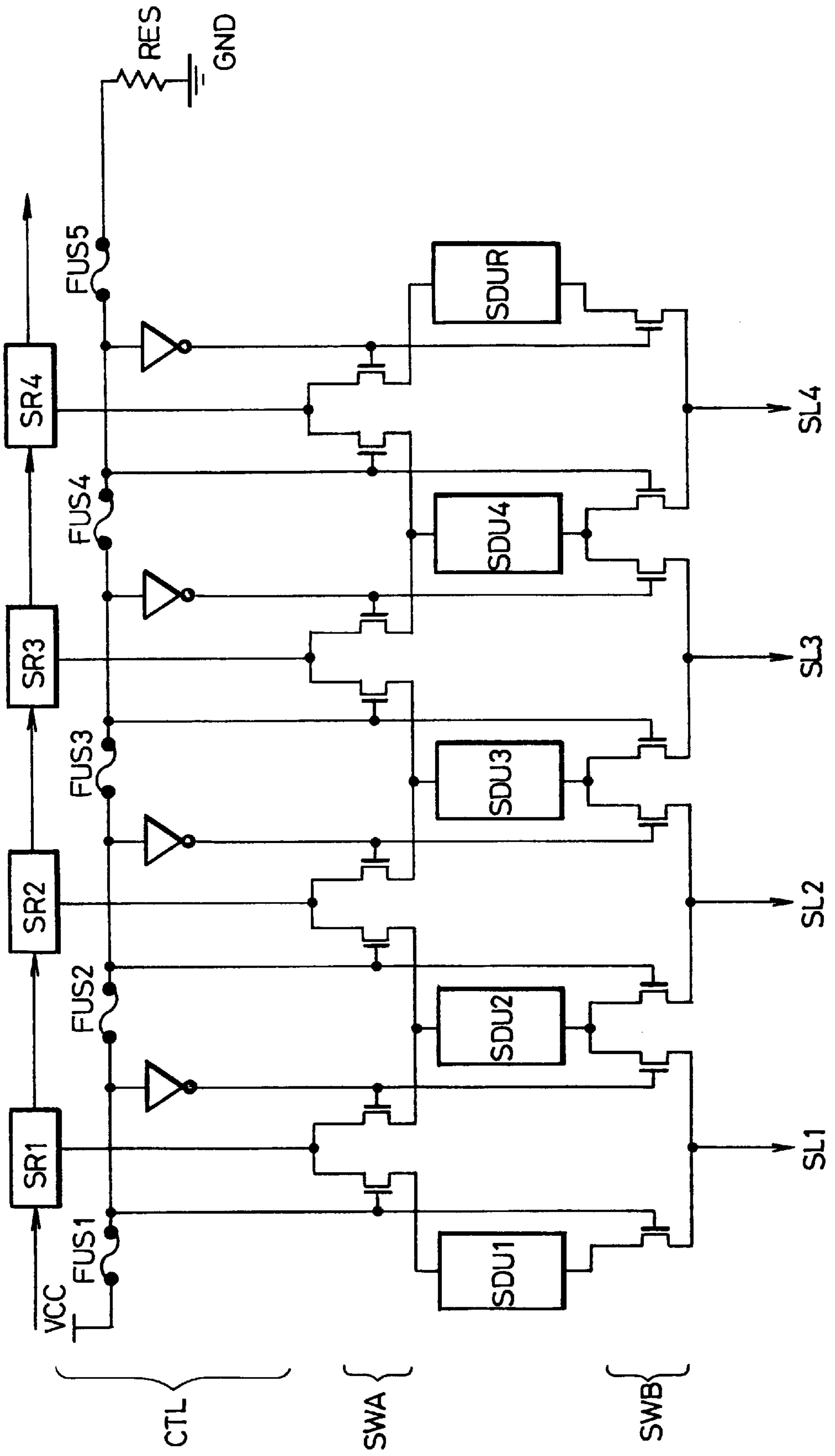
FIG. 15 is a block diagram depicting a structure of a block in a data signal line driving circuit of a matrix type image display apparatus in accordance with the fifth embodiment of the present invention.

Referring to FIG. 15, the following description describes an example fifth embodiment in accordance with the present invention. Hereinafter, like components are labeled with like reference numerals with respect to the above embodiments, and the description of these components is not repeated for the explanation's convenience. The fifth through eleventh embodiments will discuss modifications of the data signal line driving circuit.

FIG. 15 shows a block in a data signal line driving circuit of the present embodiment. The control means of the block comprises a plurality of fuses FUS and the resistance element RES which are serially interposed between power source VCC and grounding GND, and note that a fuse FUS5 is always placed adjacent to resistance element RES. In other words, the block additionally includes fuse FUS5 between the invertor circuit of switch circuit SWA4 and resistance element RES compared with the structure of FIG. 10.

When there is no fault in the above-structure block, fuse FUS5 adjacent to resistance element RES is turned off. Whereas when there is a fault in the block, one of fuses FUS is turned off without exceptions. Thus, no current path is established between power source VCC and grounding GND, and substantially no stationary current (through current) flows throughout the block, thereby making it possible to save the energy consumption.

Sixth Embodiment

Figure 16:
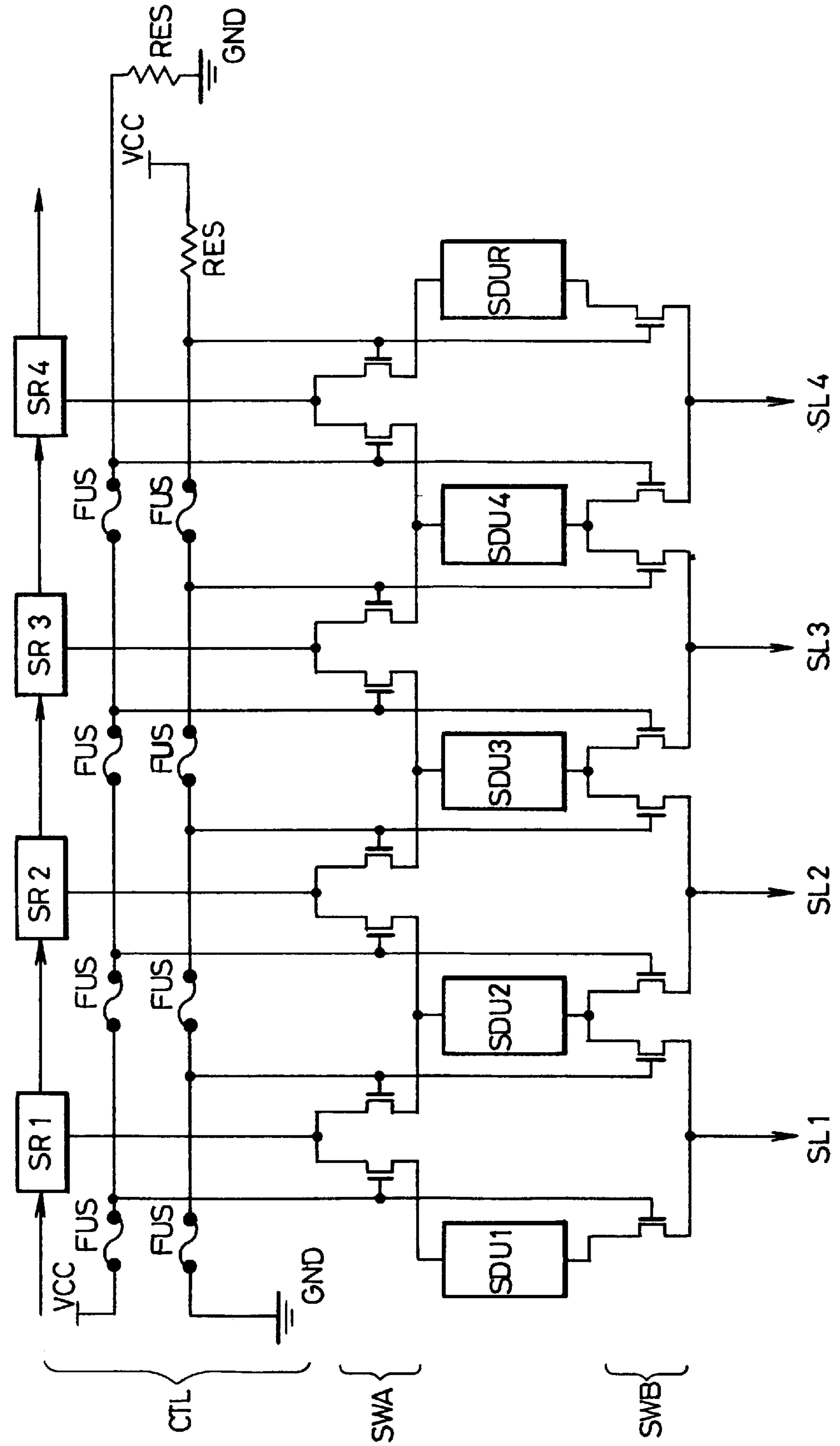
FIG. 16 is a block diagram depicting a structure of a block in a data signal line driving circuit of a matrix type image display apparatus in accordance with the sixth embodiment of the present invention.

Referring to FIG. 16, the following description describes an example sixth embodiment in accordance with the present invention. Hereinafter, like components are labeled with like reference numerals with respect to the above embodiments, and the description of these components is not repeated for the explanation's convenience.

FIG. 16 shows a block in a data signal line driving circuit of the present embodiment. The block includes two series of control means each comprising a plurality of fuses FUS and resistance element RES which are serially interposed between power source VCC and grounding GND. The two series have the electric potential directions reversed to each other.

Herein, a pair of fuses are turned off simultaneously to troubleshoot the fault. Providing two control means makes it possible to generate a control signal and an inverse signal thereof individually, thereby obviating the invertor circuit which generates an inverse signal. In other words, the control means can omit the transistor and comprise wires alone, which reduces the control mean's probabilities of being defective, and hence increases the troubleshooting ratio. Although a pair of fuses must be turned off simultaneously to troubleshoot one fault, they can be turned off through a single process (e.g., irradiation of laser beams) by arranging the shape or placement (e.g., placing the pair closer together or the like) of fuses FUS, thereby preventing an increase in the manufacturing costs.

Seventh Embodiment

Figure 17:
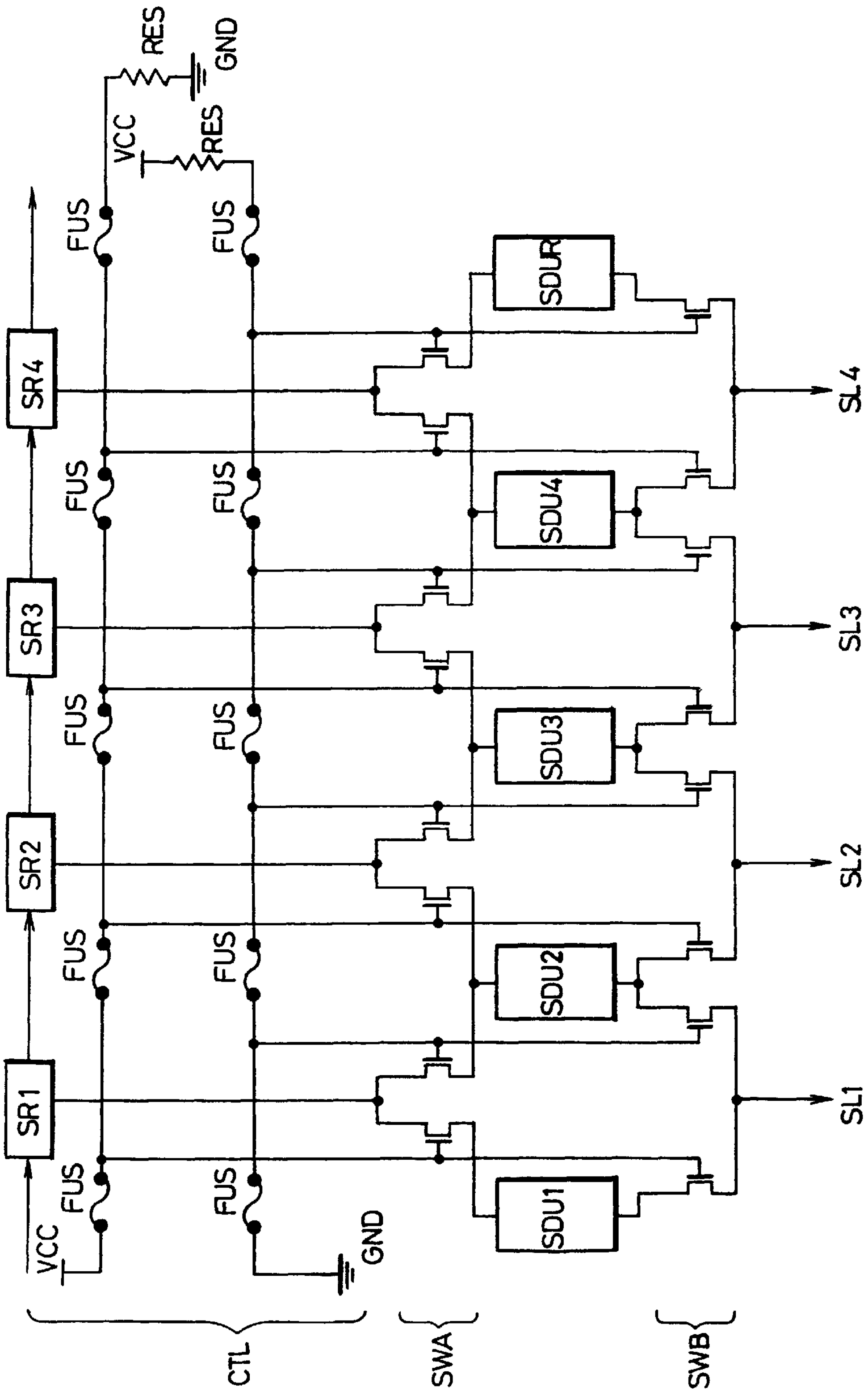
FIG. 17 is a block diagram depicting a structure of a block in a data signal line driving circuit of a matrix type image display apparatus in accordance with the seventh embodiment of the present invention.

Referring to FIG. 17, the following description describes an example seventh embodiment in accordance with the present invention. Hereinafter, like components are labeled with like reference numerals with respect to the above embodiments, and the description of these components is not repeated for the explanation's convenience.

FIG. 17 shows a block in a data signal line driving circuit of the present embodiment, which is, in effect, a combination of the fifth and sixth embodiments.

The above-explained effect of the present invention can be realized by assembling the data signal line driving circuit in the same manner as the fifth and sixth embodiments, and the explanation thereof is omitted.

Eighth Embodiment

Figure 18:
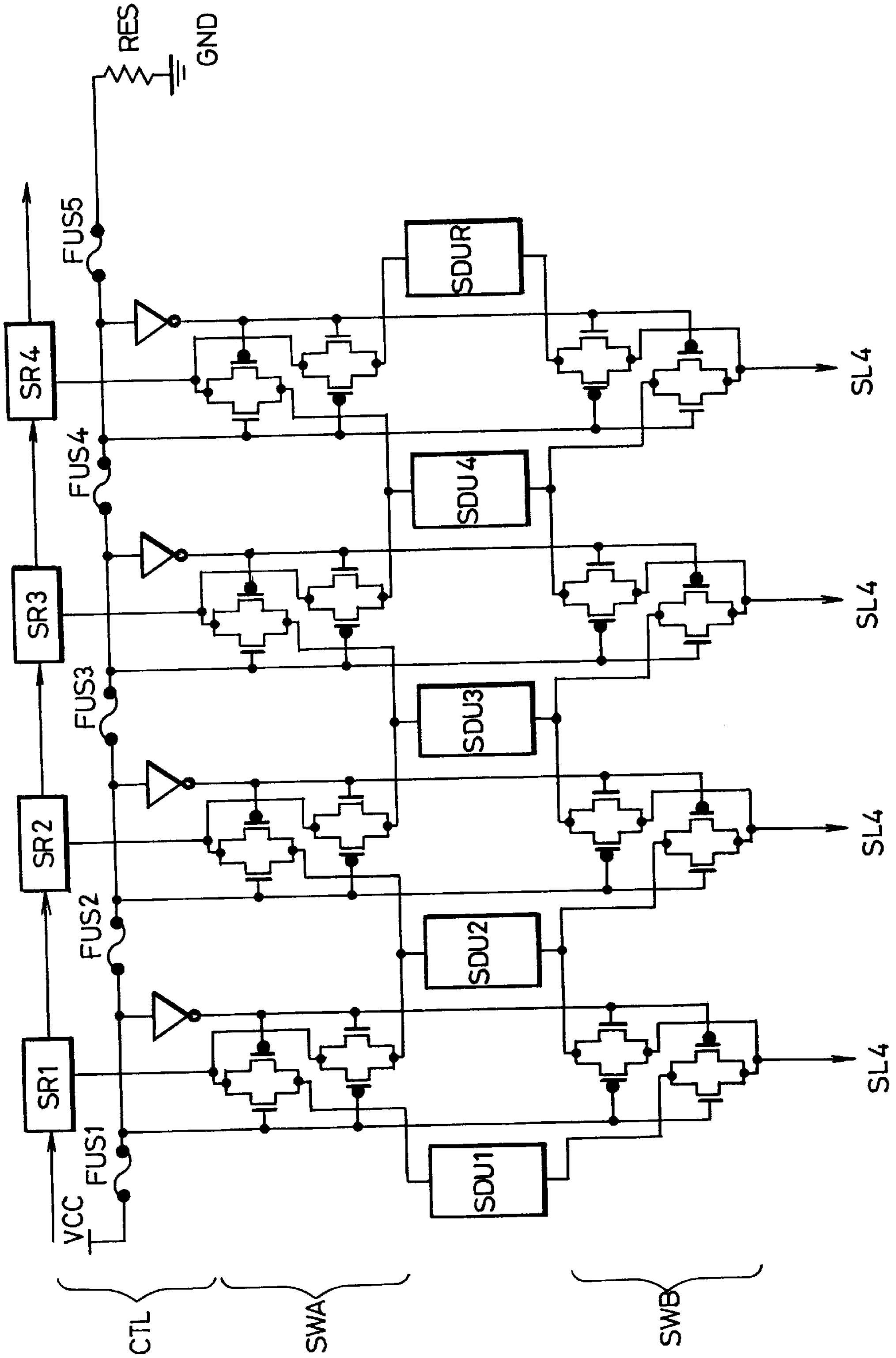
FIG. 18 is a block diagram depicting a structure of a block in a data signal line driving circuit of a matrix type image display apparatus in accordance with the eighth embodiment of the present invention.

Referring to FIG. 18, the following description describes an example eighth embodiment in accordance with the present invention. Hereinafter, like components are labeled with like reference numerals with respect to the above embodiments, and the description of these components is not repeated for the explanation's convenience.

FIG. 18 shows a block in a data signal line driving circuit of the present embodiment. Compared with the counterpart of the fifth embodiment, switch circuits SWA and SWB are of the CMOS structure in which an n-channel transistor and a p-channel transistor are provided in parallel.

This structure can increase both a signal transmission speed and a transmissible amplitude of a signal. Thus, this structure is particularly effective for the switch circuits that transfers analogue signals in the data signal line side of the data signal line driving circuit, namely, switch circuits SWB. Both switch circuits SWA and SWB are not necessarily of the CMOS structure and switch circuits SWA may be of another structure.

Ninth Embodiment

Figure 19:
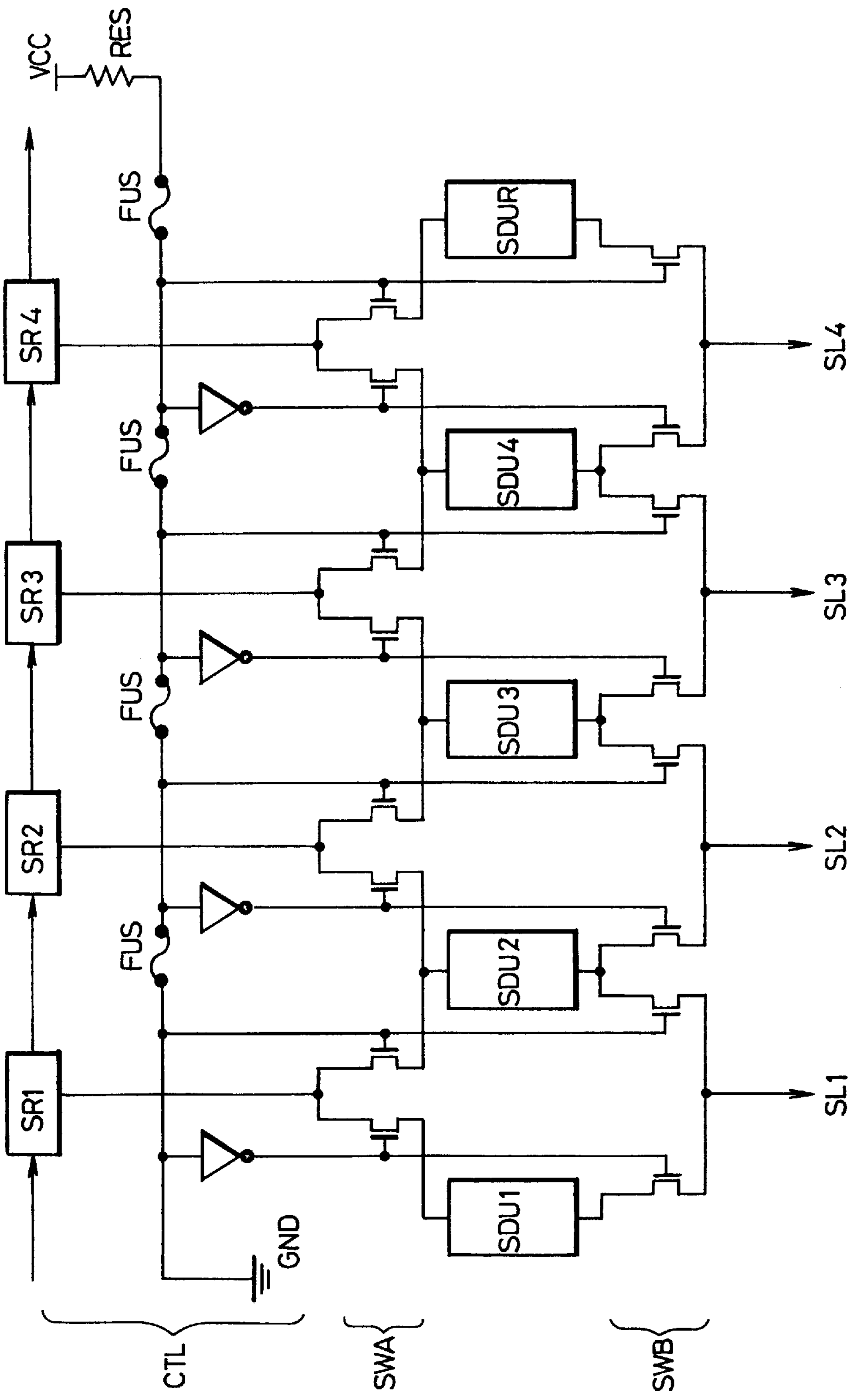
FIG. 19 is a block diagram depicting a structure of a block in a data signal line driving circuit of a matrix type image display apparatus in accordance with the ninth embodiment of the present invention.

Referring to FIG. 19, the following description describes an example ninth embodiment in accordance with the present invention. Hereinafter, like components are labeled with like reference numerals with respect to the above embodiments, and the description of these components is not repeated for the explanation's convenience.

FIG. 19 shows a block in a data signal line driving circuit of the present embodiment. Compared with the structure of the first embodiment shown in FIG. 10, the higher electric potential side and lower electric potential side are reversed, and resistance element RES is provided in the higher electric potential side. This structure can realize the same effect obtained by the structure of FIG. 10.

Figure 20:
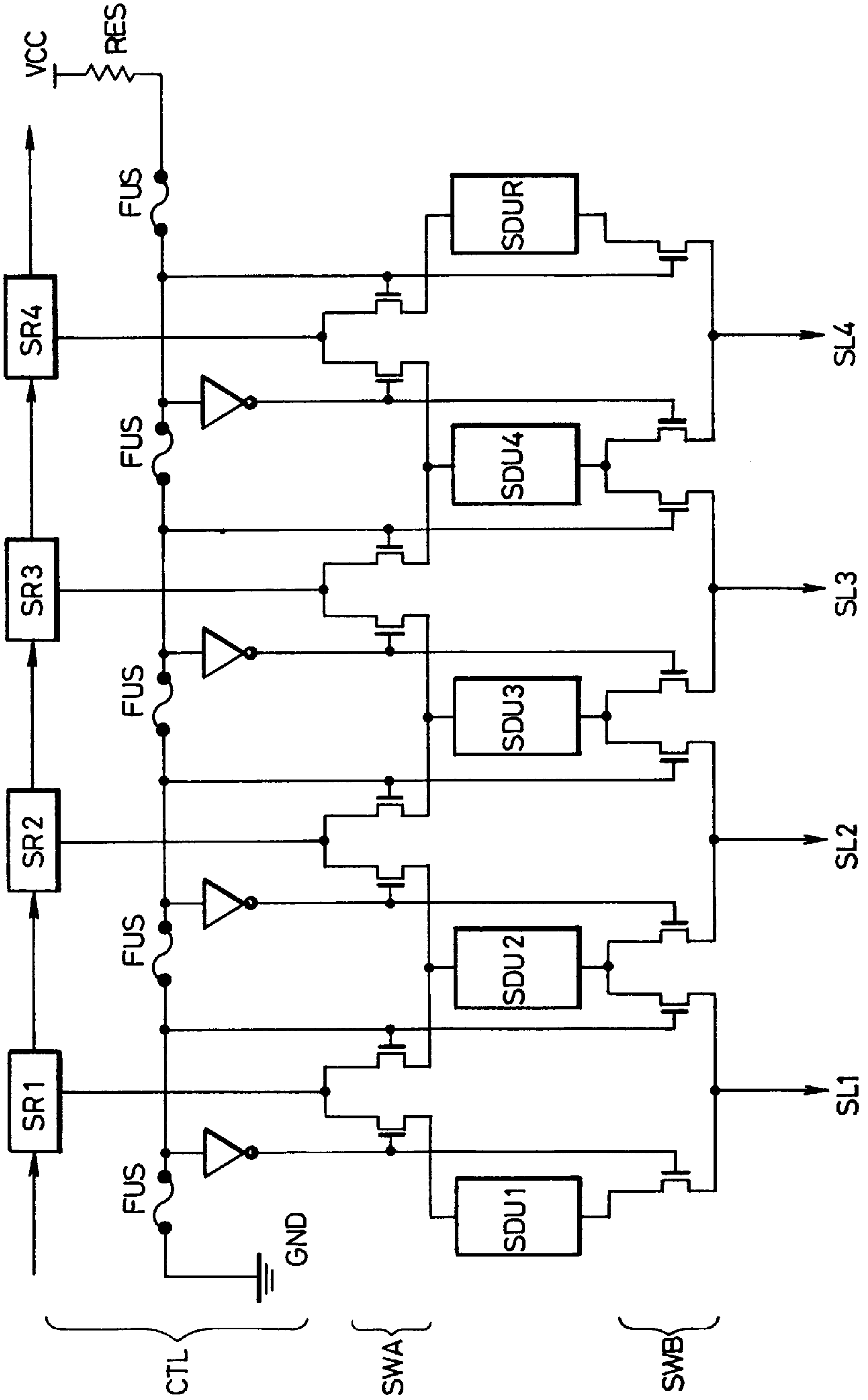
FIG. 20 is a block diagram depicting a structure of a data signal line driving circuit when the structure of the ninth embodiment is applied to the structure of FIG. 15.

This structure can be applied to the first through eighth embodiments, and an example of which is shown in FIG. 20. FIG. 20 shows a result when the structure of the present embodiment is applied to the structure of FIG. 15. The structure of FIG. 20 can realize the same effect obtained by the structure of FIG. 15.

Tenth Embodiment

Figure 21:
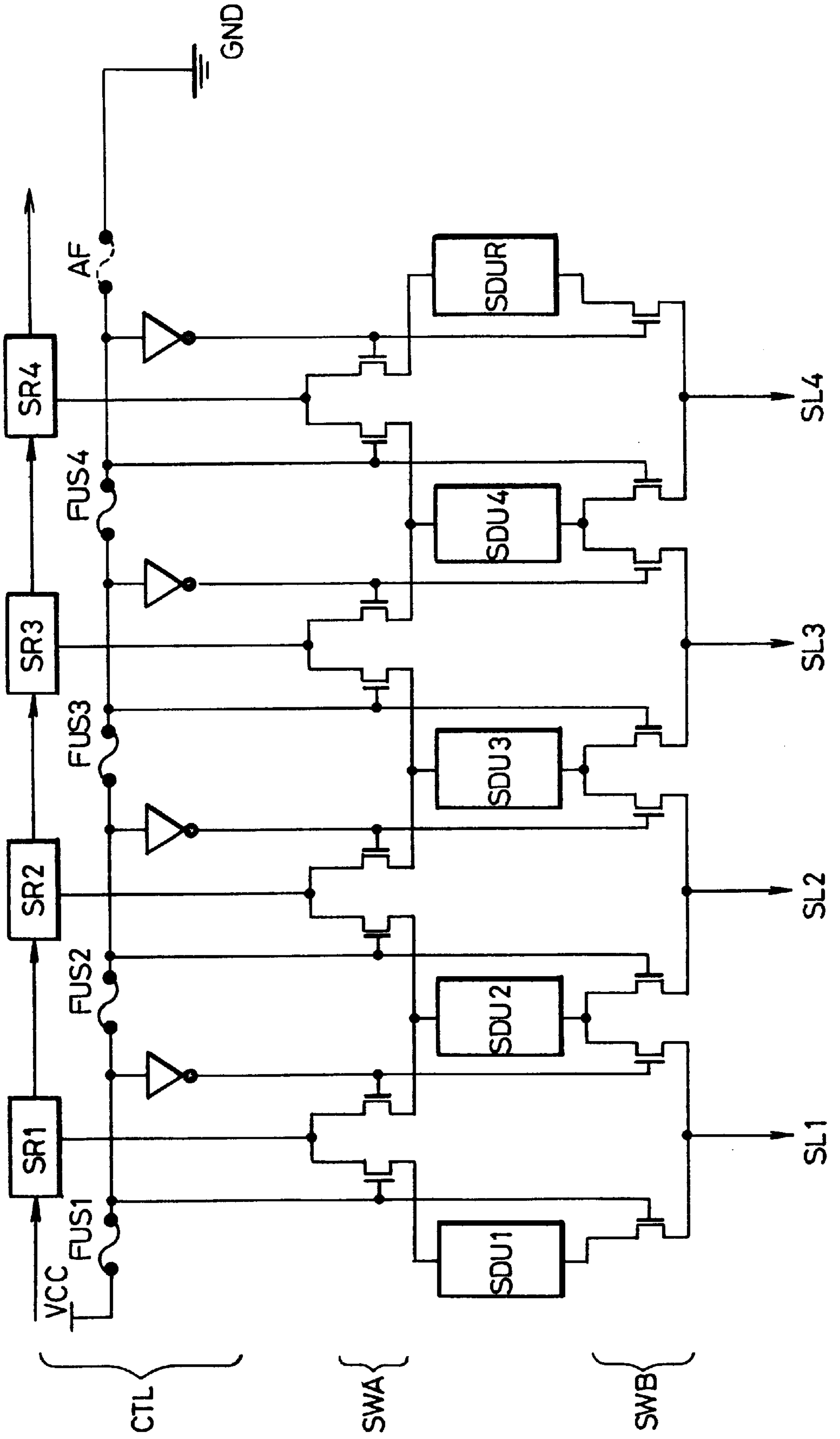
FIG. 21 is a block diagram depicting a structure of a block in a data signal line driving circuit of a matrix type image display apparatus in accordance with the tenth embodiment of the present invention.

Referring to FIGS. 11 and 21, the following description describes an example tenth embodiment in accordance with the present invention. Hereinafter, like components are labeled with like reference numerals with respect to the above embodiments, and the description of these components is not repeated for the explanation's convenience.

FIG. 21 shows a block in a data signal line driving circuit of the present embodiment. In this block, the control means of switch circuits SWA and SWB includes an anti-fuse AF instead of resistance element RES of FIG. 10. Unlike fuses FUS, anti-fuse AF is usually turned off and turned on, for example, when irradiated by laser beams. More specifically, anti-fuse AF comprises a lamination of metal wires 56 and 57 and a metal wire 59 with a thin insulating film 58 in between as shown in the plan view and front view in FIGS. 11(*d*) and 11(*e*), respectively. A contact hole 58*a* is formed through insulating film 58 covering metal wire 57 to connect metal wires 57 and 59. Insulating film 58 is damaged when laser beam 55 or the like is irradiated to metal wire 59 on metal wire 56. Accordingly, metal wire 59 on the top layer and metal wires 56 and 57 on the bottom layer are connected electrically as shown in FIG. 11(*f*).

Herein, when there is a fault in the block, a corresponding fuse is turned off while anti-fuse AF is turned on. Accordingly, substantially no stationary current will flow throughout the block like the fifth embodiment, thereby making it possible to save the energy consumption. Although two portions in the block must be treated (e.g., irradiation by laser beams) a faultless block does not require any treatment. Therefore, if the faults occur less frequently, the cost of the troubleshooting can be saved compared with the case in the fifth embodiment.

In addition, anti-fuse AF may be provided in the higher electric potential side.

Eleventh Embodiment

Figure 22:
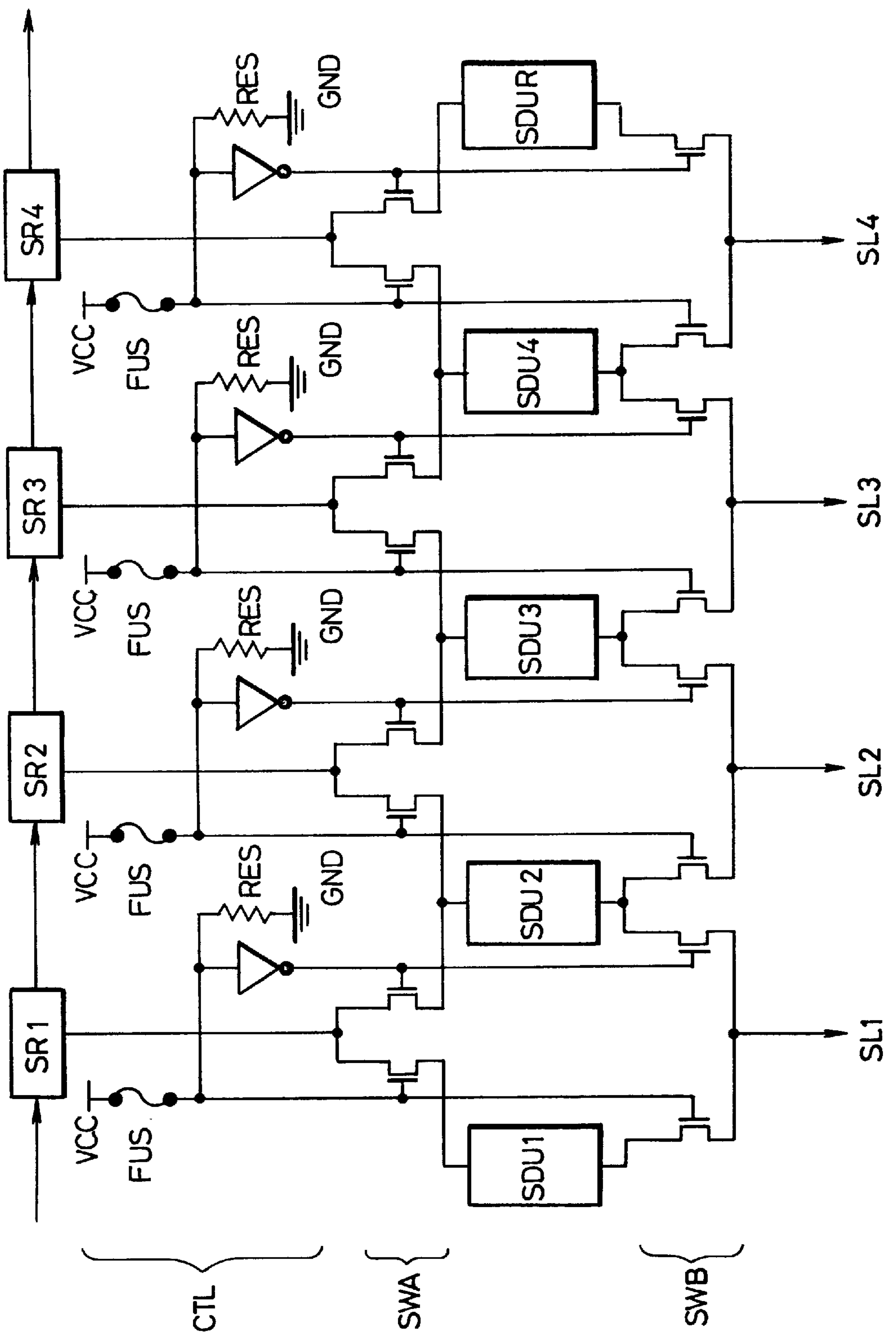
FIG. 22 is a block diagram depicting a structure of a block in a data signal line driving circuit of a matrix type image display apparatus in accordance with the eleventh embodiment of the present invention.

Referring to FIG. 22, the following description describes an example eleventh embodiment in accordance with the present invention. Hereinafter, like components are labeled with like reference numerals with respect to the above embodiments, and the description of these components is not repeated for the explanation's convenience.

FIG. 22 shows a block in a data signal line driving circuit of the present embodiment. In this block, the control means is provided to each of switch circuits SWA and SWB, in other words, one control means is provided for each of shift registers SR or each of data signal lines SL.

According to this structure, when there is a fault in the block, the fault can be troubleshooted by turning off all the fuses beyond the fault.

Twelfth Embodiment

Figure 23:
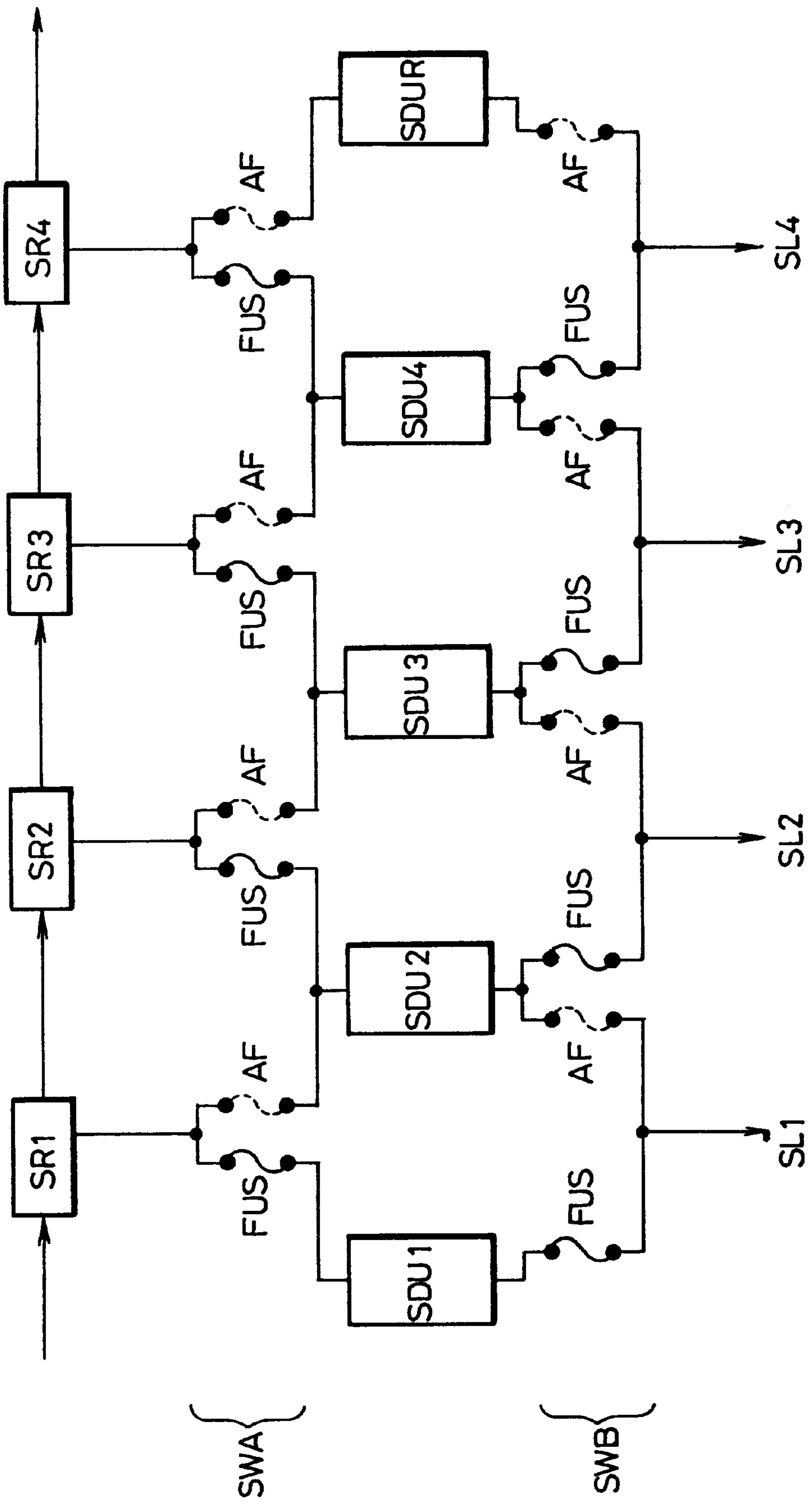
FIG. 23 is a block diagram depicting a structure of a block in a data signal line driving circuit of a matrix type image display apparatus in accordance with the twelfth embodiment of the present invention.

Referring to FIG. 23, the following description describes an example twelfth embodiment in accordance with the present invention. Hereinafter, like components are labeled with like reference numerals with respect to the above embodiments, and the description of these components is not repeated for the explanation's convenience.

FIG. 23 shows a block in a data signal line driving circuit of the present embodiment. In the block, each of switch circuits SWA and SWB comprises a pair of the fuse and anti-fuse AF instead of the transistor.

Herein, in order to troubleshoot the fault, all the fuses beyond the fault are turned off while all anti-fuses AFs beyond the fault are turned on.

The block structured in this manner can omit the circuits (transistors) which are indispensable in the redundant mechanism, and therefore can be downsized compared with the counterpart in the eleventh embodiment.

Thirteenth Embodiment

Figure 24A:
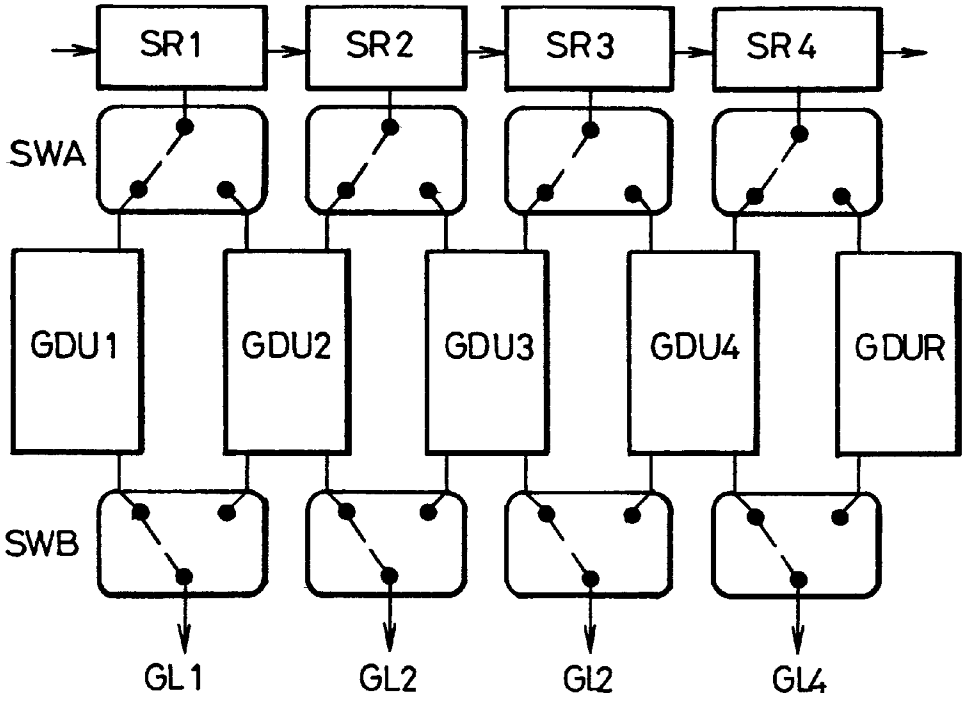
FIG. 24(*a*) is a block diagram depicting an initial structure of a block in a scanning signal line driving circuit in accordance with a matrix type image display apparatus in accordance with the thirteenth embodiment of the present invention.
Figure 24B:
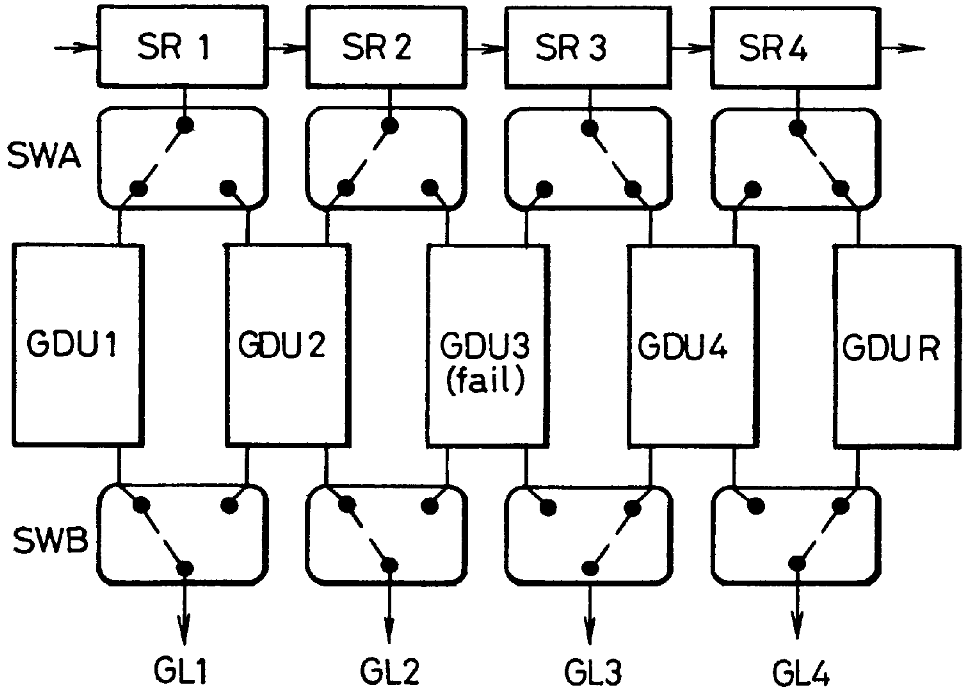
Figure 25:
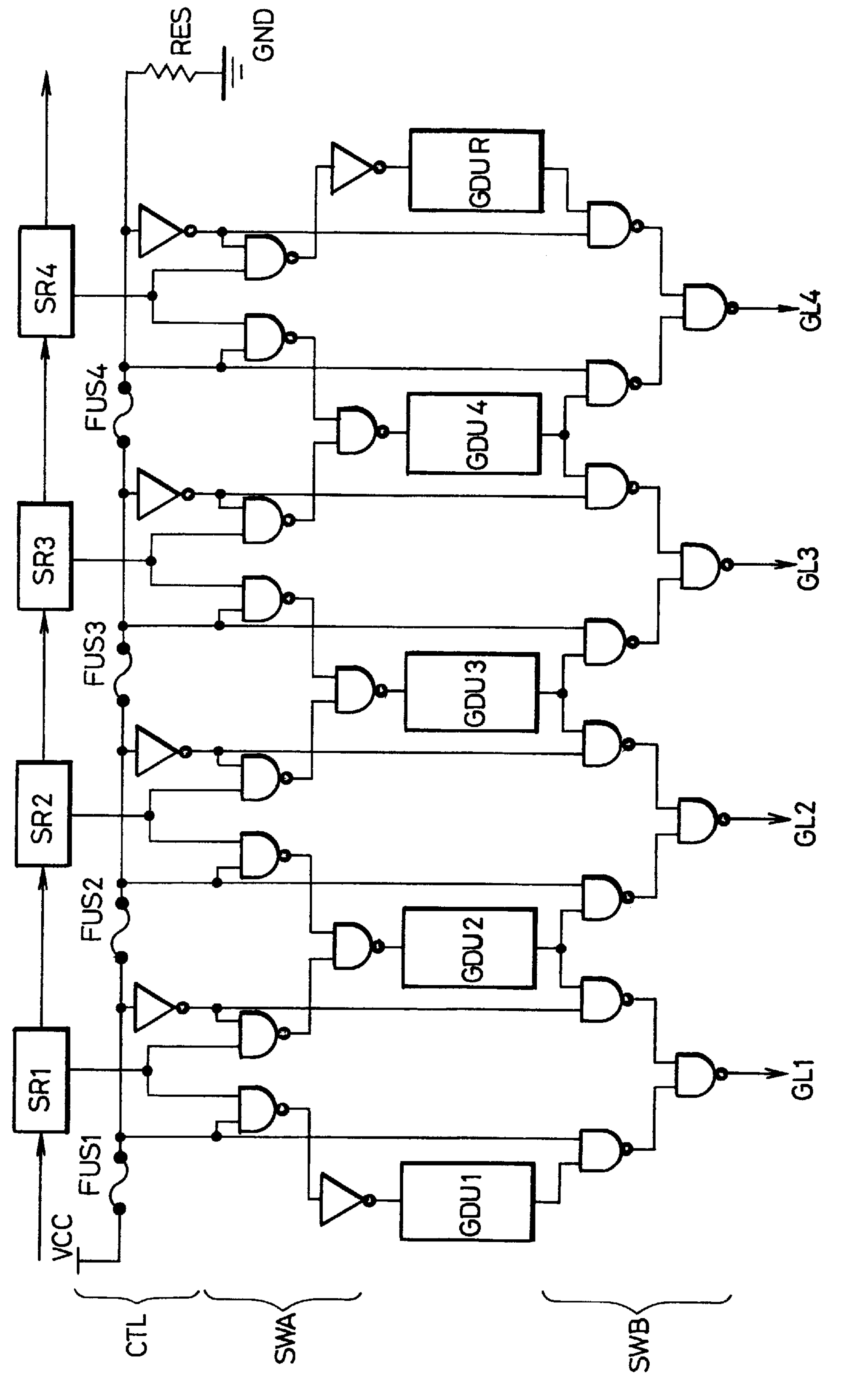
FIG. 25 is a block diagram showing the above scanning signal line driving circuit in a more specific manner.
Figure 26:
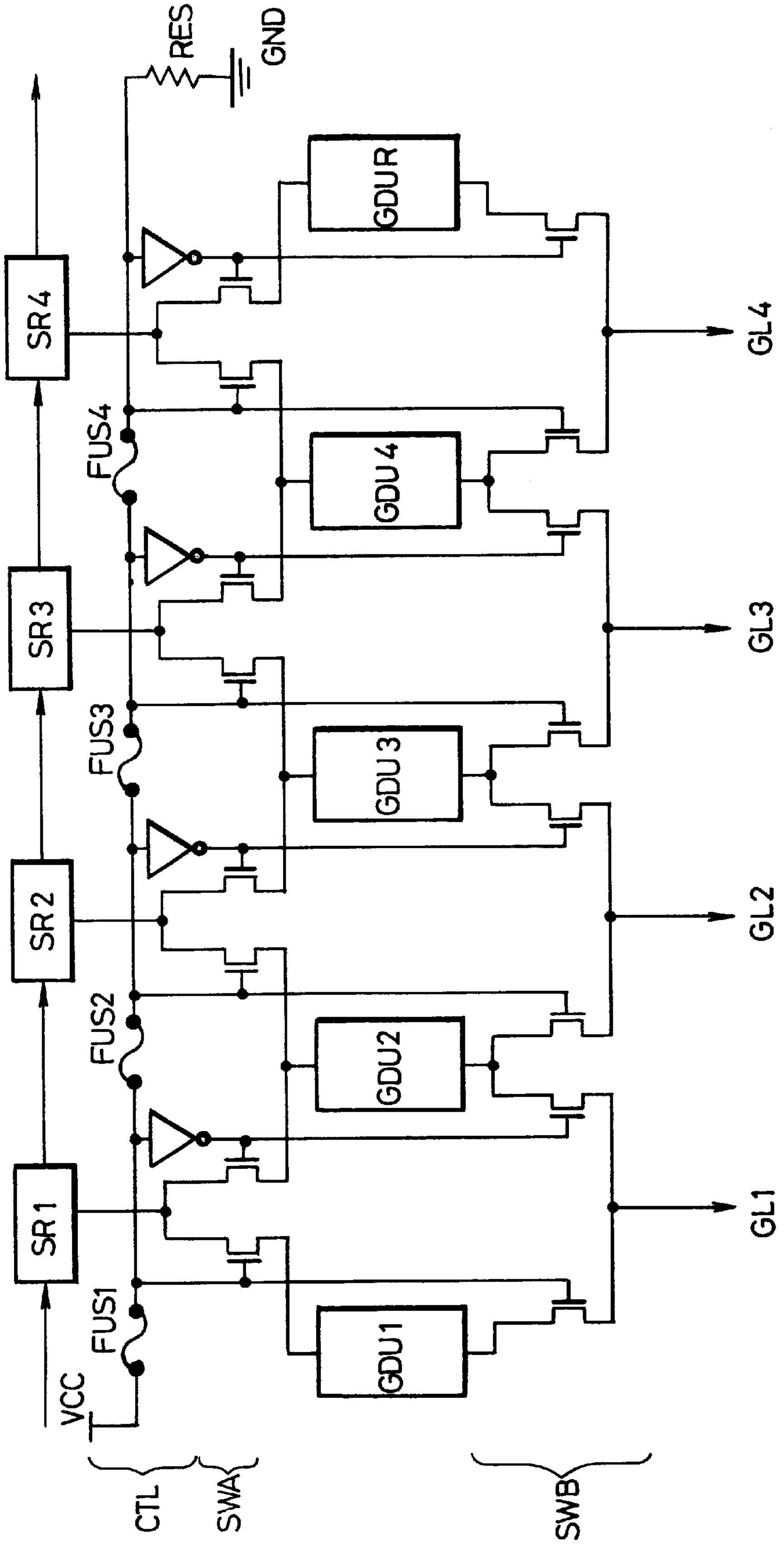
FIG. 26 is another block diagram showing the above scanning signal line driving circuit in a more specific manner.

Referring to FIGS. 24 through 26, the following description describes an example thirteenth embodiment in accordance with the present invention. Hereinafter, like components are labeled with like reference numerals with respect to the above embodiments, and the description of these components is not repeated for the explanation's convenience.

Figure 35:
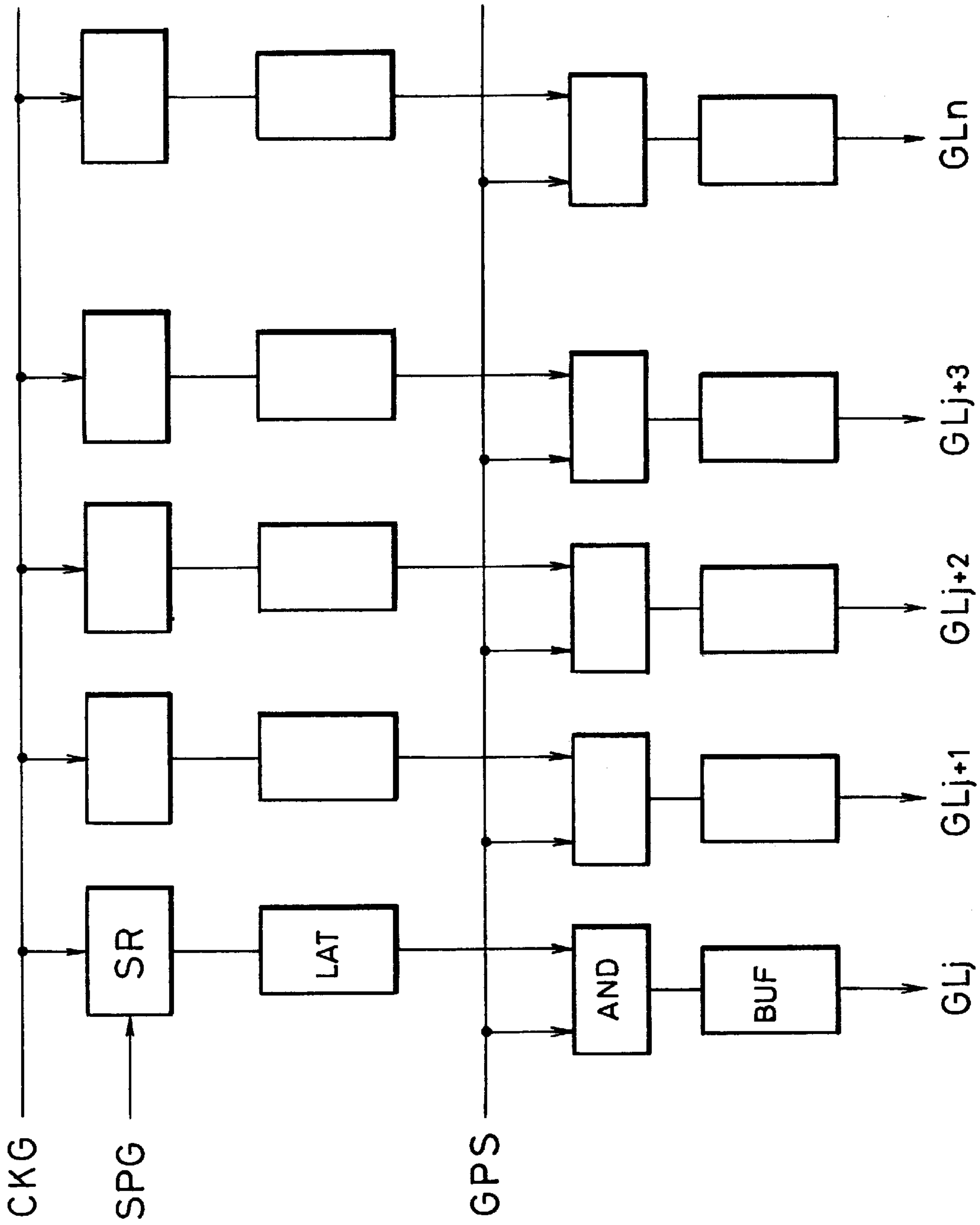
FIG. 35 is a block diagram depicting a structure of a scanning signal line driving circuit in a conventional matrix type image display apparatus.
Figure 36:
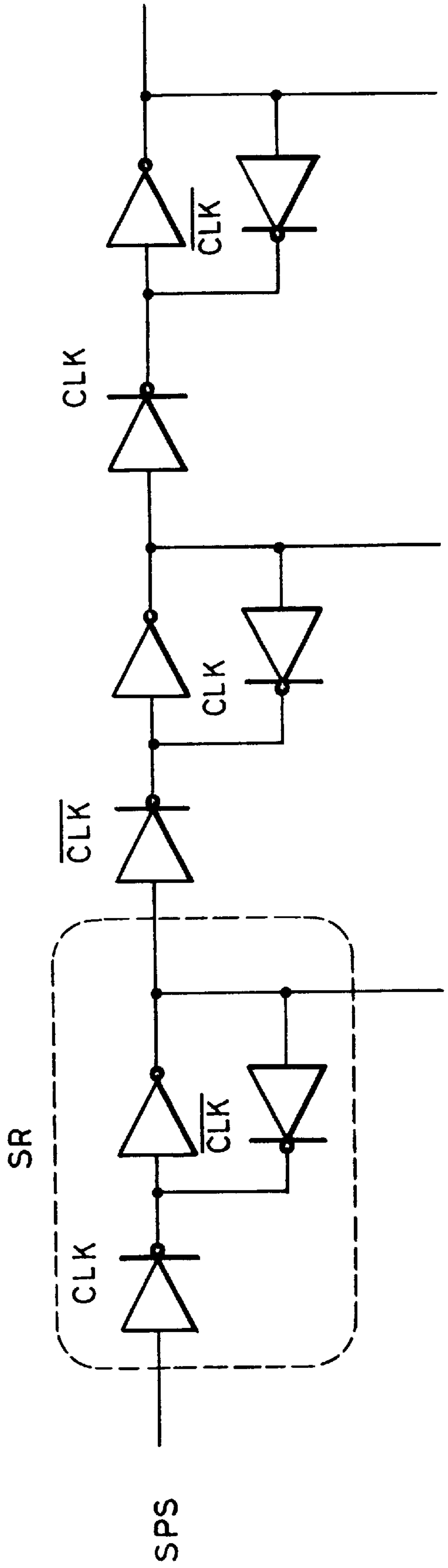
FIG. 36 is a schematic circuit diagram showing a structure of a scanning circuit (shift register) employed in the data signal line driving circuit of FIGS. 32 and 33 and the scanning signal line driving circuit of FIG. 35.
Figure 37:
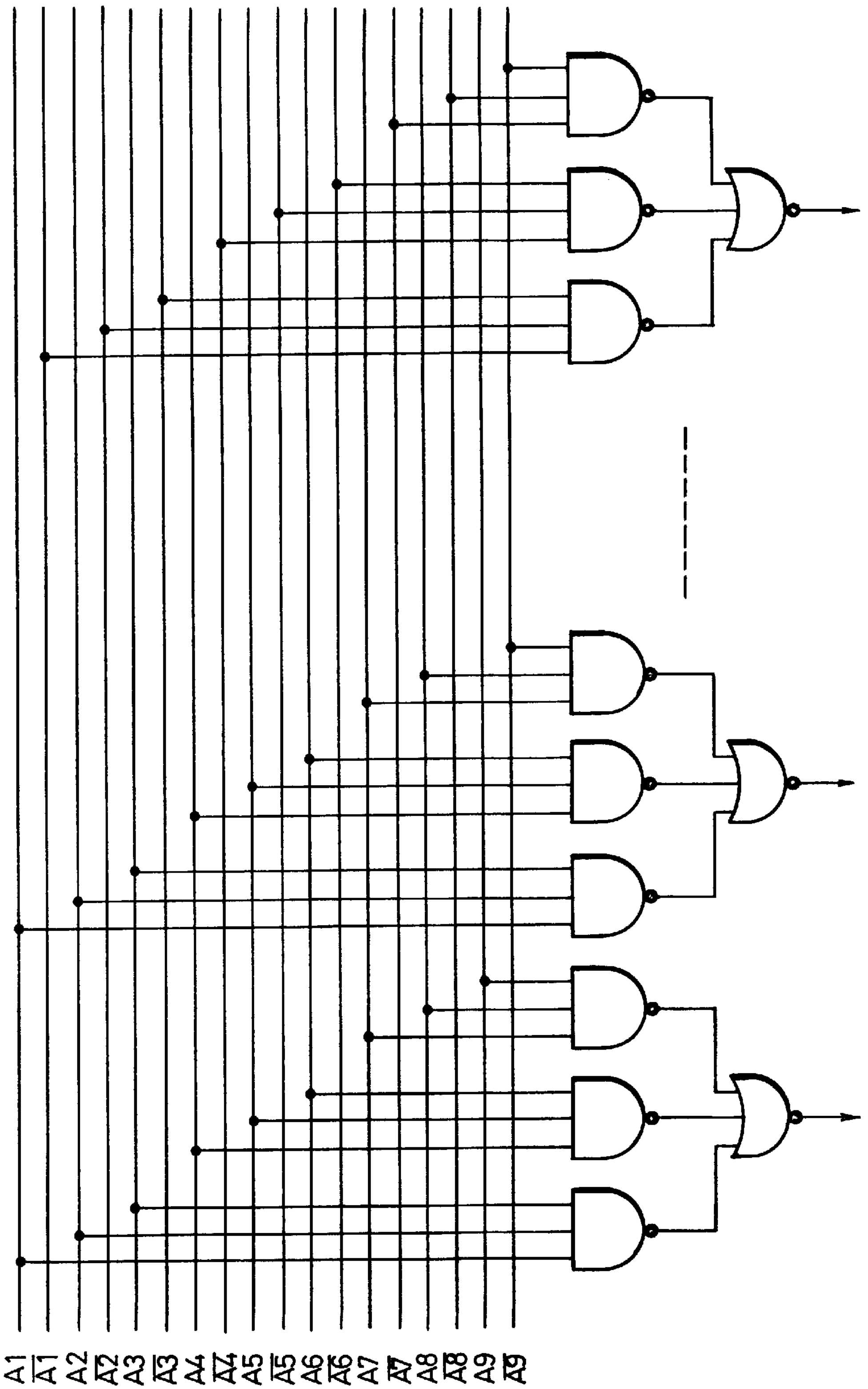
FIG. 37 is a schematic circuit diagram showing a structure of a decoder circuit representing another type of scanning circuit.

FIG. 24(*a*) shows an exemplar structure of a scanning signal line driving circuit of a matrix type image display apparatus of the present embodiment, and shows a block therein. In the drawing, regular scanning signal output circuits GDU1–GDU4 and backup scanning signal output circuit GDUR correspond to the components of the scanning signal line driving circuit excluding shift registers SR1–SR4. More specifically, regular scanning signal output circuits GDU1–GDU4 and backup scanning signal output circuit GDUR correspond to latch circuits LAT, AND circuits, and buffer circuits BUF in the scanning signal line driving circuit of FIG. 35 referred to in the prior art column.

The block of the present embodiment comprises four shift registers SR1–SR4 (which are collectively referred to as SR), four regular scanning signal output circuits GDU1–GDU4 (which are collectively referred to as GDU), one backup scanning signal output circuit GDUR, and four switch circuits SWA and four switch circuits SWB controlling the interconnection within the block.

When there is no fault as shown in FIG. 24(*a*), the outputs from all shift registers SR are inputted into regular scanning signal output circuit GDU, respectively, and scanning signal lines GL1–GL4 (which are collectively referred to as GL) are connected to regular scanning signal output circuits GDU, respectively. Thus, none of scanning signal lines GL is connected to backup scanning signal output circuit GDUR; nor it is connected to any of shift registers SR.

On the other hand, when regular scanning signal output circuit GDU3 fails as shown in FIG. 24(*b*), the failing scanning signal output circuit GDU3 is isolated from corresponding shift register SR3 and scanning signal line GL3. At the same time, regular scanning signal output circuit GDU4 beyond the fault is re-connected to shift register SR3 and scanning signal line GL3 which have been connected to preceding regular scanning signal output circuit GDU3. Further, backup scanning signal output circuit GDUR placed in the bottom is connected to its corresponding shift register SR4 and scanning signal line GL4.

As has been explained, the circuit units beyond the fault are switched to their adjacent circuit units, respectively, thereby enabling the block to maintain its function.

FIGS. 25 and 26 show the structure of FIG. 24(*a*) in a more specific manner. First, the structure of FIG. 25 will be explained. Each switch circuit SWA controlling the connection between shift registers SR and scanning signal output circuits GDU and GDUR comprises an invertor circuit and NAND (negative AND) circuits. Each switch circuit SWB controlling the connection between scanning signal output circuits GDU and GDUR and scanning signal lines GL comprises three NAND circuit.

The control signals of switch circuits SWA and SWB are generated by a plurality of fuses FUS and resistance element RES which are interposed serially between power source VCC and grounding GND. When there is no fault in scanning signal output circuits GDU, no fuses FUS are turned off. Thus, all the control signals will have a high level due to resistance element RES. Under these conditions, all shift registers SR and scanning signal lines GL are connected to the scanning signal output circuits GDU in their left, respectively.

On the other hand, when scanning signal output circuit GDU3 fails, the corresponding fuse FUS3 is turned off, and the control signals beyond the disconnected portion will have a low level. Then, shift registers SR1 and SR2 and scanning signal lines SL1 and SL2 ahead of the disconnected portion maintain the connection with scanning signal lines GDU1 and GDU2 in their left, and shift registers SR3 and SR4 and scanning signal output lines GL3 and GL4 beyond the disconnected portion are re-connected to scanning signal output circuits GDU4 and GDUR in their right. Thus, the block in the scanning signal line driving circuit can operate as if there were no faults when there is a fault in any of the scanning signal output circuits.

Next, the structure of FIG. 26 will be explained. Each of switch circuits SWA controlling the connection between shift registers SR and scanning signal output circuits GDU and GDUR and switch circuits SWB controlling the connection between scanning signal output circuits GDU and GDUR and scanning signal lines GL comprises a transfer gate.

The control signals of switch circuits SWA and SWB and their operating principles are identical with those explained with reference to FIG. 25, and the explanation thereof is omitted.

In this embodiment, it is a fault in scanning signal output circuits GDU only that can be troubleshooted (the faults in the scanning circuits such as shift registers SR or the like can not be troubleshooted). However, most of the space in a typical scanning signal line driving circuit is occupied by the scanning signal output circuits. Thus, scanning signal output circuits GDU have considerably high probabilities of faults, and introducing the redundant technique to scanning signal output circuits GDU alone is sufficiently effective. The present embodiment is effective in particular to some types of multi-scan display apparatuses capable of changing scanning methods depending on the kinds of videos. Because these types of multi-scan display apparatuses additionally include a complicated logical circuit in the scanning signal line driving circuit and such a scanning signal output circuit occupies a more space. A redundant technique for the shift register section will be explained in the fourteenth embodiment below. Alternatively, the present embodiment may be combined with a technique disclosed in Japanese Laid-Open Patent Application No. 6-83286(1994).

Fourteenth Embodiment

Figure 27A:
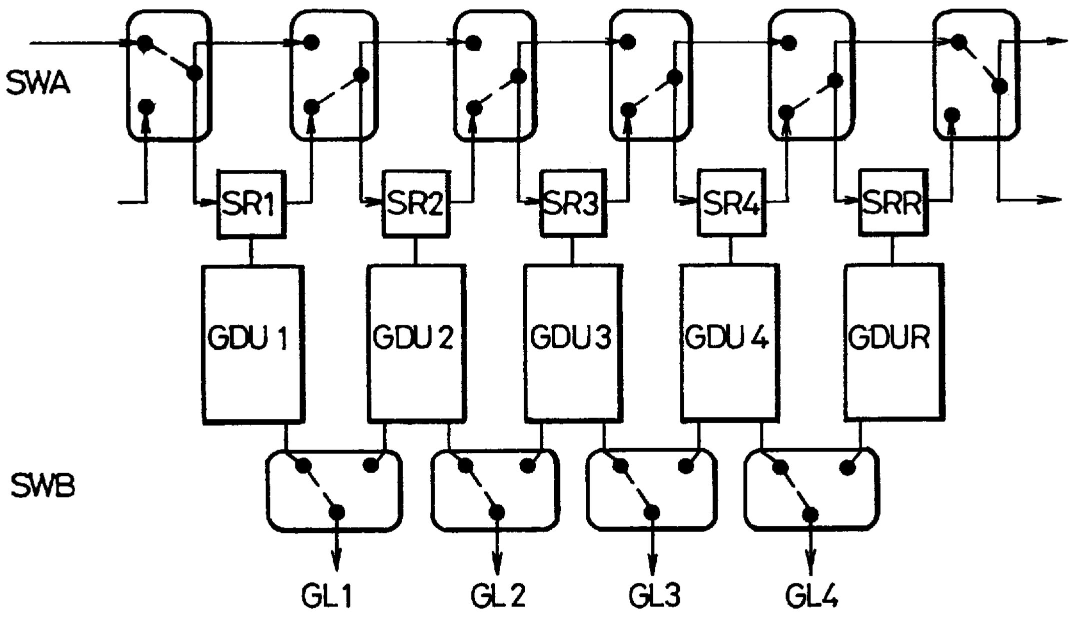
FIG. 27(*a*) is a block diagram depicting an initial structure of a block in a scanning signal line driving circuit in accordance with a matrix type image display apparatus in accordance with the fourteenth embodiment of the present invention.
Figure 27B:
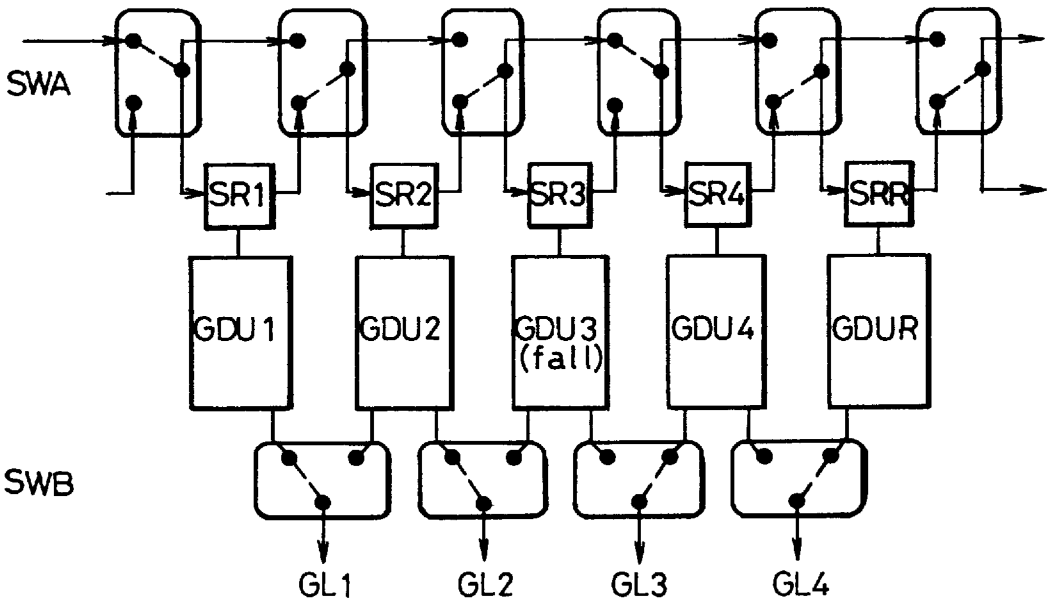
Figure 28:
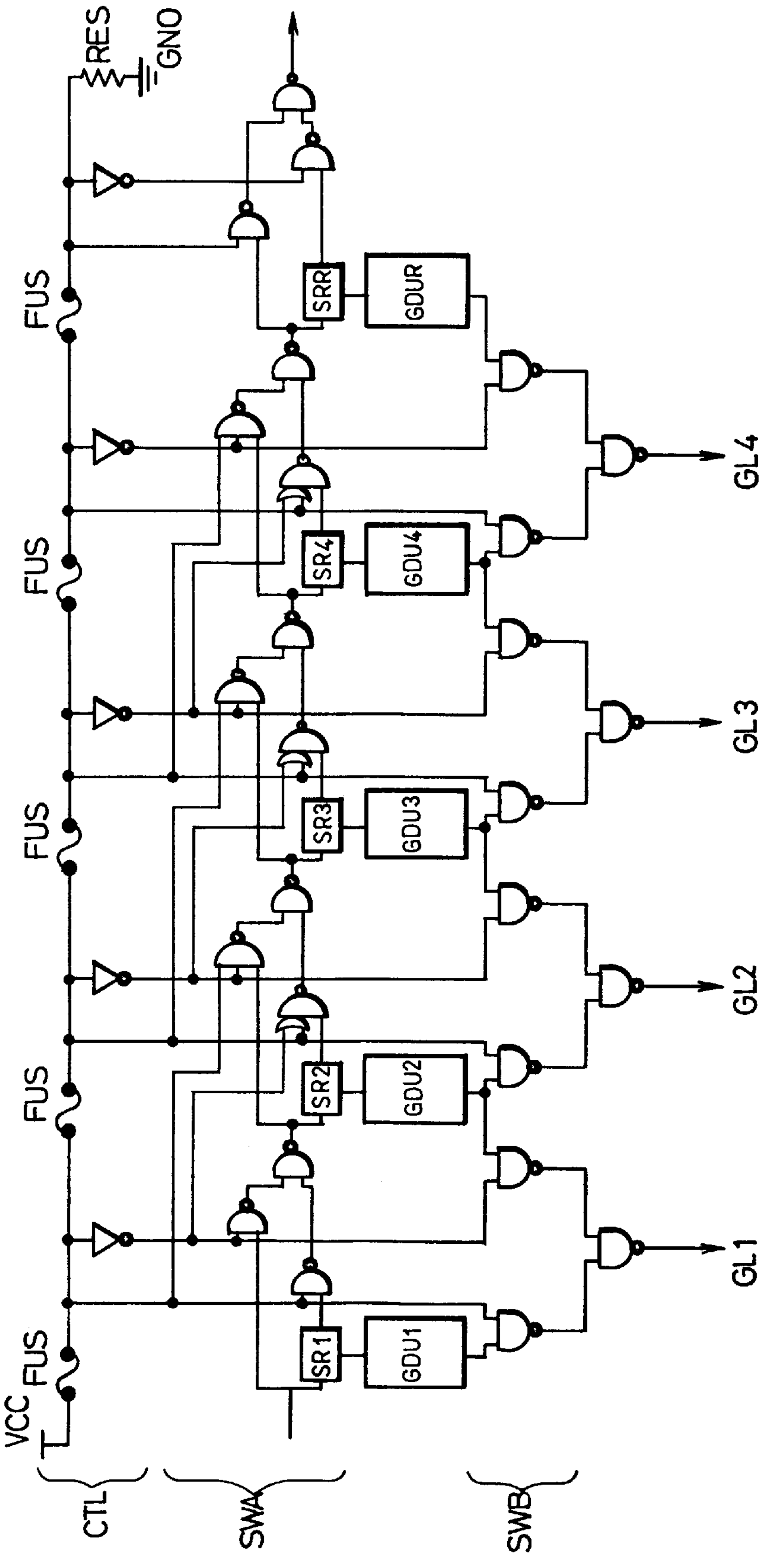
FIG. 28 is a block diagram showing the above scanning signal line driving circuit in a more specific manner.
Figure 29:
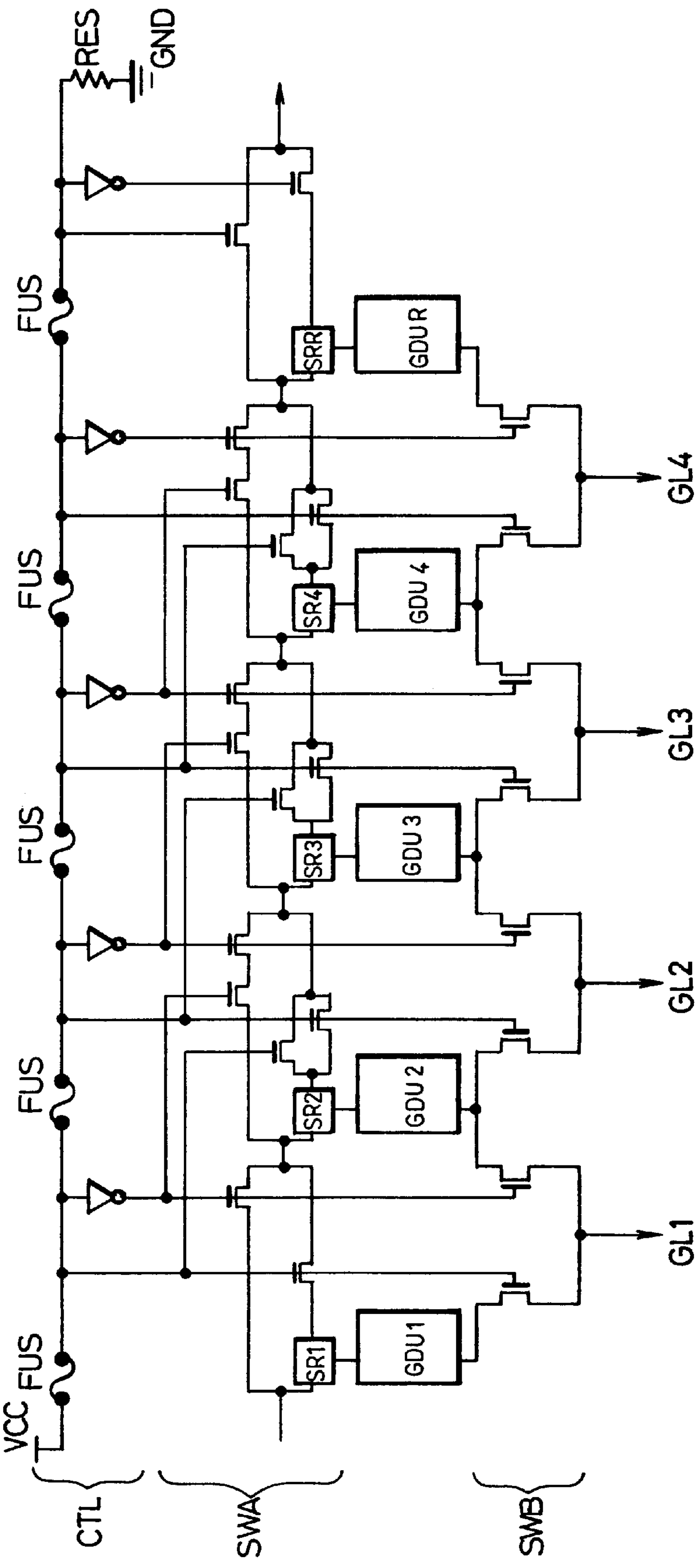
FIG. 29 is another block diagram showing the above scanning signal line driving circuit in a more specific manner.

Referring to FIGS. 27 through 29, the following description describes an example fourteenth embodiment in accordance with the present invention. Hereinafter, like components are labeled with like reference numerals with respect to the above embodiments, and the description of these components is not repeated for the explanations convenience.

FIGS. 27(*a*) and 27(*b*) show other exemplar structures of the scanning signal driving circuit in accordance with the present invention, and show a block therein. Like the thirteenth embodiment, regular scanning signal output circuits GDU and backup scanning signal output circuit GDUR correspond to the components of the scanning signal line driving circuit excluding shift registers SR. Herein, a block comprises four regular shift registers SR, one backup shift register SRR, four regular scanning signal output circuits GDU, one backup scanning signal output circuit GDUR, and switch circuits SWA and SWB controlling the interconnection in the block. The shift registers are fixedly connected to their respective scanning signal output circuits.

When there is no fault as shown in FIG. 27(*a*), all regular shift registers SR are activated and backup shift register SRR is interlaced-scanned, while scanning signal lines GL are connected to their respective regular scanning signal output circuits GDU which are connected to their respective regular shift registers SR, and thus none of scanning signal lines GL is connected to backup scanning signal output circuit GDUR.

On the other hand, when either a regular shift register SR or regular scanning signal output circuit GDU fails, the failing shift register SR or shift register SR connected to the failing regular scanning signal output circuit GDU is interlaced-scanned. At the same time, regular scanning signal output circuits GDU beyond the fault are re-connected to scanning signal lines GL which have been connected to their preceding regular scanning signal output circuits GDU, respectively. Further, backup shift register SRR is activated and backup scanning signal output circuit GDUR placed in the bottom is connected to corresponding scanning signal line GL.

As has been explained, the failing circuit unit is interlaced-scanned and the circuit units beyond the failure are switched to their respective adjacent circuits, thereby enabling the block to maintain its function.

FIGS. 28 and 29 show the structure of FIG. 27(*a*) in a more specific manner. First, the structure of FIG. 28 will be explained. Each of switch circuits SWA controlling the interlaced-scanning of shift registers SR and SRR comprises an invertor circuit, NAND (negative AND) circuits, and an OR-NAND (logical OR/negative AND) circuit. Each of switch circuits SWB controlling the connection between scanning signal output circuits GDU and GDUR and scanning signal lines GL comprises NAND circuits.

Like the thirteenth embodiment, the control signals of switch circuits SWA and SWB are generated by a plurality of fuses FUS and resistance element RES which are serially interposed between power source VCC and grounding GND. When there is no fault in shift registers SR and scanning signal output circuits GDU, no fuses FUS are turned off. Thus, all the control signals will have a high level due to resistance element RES. Under these conditions, all shift registers SR operate normally and backup shift register SRR is interlaced-scanned. Scanning signal lines GL are connected to regular scanning signal output circuits GDU in their left and thus none of scanning signal lines GL is connected to backup scanning signal output circuit GDUR.

On the other hand, when there is a fault in either shift register SR3 or scanning signal output circuits GDU3, the corresponding fuse FUS is turned off and the control signals beyond the disconnected portion will have a low level. Accordingly, shift register SR3 corresponding to the disconnected portion is interlaced-scanned and backup shift register SRR is activated. Thus, scanning signal lines GL1 and GL2 ahead of the disconnected portion maintain the connection with scanning signal output circuits GDU1 and GDU2 in their left, respectively, while scanning signal output circuits GDU3 and GDU4 beyond the disconnected portion are re-connected to scanning signal output circuits GDU4 and GDUR in their right. As a result, a block in the scanning signal line driving circuit can operate normally when there is a fault in shift registers SR or scanning signal output circuits GDU.

Next, the structure of FIG. 29 will be explained. Each of switch circuits SWA controlling the interlaced-scanning of shift registers SR and SRR, and switch circuits SWB controlling the connection between scanning signal output circuits GDU and GDUR and scanning signal lines GL comprises a transfer gate. The control signals of switch circuits SWA and SWB and their operating principles are identical with those in the above embodiment and the explanation thereof is omitted.

In the present embodiment, the faults not only in the scanning signal output circuits but also in the scanning circuits (shift registers) can be troubleshooted, thereby further improving the troubleshooting ratio.

The scanning line driving circuit can be modified in the same manner as the fifth through eleventh embodiments.

Note that any combination among the fifth, sixth, and eighth through eleventh embodiments are intended to be included within the scope of the present invention. In fact, the seventh embodiment shows a structure of a combination of the fifth and sixth embodiments. The fifth through eleventh embodiments are the modifications of the structure of FIG. 10, and FIGS. 9, 13, 14, 19, 20, 25, 26, 28 and 29 can be modified in the same manner.

Although one block comprises a circuit that drives four data signal lines in the third through fourteenth embodiments, the number of the data signal lines is arbitrary. Note that, however, the larger the number of the data signal lines in one block, the lower the troubleshooting ratio; the smaller the number of the data signal lines in one block, the larger the area occupied by the redundant circuits. For this reason, it is important to select an optimal block structure for the fault frequency in each process.

In the third through fourteenth embodiments, one backup circuit is provided in the bottom of each block; however, the position and the number of the backup circuits are arbitrary.

In the third through fourteenth embodiments, the shift registers are used as the scanning circuits. However, other scanning circuits such as decoder type scanning circuits are also applicable.

In the third through fourteenth embodiments, the switch circuit is controlled by turning off the fuse, and the fuse may be a metal wire such as an aluminum wire. In addition, laser beams from the YAG laser can be used as means for turning off the fuse. Structures, materials, or methods other than those specified above can be used as long as they can control the switch circuit.

As has been explained, the data signal line driving circuit in accordance with the present invention comprises:

(1) at least one block including a video signal output circuit section having regular video signal output circuits in an equal number of the scanning circuits and data signal lines and at least one backup video signal output circuit; and (2) changeover means for connecting each scanning circuit and the corresponding data signal line to any of a plurality of adjacent video signal output circuits.

When none of the regular video signal output circuits within the block has a fault, the regular video signal output circuits are connected to their respective scanning circuits and data signal lines, and thus none of the scanning circuits and data signal lines is connected to the backup video signal output circuit. On the other hand, when any of the regular video signal output circuits within the block fails, the failing regular video signal output circuit is connected neither to its corresponding scanning circuit nor data signal line, whereas the regular video signal output circuits beyond (or ahead of) the fault are re-connected sequentially to the adjacent scanning circuits.

As has been explained, a fault in a block can be troubleshooted within the block. Thus, even when a number of faults occur in a block, the data signal line driving circuit can operate as if there were no faults if the backup video signal output circuits outnumber the faults within the block.

Also, the changeover means can switch the connection of the video signal output circuits beyond the fault only by reconnecting one wire sequentially, thereby making it possible to reduce the effort and money required to troubleshoot the faults.

Since the faults in the video signal output circuits which occupy most of the space in the data signal line driving circuits are troubleshooted, the conforming ratio of the data signal line driving circuit can be improved significantly.

Also, the data signal line driving circuit in accordance with the present invention, which comprises at least one block including a scanning circuit section and a video signal output circuit section, the former including regular scanning circuits in an equal number of data signal lines and at least one backup scanning circuit, the latter including regular video signal output circuits in an equal number of the data signal lines and at least one backup video signal output circuit, may include:

(1) changeover means for connecting each data signal line to any of a plurality of adjacent video signal output circuits; and (2) another changeover means for connecting the output section of each scanning circuit to another scanning circuit in either the next or after next stage.

When none of the regular scanning circuits and regular video signal output circuits has a fault, the regular video signal output circuits are connected to their respective scanning circuits and data signal lines, and thus none of the scanning circuits and data signal lines is connected to the backup video signal output circuit. The backup scanning circuit is interlaced-scanned under these conditions. On the other hand, when any of the regular scanning circuits and regular video signal output circuits fails, the regular video signal output circuit corresponding the fault is disconnected from its corresponding data signal line, and the video signal output circuits beyond (or ahead of) the fault are sequentially re-connected to the adjacent data signal lines and the backup video signal output circuit is connected to the corresponding data signal line. At the same time, the scanning circuit corresponding to the fault is interlaced-scanned and the backup scanning circuit is incorporated into the driving circuit instead, thereby enabling the data signal line driving circuit to operate as if there were no faults.

As has been explained, a fault in a block is troubleshooted in the block. Thus, even when there are a number of faults in a block, the data signal line driving circuit can operate as if there were no faults if the backup video signal output circuits outnumber the faults within the block.

Also, the changeover means can re-connect the scanning circuits and video signal output circuits beyond the fault only by reconnecting one wire sequentially, thereby making it possible to reduce the effort and money required to troubleshoot the faults.

In addition, the faults in all the circuit elements making up the data signal line driving circuit can be troubleshooted, the conforming ratio of the data signal line driving circuit can be enhanced remarkably.

The scanning signal line driving circuit in accordance with the present invention comprises:

(1) at least one block including a scanning signal output circuit section having regular scanning signal output circuits in an equal number of the scanning circuits and scanning signal lines and at least one backup scanning signal output circuit; and (2) changeover means for connecting each scanning circuit and the corresponding scanning signal line to any of a plurality of adjacent scanning signal output circuits.

When none of the regular video signal output circuits in the block has a fault, the regular video signal output circuits are connected to their respective scanning circuits and scanning signal lines, and thus none of the scanning circuits and scanning signal lines is connected to the backup video signal output circuit. On the other hand, when any of the regular video signal output circuits in the block has a fault, the failing regular video signal output circuit is connected neither to its corresponding scanning circuit and scanning signal line and the regular video signal output circuits beyond (or ahead of) the fault are sequentially re-connected to the adjacent scanning circuits and scanning signal lines, and the backup video signal output circuit is connected to the corresponding scanning circuit and scanning signal line.

As has been explained, a fault in a block can be troubleshooted within the block. Thus, even when a number of faults occur in a block, the scanning signal line driving circuit can operate as if there were no faults if the backup scanning signal output circuits outnumber the faults within the block.

Also, the changeover means can switch the connection of the scanning signal output circuits beyond the fault only by re-connecting one wire sequentially, thereby making it possible to reduce the effort and money required to troubleshoot the faults.

Since the faults in the scanning signal output circuits which occupy most of the space in the scanning signal line driving circuits are troubleshooted, the conforming ratio of the scanning signal line driving circuit can be improved significantly.

Also, the scanning signal line driving circuit in accordance with the present invention, which comprises at least one block including a scanning circuit section and a scanning signal output circuit section, the former including regular scanning circuits in an equal number of scanning signal lines and at least one backup scanning circuit, the latter including regular scanning signal output circuits in an equal number of the scanning signal lines and at least one backup scanning signal output circuit, may include:

(1) changeover means for connecting each scanning signal line to any of a plurality of adjacent scanning signal output circuits; and (2) another changeover means for connecting the output section of each scanning circuit to another scanning circuit in either the next or after next stage.

When none of the regular scanning circuits and regular scanning signal output circuits has a fault, the regular scanning signal output circuits are connected to their respective scanning circuits and scanning signal lines, and thus none of the scanning circuits and scanning signal lines is connected to the backup scanning signal output circuit. The backup scanning circuit is interlaced-scanned under these conditions. On the other hand, when any of the regular scanning circuits and regular scanning signal output circuits has a fault, the regular scanning signal output circuit corresponding the fault is disconnected from its corresponding scanning signal line, and the scanning signal output circuits beyond (or ahead of) the faults are sequentially re-connected to the adjacent scanning signal lines and the backup scanning signal output circuit is connected to the corresponding scanning signal line. At the same time, the scanning circuit corresponding to the fault is interlaced-scanned and the backup scanning circuit is incorporated into the driving circuit instead, thereby enabling the scanning signal line driving circuit to operate as if there were no faults.

As has been explained, a fault in a block is troubleshooted in the block. Thus, when a number of faults occur in a block, the scanning signal line driving circuit can operate as if there were no faults if the backup scanning signal output circuits outnumber faults within the block.

The changeover means can switch the connection of the scanning signal output circuits beyond the fault only by re-connecting one wire sequentially, thereby making it possible to reduce the effort and money required to troubleshoot the faults.

Also, the faults in all the circuit elements making up the scanning signal line driving circuit can be troubleshooted, the conforming ratio of the scanning signal line driving circuit can be enhanced remarkably.

Further, if the above data signal line driving circuit additionally includes means for capturing a video signal in synch with a pulse signal to output the video signal to the data signal line, the video signal output circuit demands an element of a considerable size to output the video signal. Such a large-sized element is highly likely to cause a fault, and the present invention is particularly effective in such a case.

If the above data signal line driving circuit additionally includes means for capturing a video signal in synch with a pulse signal and amplifies the video signal to output the resulting signal to the data signal line, means for amplifying the video signal must be provided. Circuits forming the amplifying means require a number of elements and it occupies a large space in the driving circuit. Thus, probabilities of faults for the video signal output circuit are increased considerably, and the present invention is effective particularly in such a case.

Further, the block in the data signal line driving circuit and scanning signal line driving circuit includes the control means for the changeover means comprising a plurality of fuses and a resistance element which are connected serially between two power source terminals. Thus, all the changeover means within the block can be controlled only by turning off one fuse. As a result, processes for troubleshooting the fault can be simplified and the cost of the troubleshooting can be saved. The same can be the when the control means comprises:

1) a plurality of fuses and a resistance element which are serially connected between two power source terminals and another fuse placed adjacent to the resistance element;

2) two series each including a plurality of fuses and a resistance element which are serially connected between two power source terminals, the two series having the electric potential directions reversed to each other;

3) a plurality of fuses which are serially connected between two power source terminals and an anti-fuse provided in either power source side; and 4) a pair of a fuse and an anti-fuse.

Fifteenth Embodiment

Figure 30:
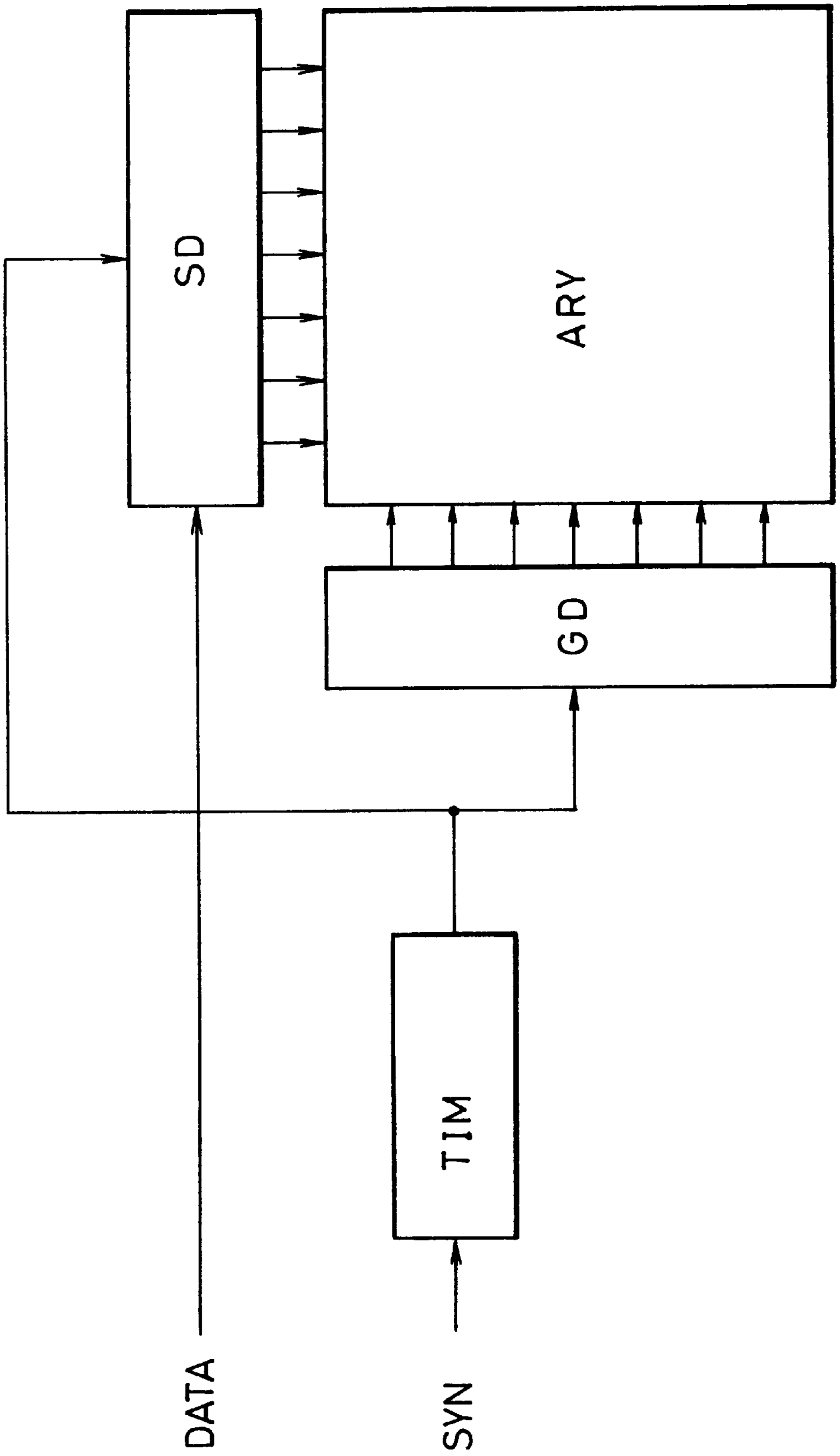
FIG. 30 is a block diagram depicting a structure of a matrix type image display apparatus common to the present invention and the prior art.
Figure 31A:
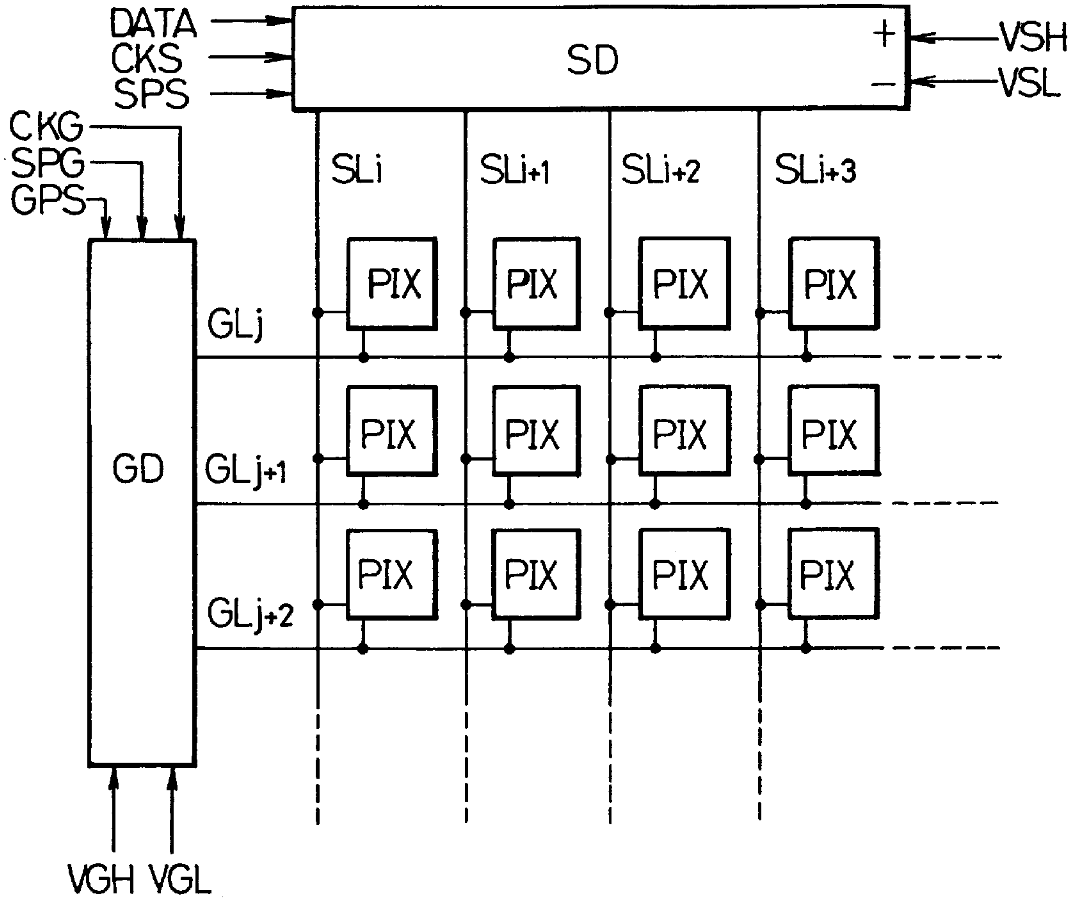
FIG. 31(*a*) is a block diagram depicting a structure of an image display section of the above matrix type image display apparatus.
Figure 31B:
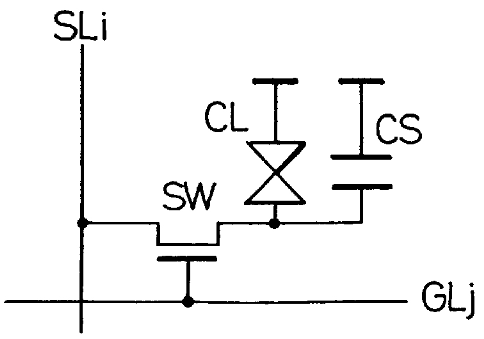

The present embodiment discuss an image display apparatus employing at least one of the data signal line driving circuit and scanning signal line driving circuit in accordance with the present invention. The structure of the block is identical with that of the conventional image display apparatus of FIGS. 30 and 31. The image display apparatus thus structured can troubleshoot a fault in data signal line driving circuit SD or scanning signal driving circuit GD, thereby making it possible to reduce the probability of defective line significantly.

In particular, when this technique is applied to a circuit comprising a non-single crystalline (amorphous or polycrystalline) silicon thin film transistor, the resulting circuit becomes resistant to the faults that happen frequently due to a problem in the process.

Besides the monolithic structure in which the pixel array and driving circuit(s) are formed on a single glass substrate, the GOG (glass on glass) structure is a good example using a polycrystalline silicon thin film transistor as a component of a driving circuit in an image display apparatus. In the GOG structure, a driving circuit formed on a glass substrate is mounted on a pixel array's substrate.

Sixteenth Embodiment

Figure 38A:
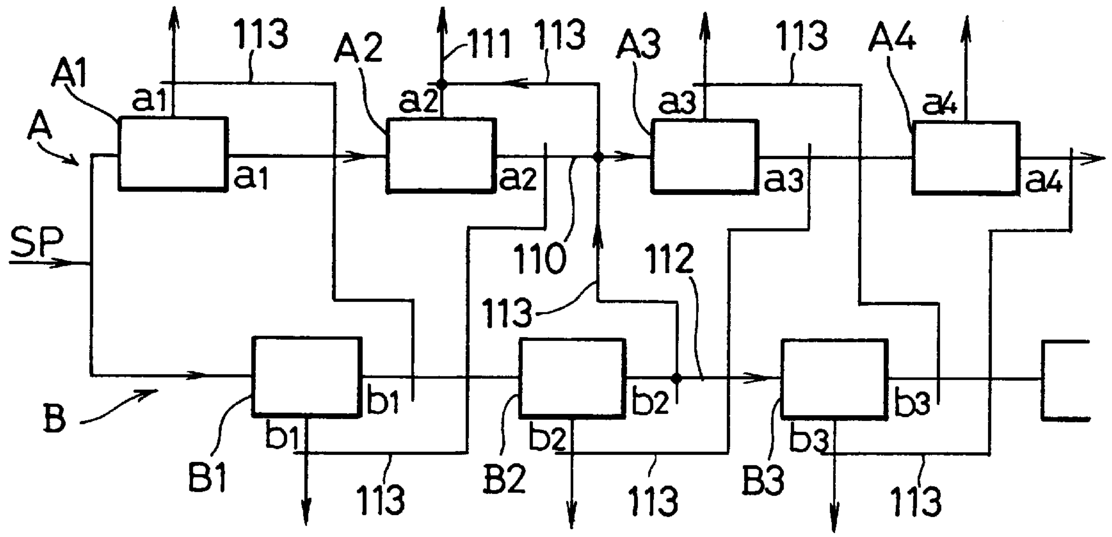
FIG. 38(*a*) is a block diagram depicting a polyphase shift register circuit of a matrix type image display apparatus in accordance with the sixteenth embodiment of the present invention.
Figure 38B:
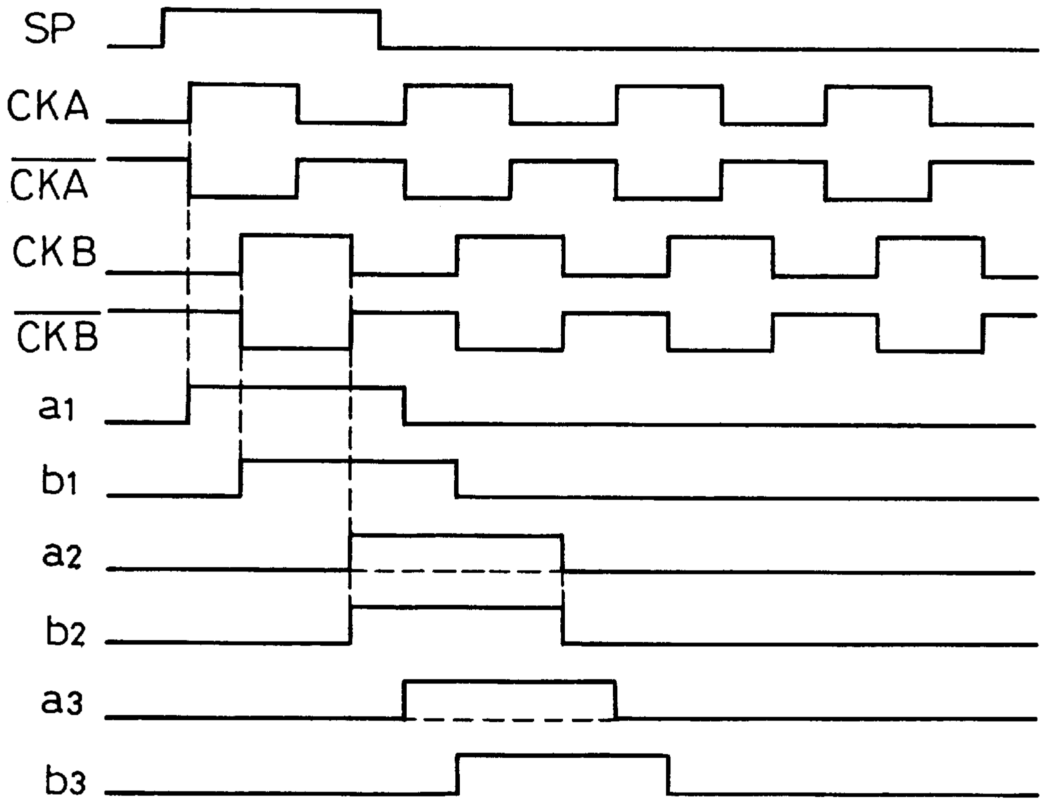
Figure 39:
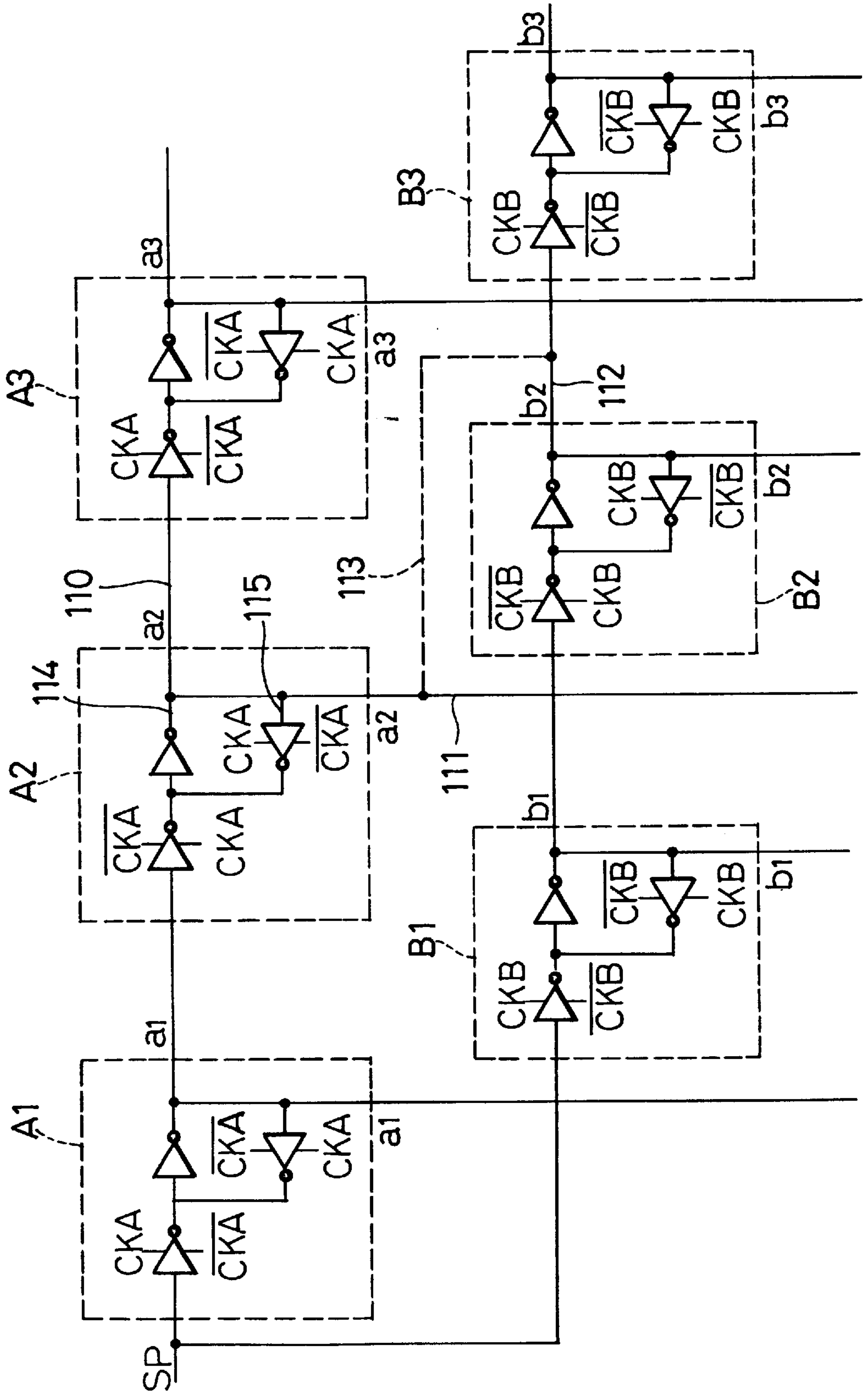
FIG. 39 is a schematic circuit diagram of the above polyphase shift register circuit in a more specific manner.
Figures 40A, 40B, 40C, 40D, 40E:
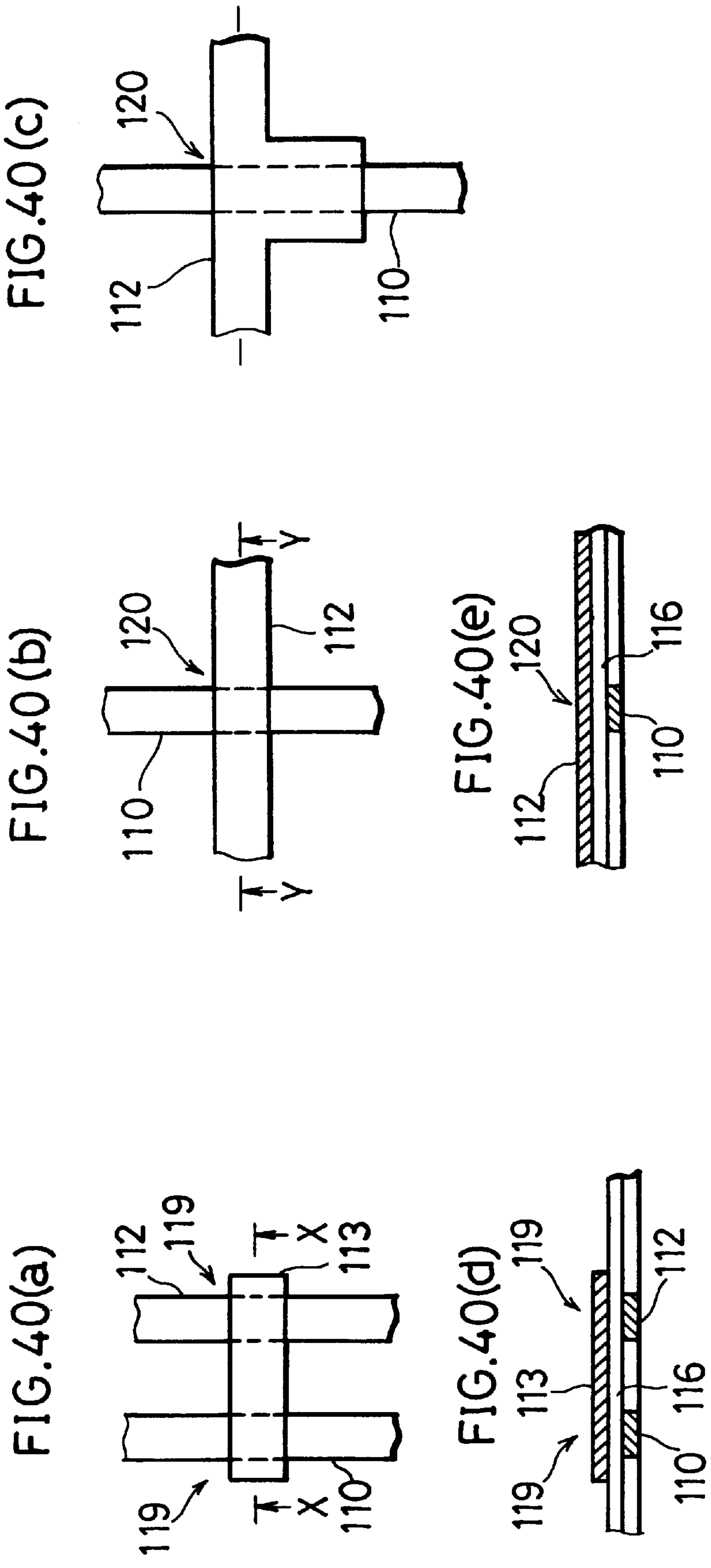
FIG. 40(*a*) is a plan view showing an example of a method of connecting signal lines using a connecting signal line.
Figure 53A:
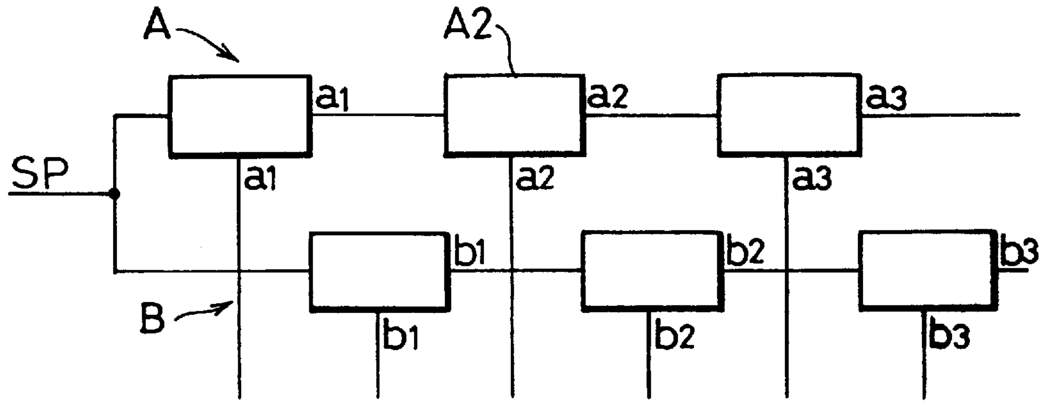
FIG. 53(*a*) is a block diagram depicting a structure of a shift register circuit of a conventional matrix type image display apparatus.
Figure 53B:
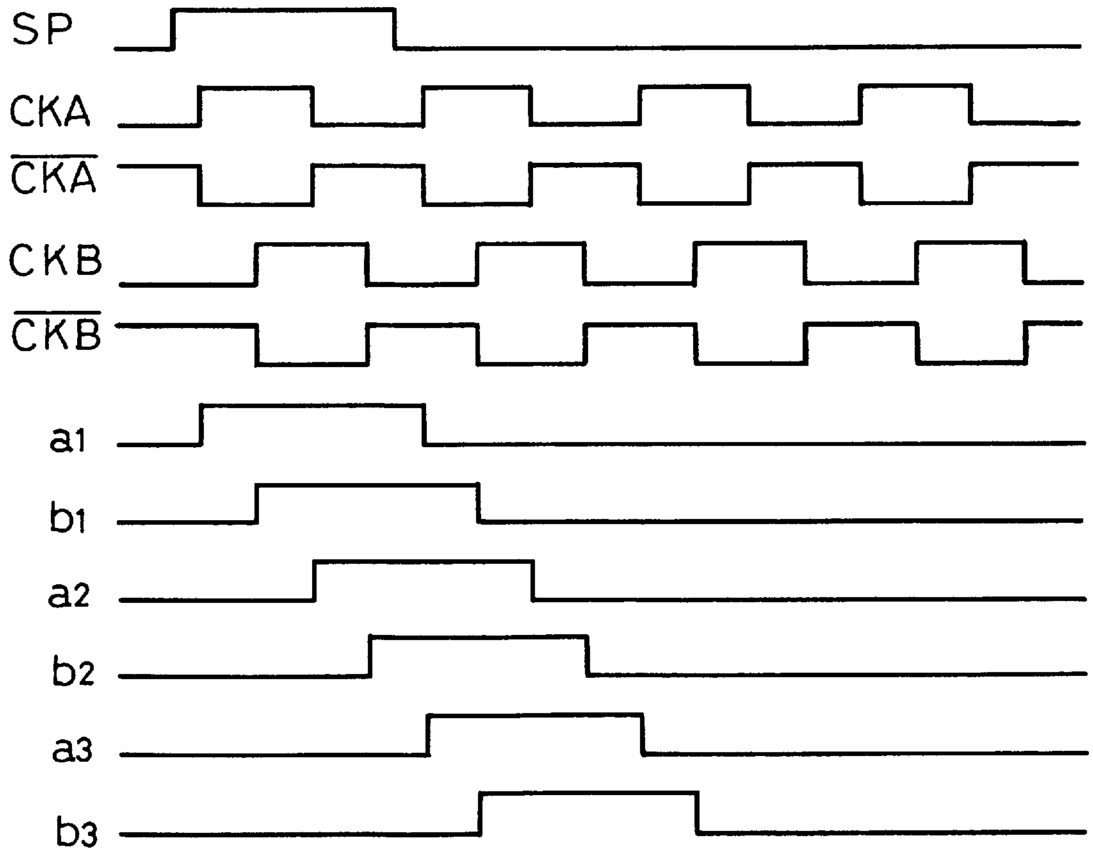
Figure 54:
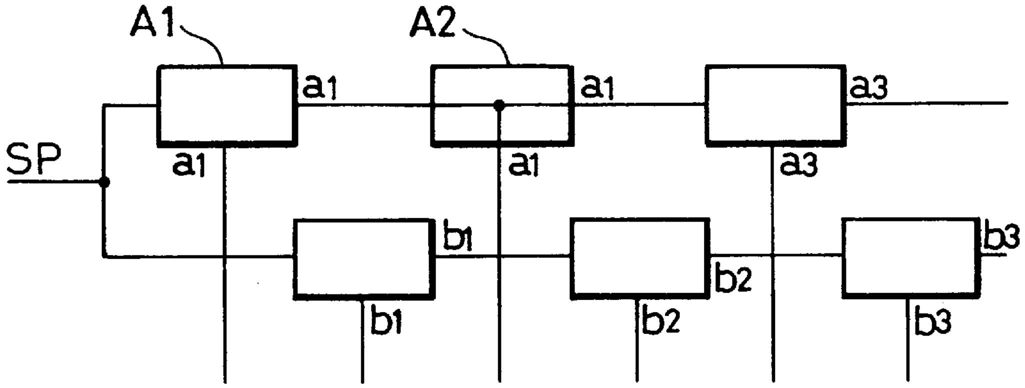
FIG. 54(*a*) is a block diagram depicting an example of troubleshooting when there is a fault in the shift register circuit of FIG. 53(*a*)
Figure 54B:
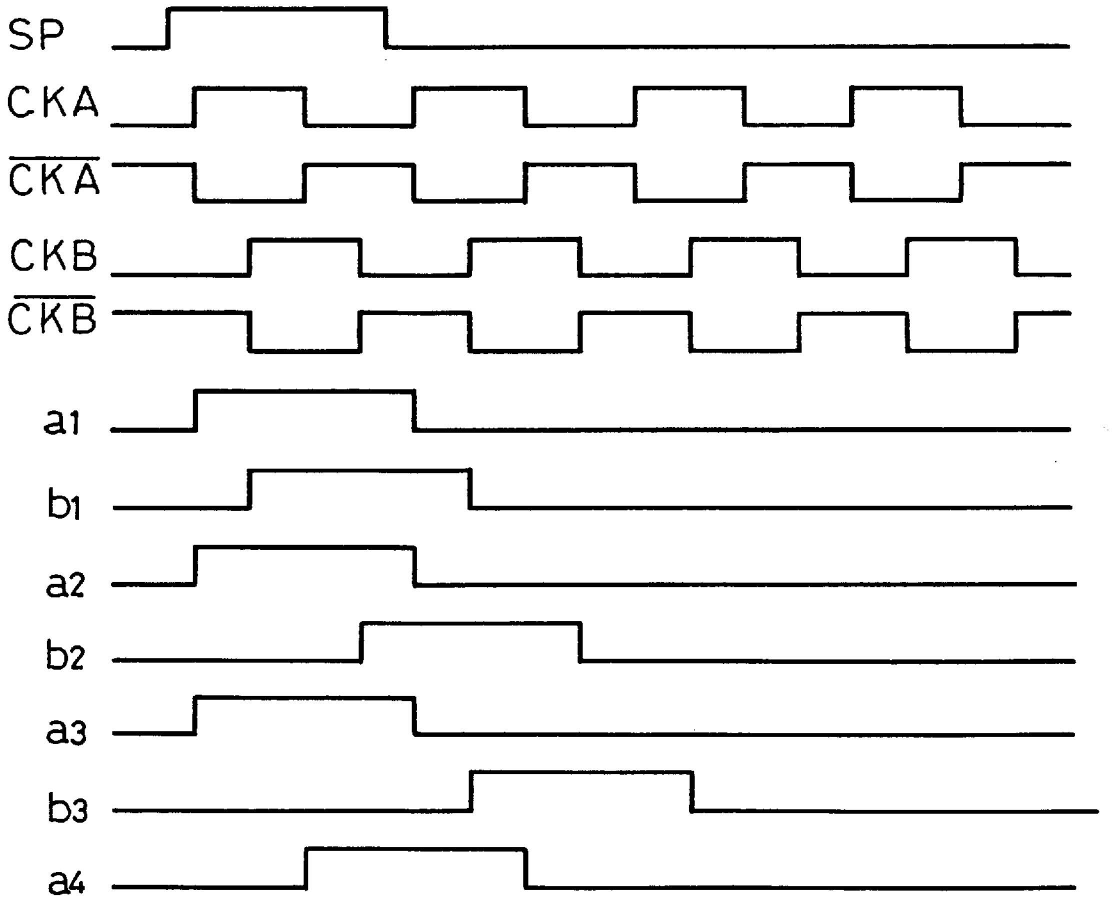

Referring to FIGS. 38 through 40 in comparison with FIG. 53, the following description describes an example sixteenth embodiment in accordance with the present invention.

As shown in FIG. 38(*a*), a driving circuit of a matrix type image display apparatus of the present embodiment includes a polyphase shift register circuit having a shift register series A and a shift register series B. Compared with the conventional polyphase shift register circuit of FIG. 53(*a*), the polyphase shift register circuit of the present embodiment additionally includes conductive connecting signal lines 113.

Connecting signal lines 113 are provided between the shift registers in different shift register series having consecutive output timings. Thus, when there is a fault in a shift register in shift register series A, connecting signal line 113 enables to use an output from a corresponding shift register in shift register series B as a replacement of the output from the failing shift register. Likewise, when there is a fault in a shift register in shift register series B, connecting signal line 113 enables to use an output from a corresponding shift register in shift register series A as a replacement of the output from the failing shift register.

Following is an explanation of connecting signal line 113 that connects signal lines 110 and 111 connecting shift register A2 and the output stage thereof and a signal line 112 connecting shift register B2 and the output stage thereof. Connecting signal 113 is usually isolated electrically from signal lines 110 through 112, and connected thereto when shift register A2 fails.

The output stage and input stage referred herein mean a circuit series that receives an output from a concerned shift register and a circuit series that inputs a signal into a concerned shift register, respectively. For example, in case of shift register A2 of FIG. 38(*a*), the output stage means a circuit series composed of shift register A3 and those beyond shift register A3 connected to signal line 110, unillustrated sample holding circuits connected to signal line 111, etc., while input stage means shift register A1.

In the polyphase shift register circuit shown in FIG. 53(*a*), if shift register A2 in the second stage of shift register series A fails, all of output signals $a_2$, $a_3$, . . . shift register A2 and those beyond shift register A2 in shift register series A will not rise as indicated by dotted lines in FIG. 38(*b*).

In this case, shift register A2 is isolated and connecting signal line 113 is connected to signal lines 110 through 112. As a result, an output signal $b_2$, a signal from a shift register B2 in shift register series B whose output timing comes next to shift register A2, is inputted into the output stage of shift register A2.

According to this structure, as shown in FIG. 38(*b*), when timing signal SP inputted into shift registers A1 and B1, an output signal $a_1$ is outputted form shift register A1 in sync with a rise of a clock signal CKA of shift register series A, and an output signal $b_1$ is outputted from shift register B1 in sync with a rise of a clock signal CKB of shift register series B. Subsequently, an output signal $b_2$ is outputted from shift register B2 in sync with a rise of an inverse signal of clock signal CKB indicated as /CKB. Since connecting signal line 113 is connected to signal lines 110 through 112 under these conditions, output signal $b_2$ is inputted into shift register A3 instead of output signal $a_2$. Afterward, output signals $a_3$, $b_3$, . . . are outputted sequentially from the rest of the shift registers, respectively.

Thus, output signal $a_2$ can rise before clock signal CKA of shift register series A does so. As a result, not only the output timing of the output signal between the shift register series remains intact in time series, but also the disturbance of the signal can be minimized.

Note that the position of connecting signal line 113 and the other components in the drawing is an example. For instance, signal lines 111 connected to the outputs of the shift registers are provided above the shift registers in the present embodiment; however, they may be provided below the shift registers like shift register series B shown in FIG. 53(*a*).

Connecting signal line 113 may be omitted and signal lines 110 and 111 and signal line 112 may be connected directly. An explanation of how signal lines 110 through 112 and connecting signal line 113 are electrically connected to each other will be given below.

The shift register of FIG. 38(*a*) can be replaced with a shift register employing a clocked invertor, which is shown in FIG. 39. Each shift register in the drawing comprises an invertor and two clocked invertor.

Assume that shift register A2 has a fault, then wiring portions 114 and 115, which are respectively connected to signal lines 110 and 111, are disconnected when the output of sift register A2 gives an adverse effect to the other circuit sections such as the output stage thereof. This operation depends on a failure mode and wiring portions 114 and 115 do not have to be disconnected if the fault in shift register A2 gives substantially no adverse effect. Wiring portions 114 and 115 can be disconnected through irradiation of laser beams or the like.

In some failing modes, the output from shift register A2 may cause disturbance of a signal in the other circuit series connected to the input stage side of shift register A2. In such a case, the input stage of shift register A2 is also isolated from the other circuits.

Some examples of a method for connecting signal lines 110 and 111 and signal line 112 will be explained in the following.

FIGS. 40(*a*) and 40(*d*) show a case where connecting signal line 113 is used. As shown in the drawings, signal lines 110 and 112 (it is preferable if these two components are made of the same material in terms of process efficiency) are formed, so that an insulating layer 116 is sandwiched between the signal lines 110 and 112 and the connecting signal line 113. Then, connecting signal line 113 is provided to cross with signal lines 110 and 112 at right angles, and crossover portions 119 are melted using a laser beam or the like to make shorts between signal line 110 and connecting signal line 113 and signal line 112 and connecting line 113, respectively.

FIGS. 40(*b*) and 40(*e*) show a case where no connecting signal line 113 is used. Signal line 110 is provided so as to cross with signal line 112 with insulating layer 116 in between and a crossover portion 120 is melted, for example, through irradiation of a laser beam, to make a short between the wires layered vertically. The shape of signal lines 110 and 112 does not affect the signals sent through the same.

Signal line 112 of the upper layer may have a padwise portion as shown in FIG. 40(*c*) to increase the area of crossover portion 120. Then, a short can be made in a more secure manner and it is no longer necessary to upgrade the manufacturing accuracy for this purpose. Both signal lines 110 and 112 can have modified portions in arbitrary position. Also, both signal lines 110 and 112 can be of any shape, and thus they may have a curved portion.

Although it is not shown in the drawing, a switching element such as a TFT may be provided between signal line 110 or 111 and signal line 112. The switching element is turned on to make a short between these signal lines only when shift register A2 fails and kept turned off otherwise. A short may be made between these signal lines by a method other than those explained in the above.

The above exemplary methods using the connecting signal line are also applicable to an image display apparatus having polyphase (triple- or more phases) shift register series. Also, the shift register may be of a dynamic type, and the circuit thereof may include a transfer gate. It is also worth noting the effect of the present embodiment remains intact when phase polarities or the like of the clock signal and timing signal inputted into the shift register are reversed.

Seventeenth Embodiment

Figure 41:
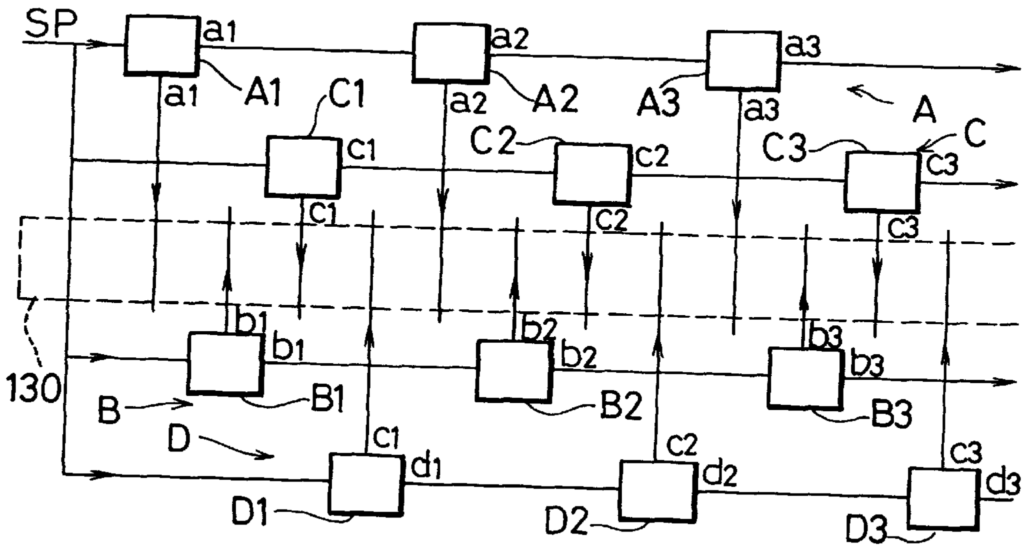
FIG. 41(*a*) is a block diagram depicting a structure of a conventional polyphase shift register circuit.
Figure 41:
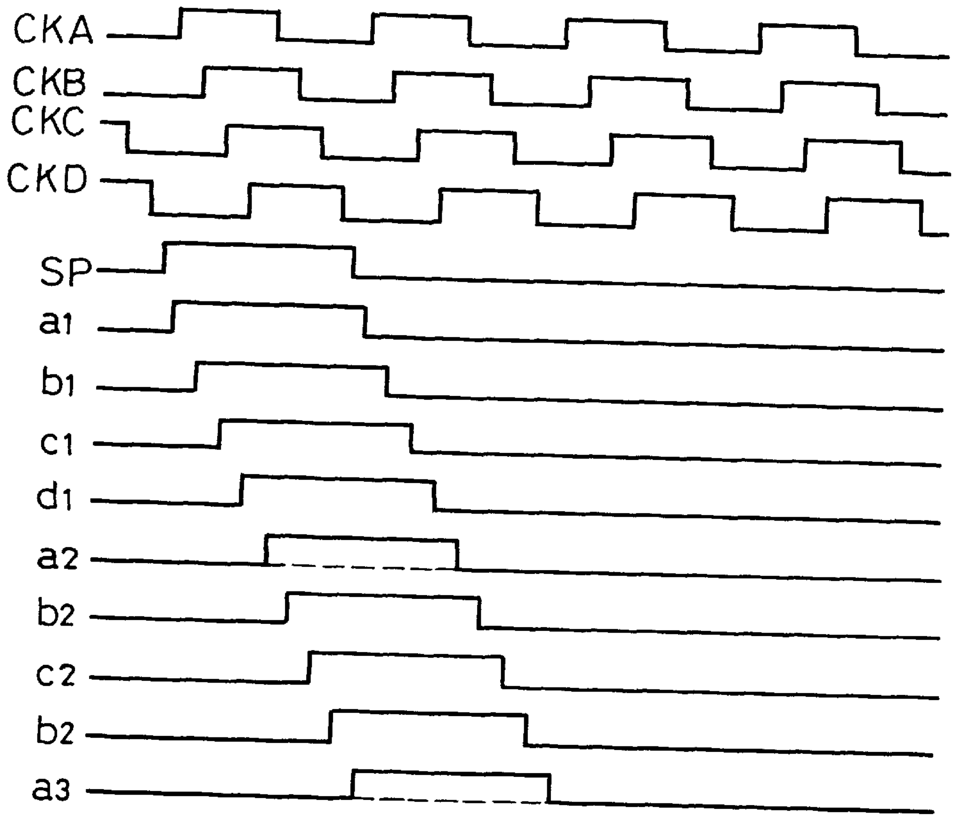
Figure 42A:
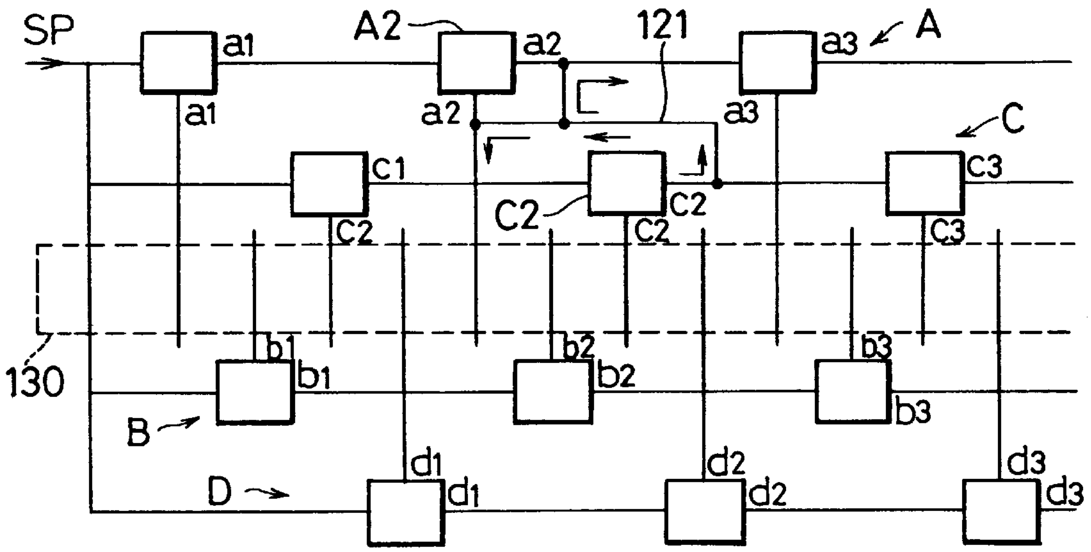
FIG. 42(*a*) is a block diagram depicting a structure of a polyphase shift register circuit of the matrix type image display apparatus of the seventeenth embodiment.
Figure 42B:
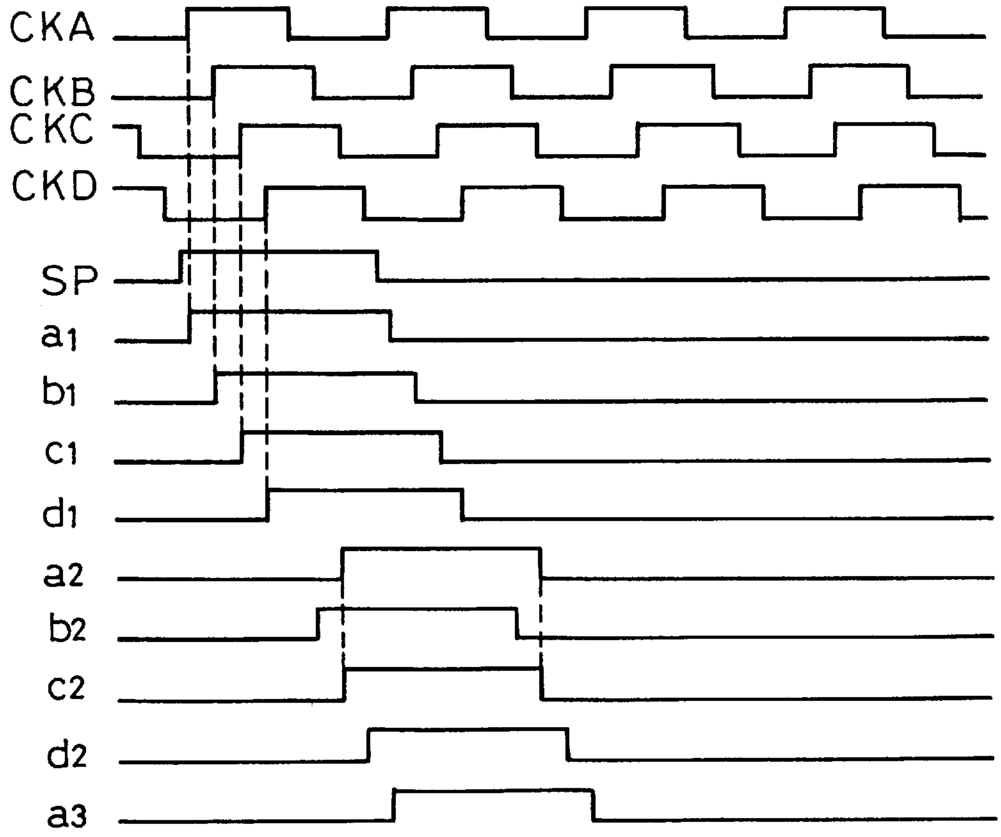

Referring to FIGS. 41 and 42, the following description describes an example seventeenth embodiment in accordance with the present invention. Hereinafter, like components are labeled with like reference numerals with respect to the above embodiments, and the description of these components is not repeated for the explanation's convenience.

As shown in FIG. 42(*a*), a driving circuit of a matrix type image display apparatus of the present embodiment includes quadruple-phase shift register series: a double-phase shift register series A and C, and a double-phase shift register series B and D with a display section 130 in between. When the signal line driving circuits for driving the elements are provided in the both sides of image display section 130 in this manner, an area occupied by the elements, such as transistors that drive the pixels individually, can be increased two-fold compared with a case where the signal line driving circuits are provided in one side alone. In other words, the accuracy and density of the pixels can be upgraded. The other circuits, such as buffers, sampling circuits, transfer circuits, and NOR circuits, are actually provided in the signal line driving circuit; however they are not the gist of the present embodiment, and the explanation thereof is omitted herein.

Like the sixteenth embodiment, the driving circuit includes connecting signal lines connecting the shift registers in different shift register series having consecutive output timings. In this case, an output signal $c_2$, a signal from a shift register C2 in shift register series C provided in the same side as shift register series A and whose output timing comes next to shift register A2, is connected to the output stage of shift register A2 by conducting means such as a connecting signal line 121. The conducting means can be realized by any exemplary method explained with reference to FIGS. 40(*a*) through 40(*e*) of the sixteenth embodiment.

As shown in FIG. 41(*a*), in case of a conventional driving circuit that does not include a connecting signal line 121, if shift register A2 in shift register series A fails, then the shift registers which otherwise output signals $a_2$ and $a_3$ indicated by solid lines in FIG. 41(*b*) output signals $a_2$ and $a_3$ indicated by dotted lines. As a result, all of the output signals from shift register A2 and those beyond shift register A2 in shift register series A will not rise.

To eliminate this problem, shift register A2 is isolated and connecting signal line 121 is connected as shown in FIG. 42(*a*) in the present embodiment, so that the signal line which should have received output signal $a_2$ receives output signal $c_2$ from shift register C2 instead.

According to the above structure, each line outputs the output signals as shown in FIG. 42(*b*). To be more specific, when a timing signal SP is inputted into shift registers A1, B1, C1, and D1 individually, output signals $a_1$, $b_1$, $c_1$ and $d_1$ are sequentially outputted from shift registers A1, B1, C1, and D1 in sync with the rises of clock signals CKA, CKB, CKC, and CKD of shift register series A, B, C, and D, respectively. Note that the clock signals are phase-shifted in the order of shift registers A1, B1, C1, and D1. Subsequently, output signals $b_2$ and $c_2$ are sequentially outputted from shift registers B2 and C2 in sync with the falls of clock signals CKB and CKC, respectively. Since connecting signal line 121 is connected to the signal lines under these conditions, an output signal $c_2$ is inputted into shift register A3 instead of output signal $a_2$. Afterwards, output signals $d_2$, $a_3$, . . . are sequentially outputted from the rest of the shift registers.

Although the output timing of output signal $a_2$ ($=c_2$) is displaced from the others in time series, a single fault may be acceptable.

When failing shift register A2 is a shift register forming the scanning signal line driving circuit, output signal $b_2$ generated by shift register B2 provided in the opposite side to shift register A2 can be used instead of output signal $a_2$, thereby eliminating the above signal disturbance in time series.

When failing shift register A2 is a part of the circuit forming a sample pulse generating circuit used when sampling a video signal, the above signal disturbance in time series can be corrected by changing the time series of the video signal subject to sampling.

Eighteenth Embodiment

Figure 43:
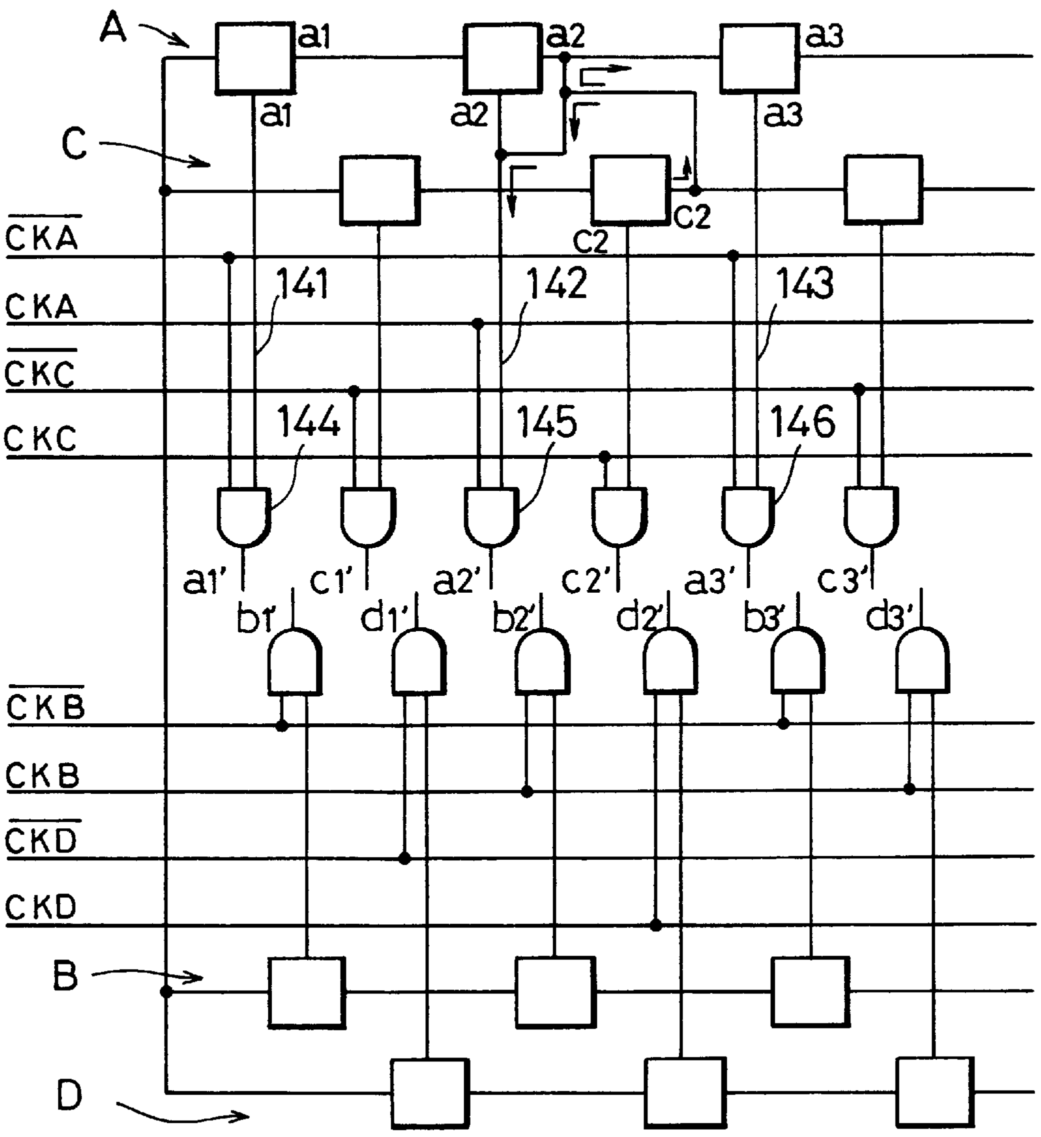
FIG. 43 is a block diagram depicting a structure of a polyphase shift register circuit of a matrix type image display apparatus in accordance with the eighteenth embodiment of the present invention.
Figure 44:
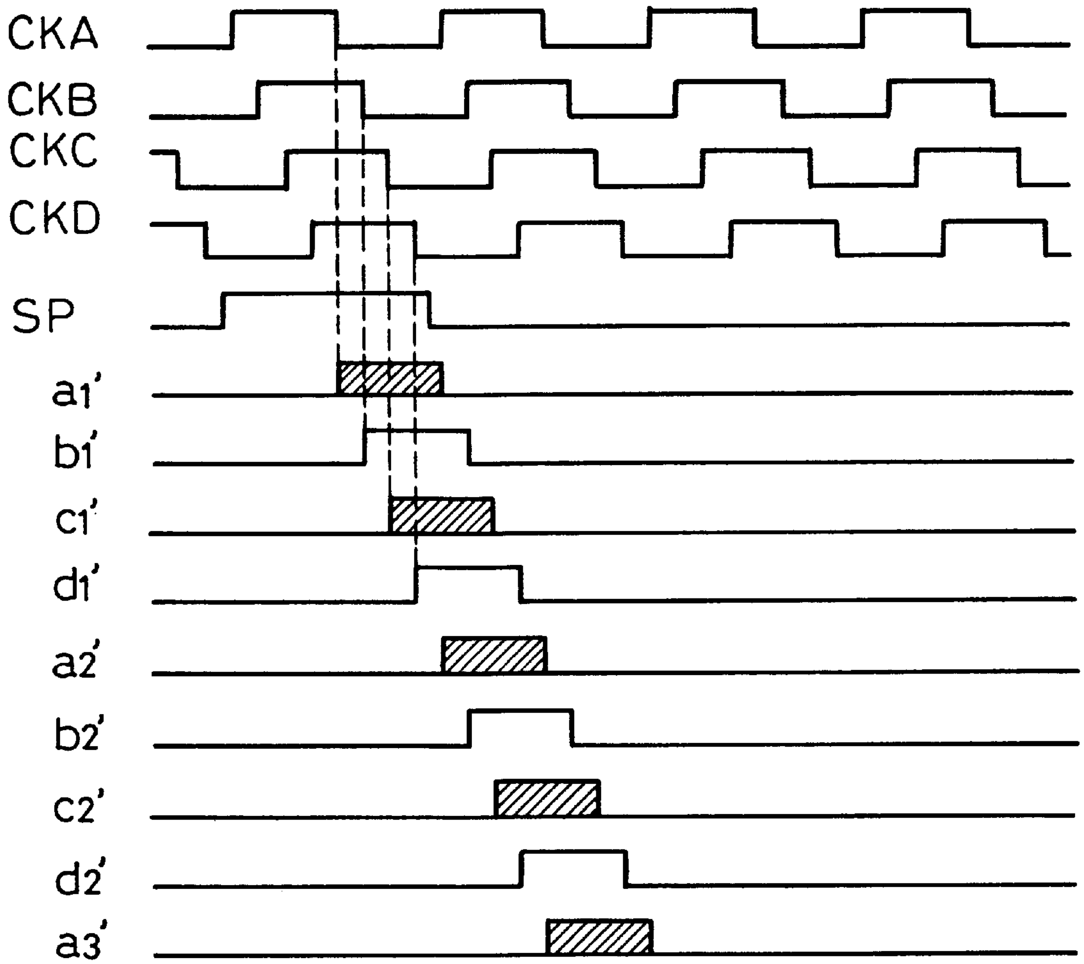
FIG. 44 is a timing chart of signals inputted into and outputted from the above polyphase shift register circuit.
Figure 45A:
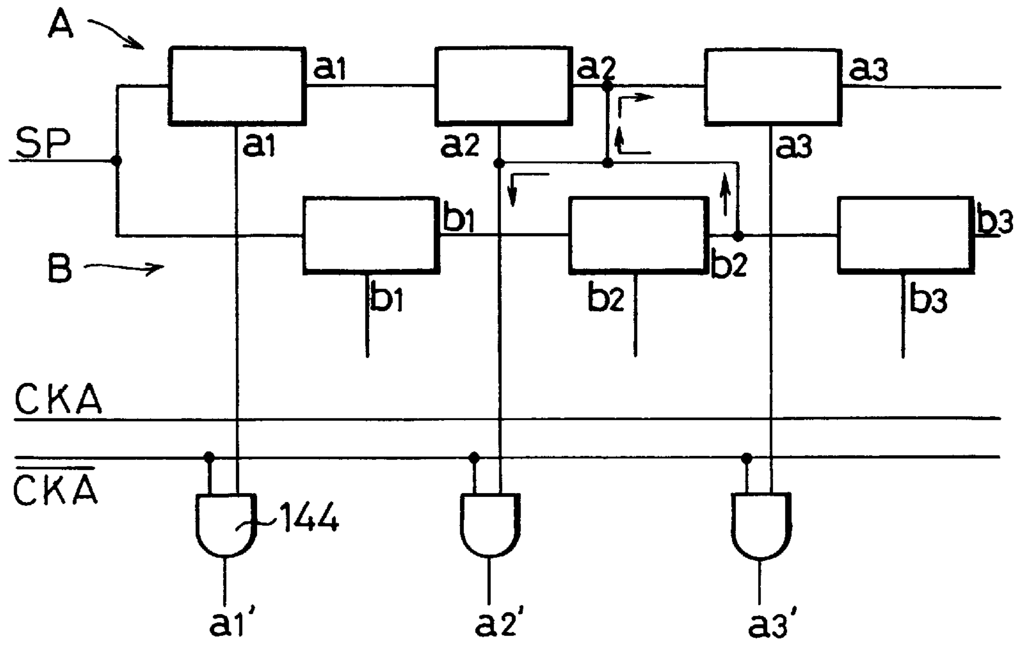
FIG. 45(*a*) is a block diagram depicting a structure of a polyphase shift register circuit when the structure of the eighteenth embodiment is applied to the structure of the sixteenth embodiment.
Figure 45B:
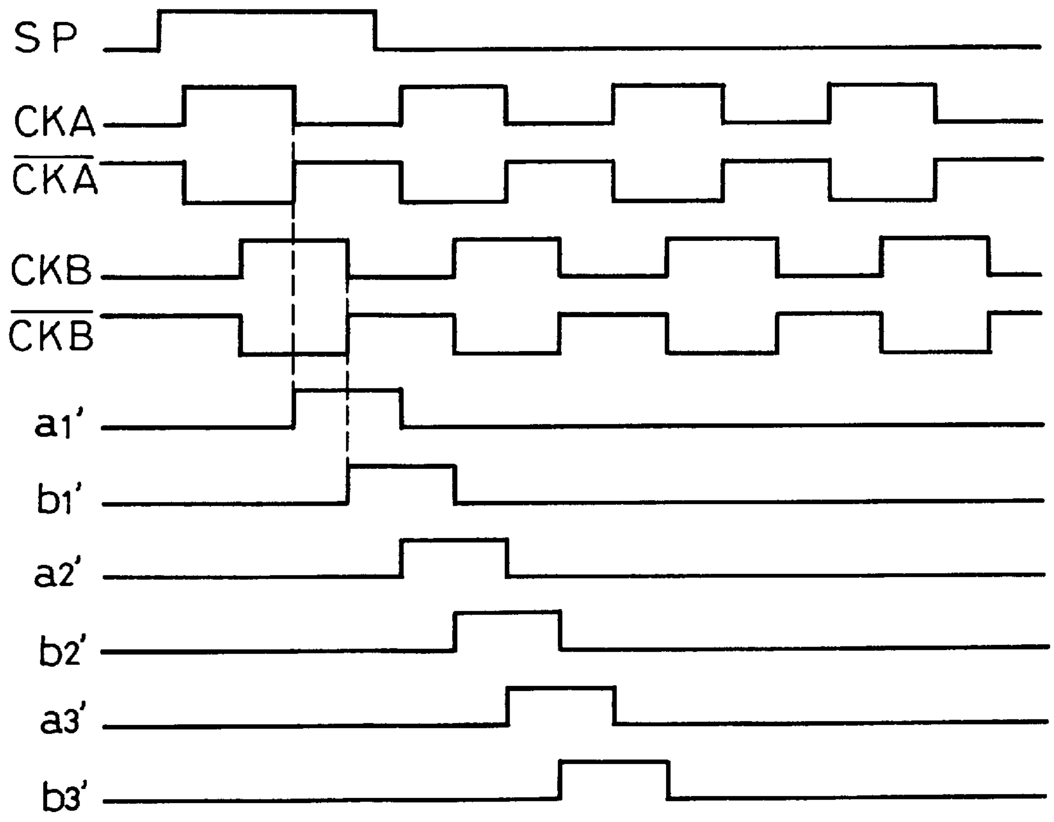

Referring to FIGS. 43 through 45, the following description describes an example eighteenth embodiment in accordance with the present invention. Hereinafter, like components are labeled with like reference numerals with respect to the above embodiments, and the description of these components is not repeated for the explanation's convenience.

FIG. 43 shows a polyphase shift register circuit in a matrix type image display apparatus of the present embodiment. The polyphase shift register circuit includes quadruple-phase shift register series: a double-phase shift register series A and C and a double-phase shift register series B and D.

Signal lines 141 through 143 in the output stage side to an image display section of each shift register in shift register series A are respectively connected to the input terminals of AND circuits 144 through 146 in one side. Clock signals inputted into each shift register and signals (including inverse signals) having the same timing as the clock signals, for example, a clock signal CKA and an inverse signal /CKA, are inputted into the other input terminals of AND circuits 144 through 146 in turn. More specifically, AND circuits 144 and 146 receive clock signal /CKA while AND circuit 145 receives clock signal CKA.

The input signals to AND circuits 144 through 146 may not be precisely in sync with the input signals (clock signals) into the shift registers, and signals having a close timing will do.

Similarly, AND circuits are connected to the output signal lines in shift register series C side, and a clock signal CKC and an inverse signal /CKC are inputted into these AND circuits. The same can be the with shift register series B and D in the opposite side.

According to the above structure, when shift register A2 fails, the fault is troubleshooted in the same manner as the seventeenth embodiment. Then, each shift register series outputs signals as shown in FIG. 42(*b*) of the seventeenth embodiment, which are further inputted into their respective AND circuits. Since a clock signal is inputted into each AND circuit at the same time, the resulting output signals become consistent in time series as shown in FIG. 44.

Thus, although output signal $a_1$ is displaced in time series in the seventeenth embodiment, such a displacement in time series can be eliminated in the present embodiment.

This method using the AND circuits can be applied to the double-phase shift register circuit of FIG. 38(*a*), a result of which is shown in FIG. 45(*a*). In the drawing, the logical circuits in shift register series B side are omitted.

For example, AND circuit 144 receives output signal al and clock signal /CKA of FIG. 38(*b*), and thus an output signal $a_1'$ of FIG. 45(*b*) is outputted. As a result, unlike output signals $a_n$ and $b_n$ obtained in a case where no AND circuits are used, the resulting output signals $a_n'$ and $b_n'$ will have neither an overlapped phase nor disturbance in time series.

If the outputs of adjacent output means in the same series are ORed, the resulting pulse matches with that of timing signal SP in width.

In this embodiment, AND circuits are used as the logical circuits in the output stages of the shift registers; however, other circuits may be used as the logical circuits. It is understood that when the other circuits are used, the polarity of input signals into the logical circuits or circuits connected to the outputs of the logical circuits must be changed adequately.

Nineteenth Embodiment

Figure 46A:
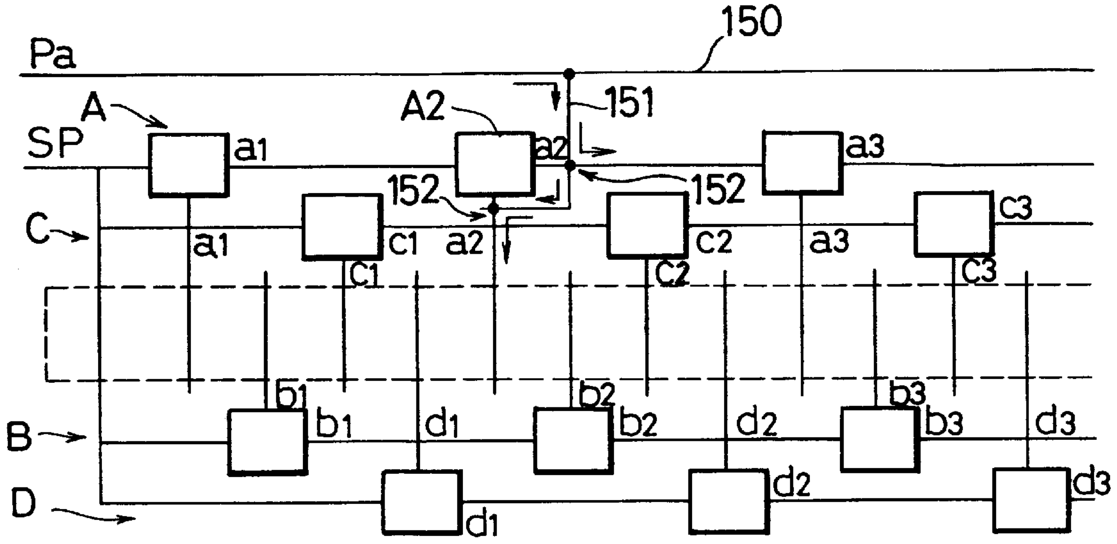
FIG. 46(*a*) is a block diagram depicting a structure of a polyphase shift register circuit of a matrix type image display apparatus in accordance with the nineteenth embodiment of the present invention.
Figure 46B:
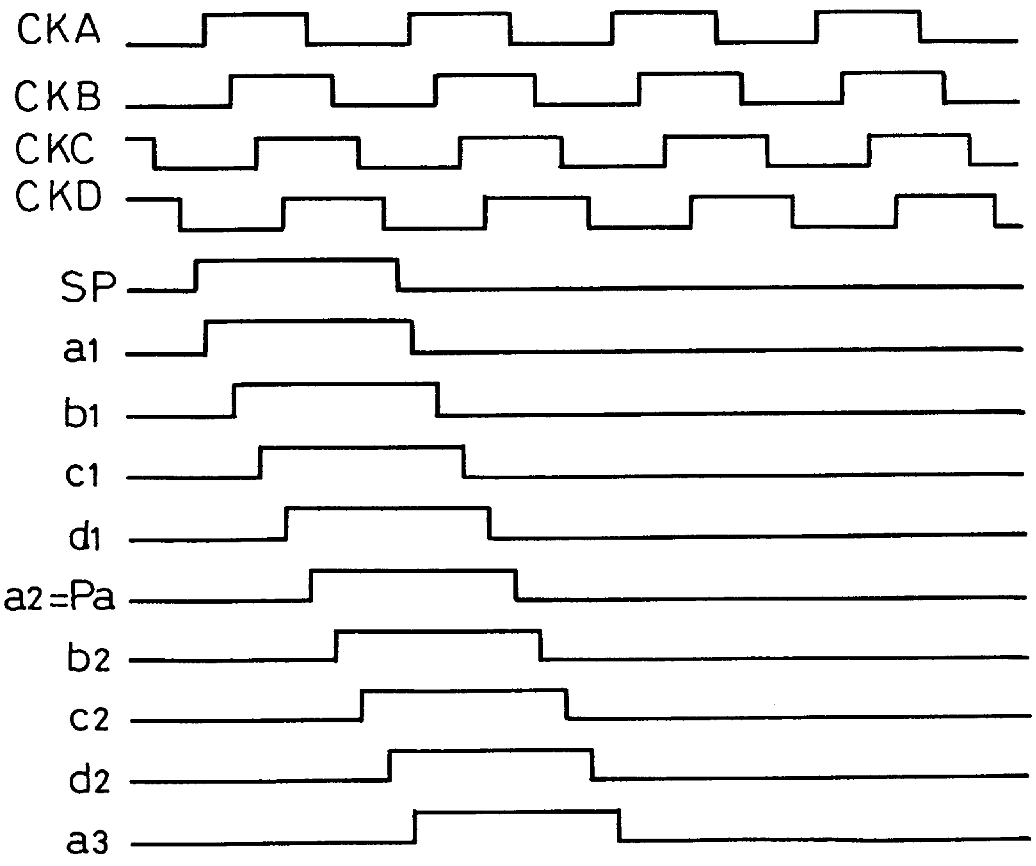

Referring to FIG. 46, the following description describes an example nineteenth embodiment in accordance with the present invention. Hereinafter, like components are labeled with like reference numerals with respect to the above embodiments, and the description of these components is not repeated for the explanation's convenience.

As shown in FIG. 46(*a*), a polyphase shift register circuit in a matrix type image forming apparatus of the present embodiment includes quadruple-phase shift register series like the seventeenth embodiment: a double-phase shift register series A and C and a double-phase shift register series B and C.

Although it is not fully shown in the drawing, an auxiliary signal line 150 is provided in such a manner that it can be connected to all of the shift registers in each shift register series to supply an auxiliary signal Pa. In FIG. 46(*a*), only a connecting signal line 151 connecting shift register A2 in shift register series A to auxiliary signal line 150 is shown; however, the connecting signal lines are provided for the rest of the shift registers in the same manner. The connecting signal lines can be realized by any of the exemplary methods in the sixteenth embodiment such as the one shown in FIGS. 40(*b*) and 40(*e*).

Assume that shift register A2 in the second stage of shift register series A fails and auxiliary signal Pa is to be inputted, then the input to and output from shift register A2 are adequately disconnected, while a short is made between the wires of the signal lines by irradiating a laser beam to crossover portions 152 and 152. Means for making a short between the signal lines may be, but not limited to, the switching elements as specified in the above.

Accordingly, auxiliary signal Pa whose phase matches with that of output signal $a_2$ of shift register A2 is inputted into auxiliary signal line 150, so that auxiliary signal line 150 can serve as shift register A2. As a result, output signal $a_2$ (=auxiliary signal Pa) is outputted as shown in FIG. 46(*b*), thereby making it possible to correct the operation of the image display apparatus.

Auxiliary signal line 150 includes an unillustrated changeover switch. Since shift register A2 fails herein, auxiliary signal Pa is the one shown in FIG. 46(*b*). However, if another shift register in the same shift register series or another shift register series fails, the auxiliary signal Pa is converted into an adequate one using the changeover switch.

If a plurality of auxiliary signal lines 150 are provided in a corresponding numbers with a fault ratio, almost all the failing shift registers can be corrected despite of an increased number of pixels to be driven, thereby further reducing the overall fault ratio and improving the yield of the image display apparatus.

Twentieth Embodiment

Figure 47A:
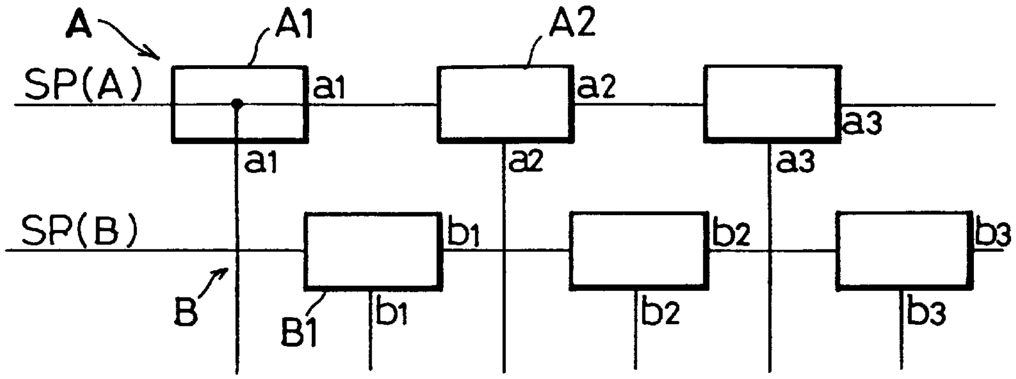
FIG. 47(*a*) is a block diagram depicting a structure of a polyphase shift register circuit of a matrix type image display apparatus in accordance with the twentieth embodiment of the present invention.
Figure 47B:
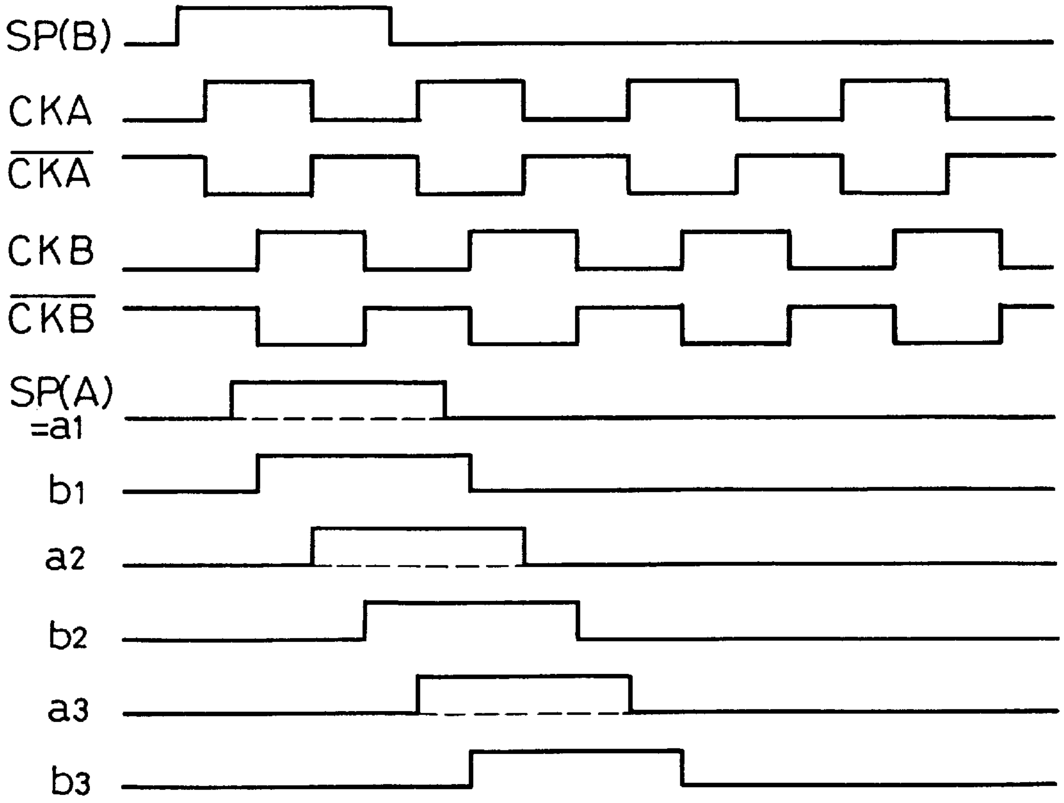

Referring to FIG. 47, the following description describes an example twentieth embodiment in accordance with the present invention. Hereinafter, like components are labeled with like reference numerals with respect to the above embodiments, and the description of these components is not repeated for the explanation's convenience.

A polyphase shift register circuit in a matrix type image display apparatus of the present embodiment includes shift register series A and B. A timing signal SP(A) and a timing signal SP(B) are inputted into shift register series A and B, respectively. Note that timing signals SP(A) and SP(B) are identical when there is no fault in the shift registers.

Assume that shift register A1 in the first stage of shift register series A fails in the conventional shift register circuit in which the same timing signal SP is inputted into shift register series A and B, then output signals $a_1$, $a_2$, $a_3$, . . . in shift register series A remain flat as indicted by dotted lines in FIG. 47(*b*). In such a case, shift register A1 is bypassed by irradiating laser beams to the gate of the transistor in shift register series A and crossover portions, so that timing signal SP can be sent to the next shift register. However, the same timing signal SP is inputted into shift register B1 and A2 in this case, and the time series of all the output signals between shift register series A and B are displaced.

To eliminate this problem, another timing signal SP(A), whose phase is shifted from that of timing signal SP(B), is inputted into the output stage of shift register A1. Timing signal SP(A) is a signal converted from timing signal SP(B) by shifting the phase thereof with unillustrated phase changing means. Timing signal SP(A) rises and falls before clock signal CKB does so; clock signal CKB controls output signal $b_1$ outputted from shift register B1 which has the output timing next to shift register A1. Further, timing signal SP(A) remains active with a certain timing signal in a specific period. Thus, resulting output signals are consistent in timer series as shown in FIG. 47(*b*).

Twenty-First Embodiment

Referring to FIGS. 48 through 52 and comparing with FIG. 53, the following description describes an example twenty-first embodiment in accordance with the present invention. Hereinafter, like components are labeled with like reference numerals with respect to the above embodiments, and the description of these components is not repeated for the explanation's convenience.

Figure 48A:
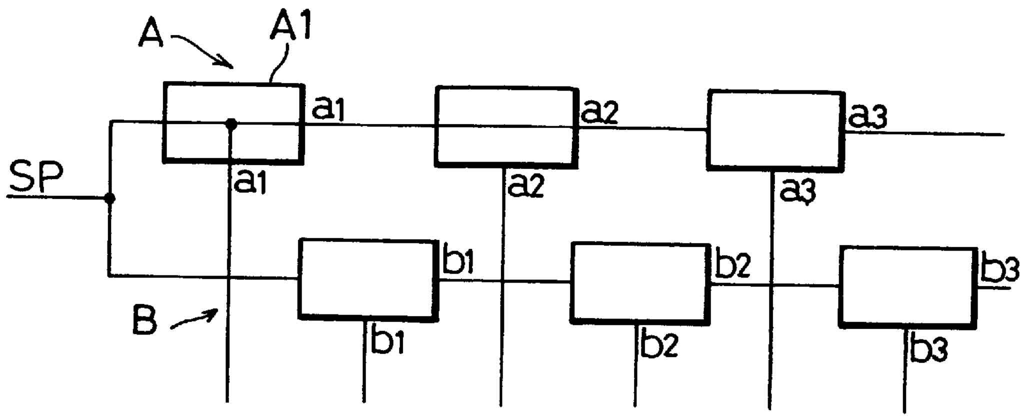
FIG. 48(*a*) is a block diagram depicting a structure of a polyphase shift register circuit of a matrix type image display apparatus in accordance with the twenty-first embodiment of the present invention.
Figure 48B:
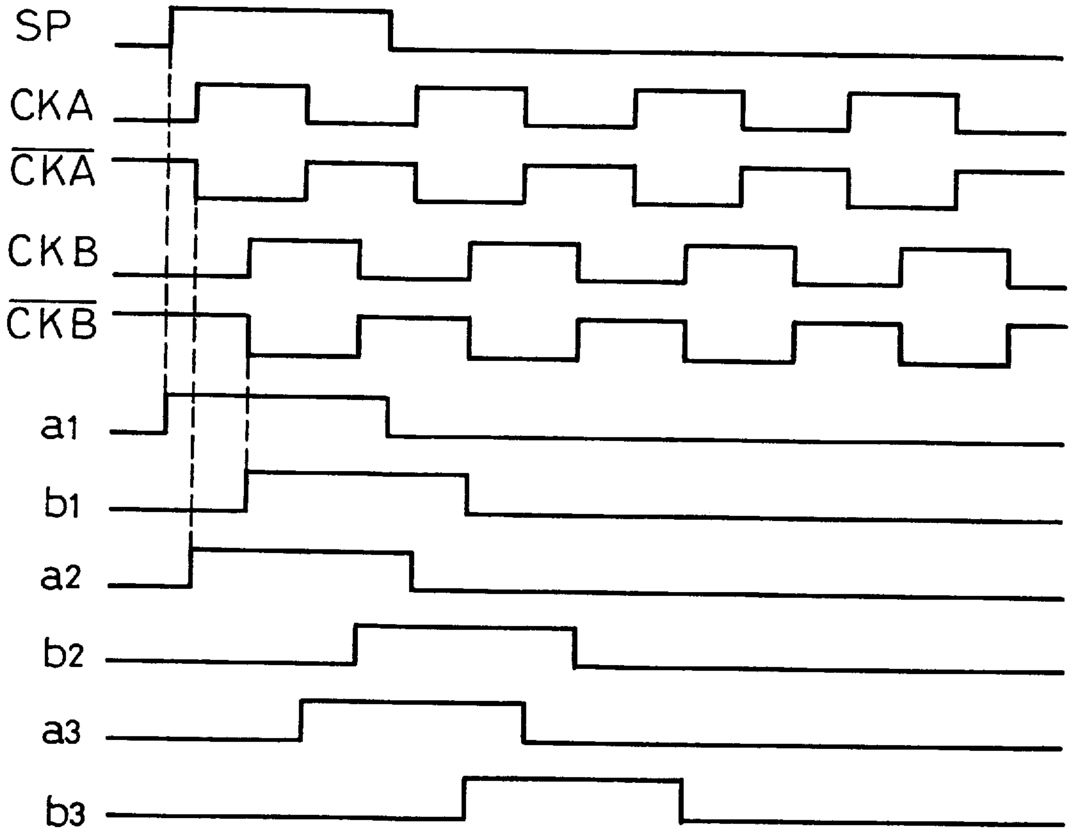

A polyphase shift register circuit in an image display apparatus of the present embodiment includes shift register series A and B as shown in FIG. 48(*a*). Although it is not shown in the drawing, changing means for converting the time series of a video signal is provided to a video signal input section of a scanning signal line driving circuit having the shift register circuit.

Figure 49A:
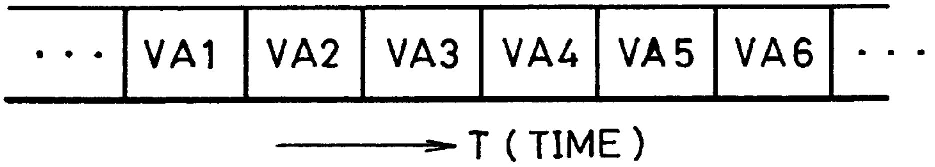
FIG. 49(*a*) is a view explaining a video signal inputted into the above polyphase shift register circuit.
Figure 49B:
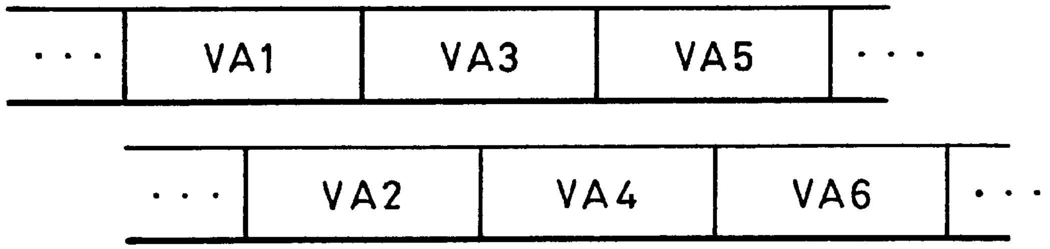
Figure 50:
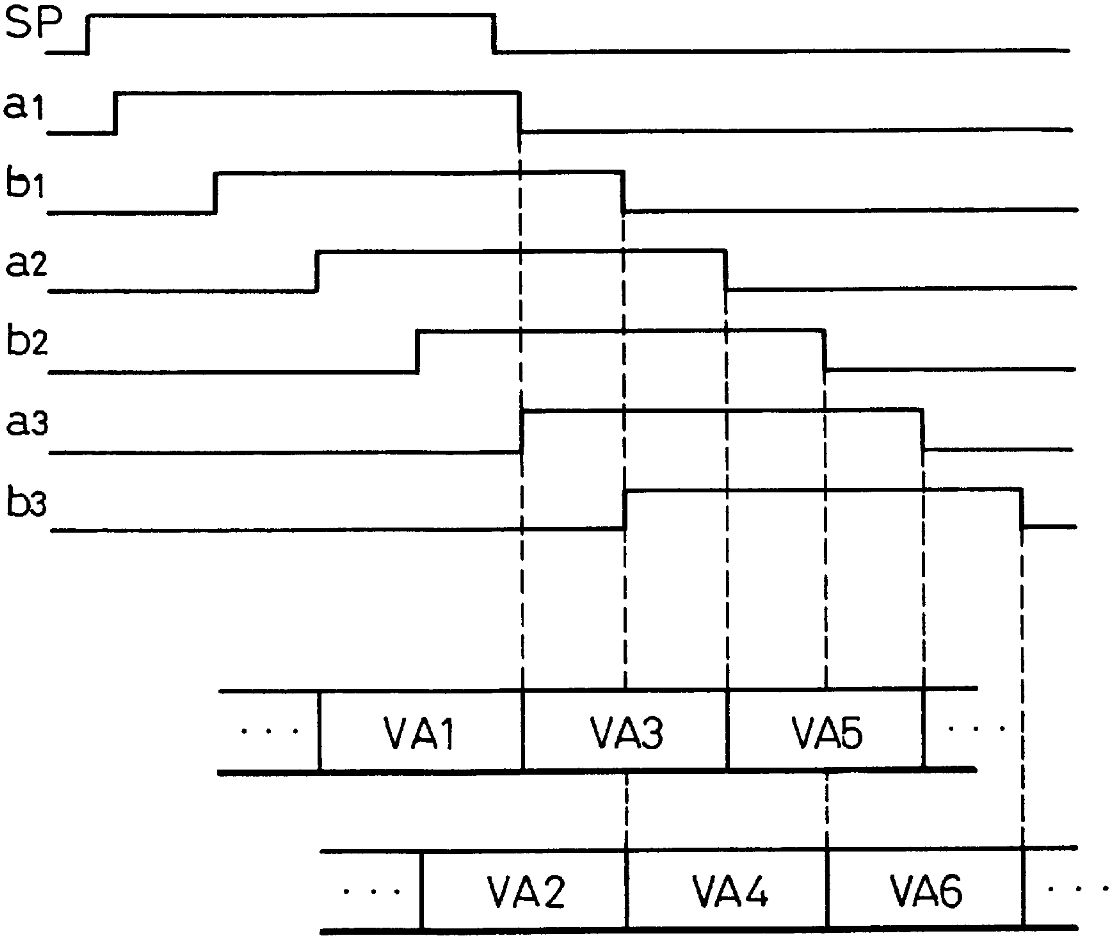
FIG. 50 is a view explaining a state of sampling when the video signal of FIG. 49(*b*) is inputted into the polyphase shift register circuit of FIG. 48(*a*) when the shift register in the first state operates normally.
Figure 51:
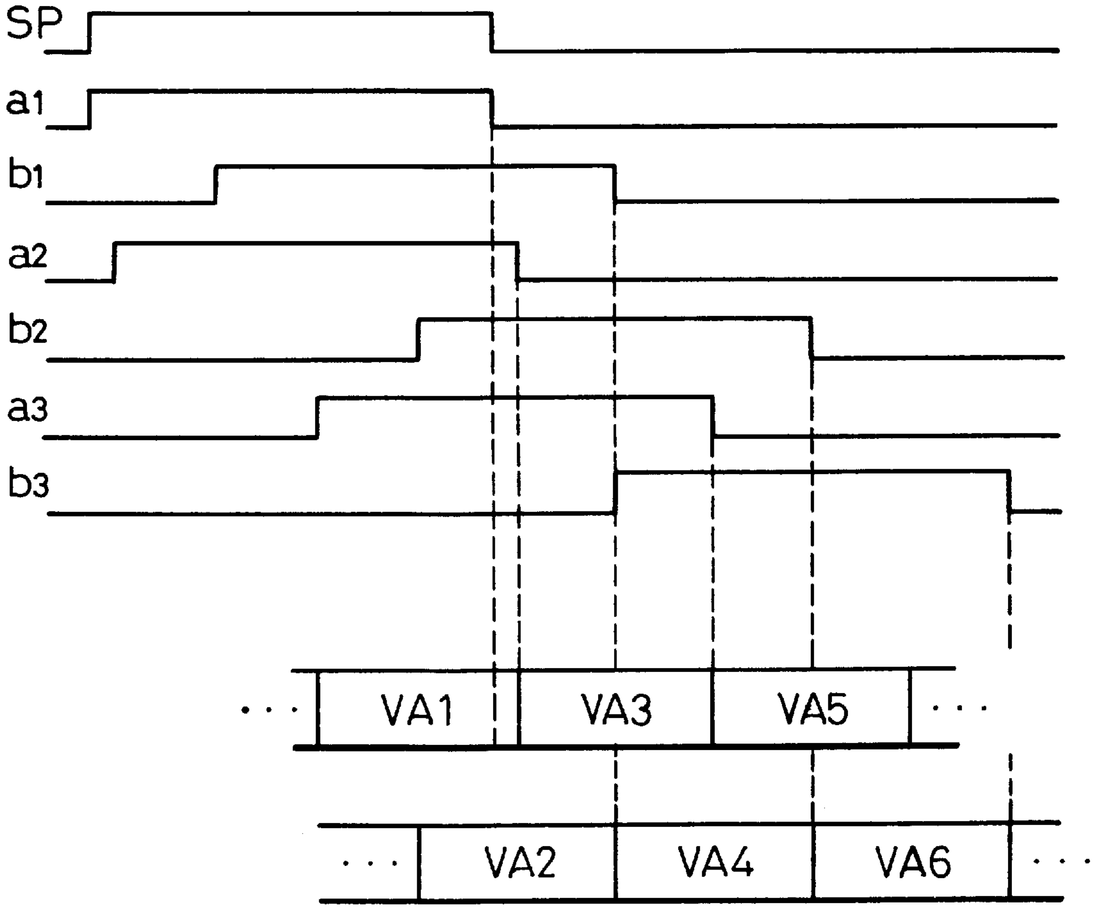
FIG. 51 is a view explaining a state of sampling when the video signal of FIG. 49(*b*) is inputted to the polyphase shift register circuit of FIG. 48(*a*) when the shift register in the first state of one of the shift register series has a fault.

Generally, video signals VA1–VA6 having an order of time-axis as shown in FIG. 49(*a*) are inputted into the video signal input section, and each video signal is time-base expanded in each shift register series. Thus, as shown in FIG. 49(*b*), the video signals are divided into two groups: a group of video signals VA1, VA3, and VA5 and a group of video signals VA2, VA4, and A6 for shift reciter series A and B, respectively. When the shift register in the first stage is operable under these condition, the output signals from each shift registers are those as set forth in FIG. 50. Thus, the video signal and output signal from the shift register correspond as those set forth in TABLE 1 below.

TABLE 1

| OUTPUT SIGNAL | $a_1$ | $b_1$ | $a_2$ | $b_1$ | $a_3$ | $b_3$ |
|---|---|---|---|---|---|---|
| VIDEO SIGNAL | VA1 | VA2 | VA3 | VA4 | VA5 | VA6 |

In this case, the time series of each output signal matches with those set forth in TABLE 1, and the position of the video signal is not displaced. Thus, a video is displayed normally.

However, in the circuit of FIG. 48(*a*), if the output stage and input stage are electrically connected due to the fault in shift register A1, the output timing chart is the one shown in FIG. 48(*b*). That is to say, since timing signal SP is outputted as output signal $a_1$, shift register series A and B are displaced in time series. When the video signals shown in FIG. 49(*b*) are captured in accordance with this timing chart, the corresponding video signal and output signal from the shift register are those shown in FIG. 51, which are set forth in TABLE 2 below.

TABLE 2

| OUTPUT SIGNAL | $a_1$ | $b_1$ | $a_2$ | $b_2$ | $a_3$ | $b_3$ |
|---|---|---|---|---|---|---|
| VIDEO SIGNAL | TOP OF VA1 | VA2 | END OF VA1 | VA4 | VA3 | VA6 |

In this case, the signals are displaced in time series, and a relative order of the captured video signals is transposed ( . . . -VA4-VA3-VA6). Thus, a video can not be reproduced normally.

Figure 52:
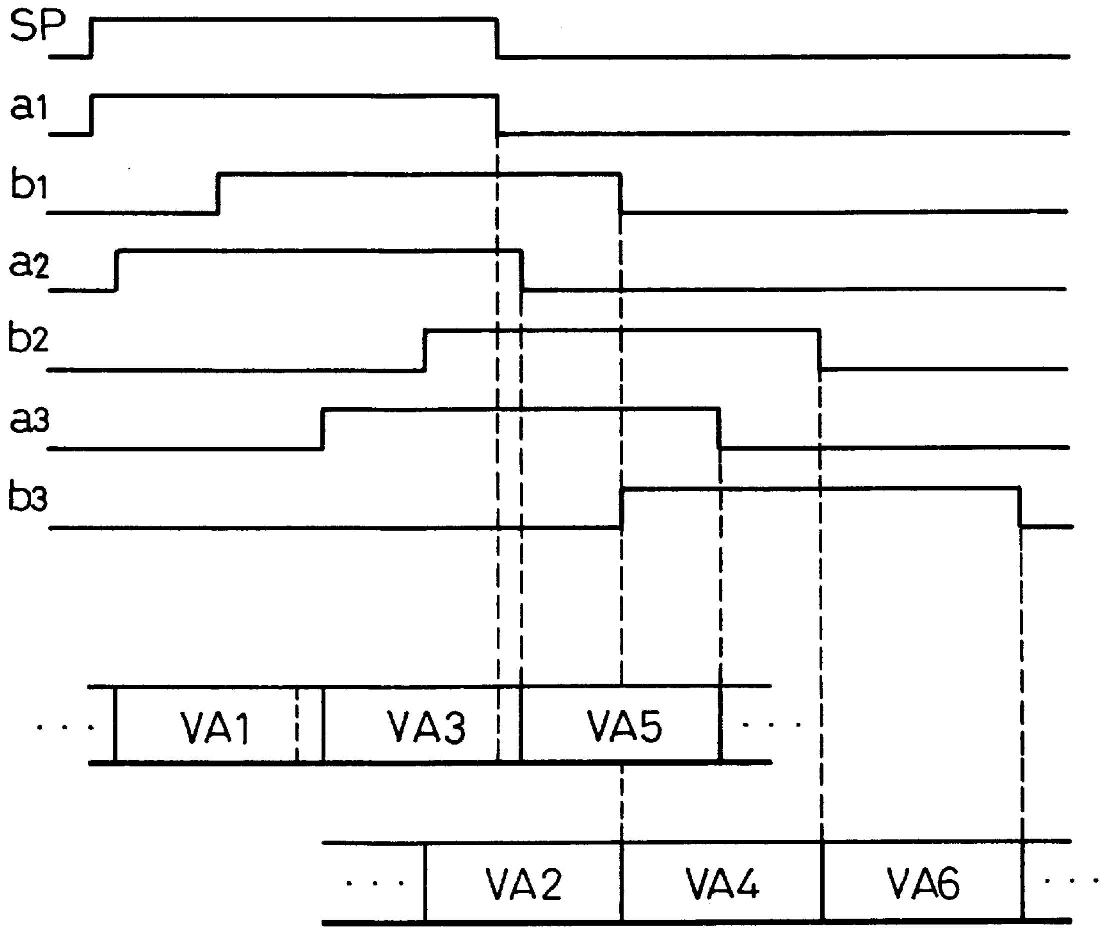
FIG. 52 is a view explaining a state of sampling when the video signal of FIG. 49(*b*) is converted by converting means and inputted to the polyphase shift register circuit of FIG. 48(*a*) in case that the shift register in the first state of one of the shift register series has a fault.

To eliminate this problem, the time series of the video signals displayed by shift register series A is moved forward for half a cycle as shown in FIG. 52 using the changing means, then the corresponding video signal and output signal from the shift register are those set forth in TABLE 3 below.

TABLE 3

| OUTPUT SIGNAL | $a_1$ | $b_1$ | $a_2$ | $b_2$ | $a_3$ | $b_3$ |
|---|---|---|---|---|---|---|
| VIDEO SIGNAL | TOP OF VA3 | VA2 | END OF VA3 | VA4 | VA5 | VA6 |

In this case, the video signals captured at the timing of output signals $a_1$ and $a_2$ are different from the original video signal, and the time series is displaced relatively between shift register series A and B. However, the displacement of the location of the video signal occurs in output signal $a_1$ alone which should have been outputted from shift register A1. Since one recognizes a video through the after-image phenomenon occurred when the scanning line displays are switched at a high speed, a minor displacement in time series within one scanning cycle in the entire screen is acceptable if there is no displacement in the video signal's position.

The gist of the present embodiment as to shift registers making up a signal line driving circuit of the image display apparatus is to correct the time series, and a primary interest is to prevent the disturbance in the time series at the timing at which the active period ends rather than at the timing at which the output signal is activated.

In the sixteenth through twenty-first embodiments, the outputs of the shift registers in the same series overlap in the preceding and following stages. However, the outputs are not necessarily overlapped with each other, and in such a case, the structure is changed adequately in each embodiment.

As has been explained, the matrix type image display apparatus in accordance with the present invention includes an image display section having a matrix of pixels, and at least one of a data signal line driving circuit and a scanning signal line driving circuit, which is formed on a single substrate monolithically with the pixels, comprises a plurality of shift register series having different clock phases.

Each shift register in each shift register series includes disconnecting means for disconnecting the input into and output from the shift register, and conducting means for connecting the output stage of a preceding shift register in one shift register series and an output signal line of a following shift register in another shift register series whose output timing comes next to the preceding shift register.

According to this structure, the image display apparatus includes pixels and shift registers which are formed monolithically, accelerates the image display speed by providing a plurality of shift register series in parallel. Thus, if a shift register (preceding shift register) has a fault, a shift register (following shift register) in another shift register series can supply an alternative output signal, thereby enabling the shift registers beyond the preceding shift register in the same shift register series to operate as if there were no fault in the shift register series.

Because the backup shift registers are no longer necessary, the operation of the shift register series can be improved without increasing the area of the non-display section.

When the preceding and following shift registers have consecutive output timings, the output signal can be corrected without causing a delay in the operation of the shift registers beyond the preceding shift register and transposing the time series of the output signals.

When two shift register series groups each having at least two shift register series are provided with the image display section in between, and the preceding and following shift registers are in the same shift register series group, not only the output signal can be corrected by minimizing the transposition in time series, but also the conducting means does not have to be routed through the lower surface of the image display section. Thus, the conducting means can be structured in a simpler manner and the backup shift registers can be omitted, thereby making it possible to save the manufacturing costs without increasing an area of the non-display section.

The matrix type image display apparatus in accordance with the present invention includes an image display section having a matrix of pixels, and at least one of a data signal line driving circuit and a scanning signal line driving circuit, which is formed on a single substrate monolithically with the pixels, comprises a plurality of shift register series having different clock phases.

In addition, conducting means, which is usually isolated from the driving circuit electrically, is provided to connect the input stage and output stage of a first shift register in the first stage of each shift register series, and changing means for changing the time series between the video signals inputted into the shift register series individually are provided.

According to the above structure, the image display apparatus includes pixels and shift registers which are formed monolithically, and accelerates an image display speed by placing a plurality of shift register series in parallel. Thus, if the shift register in the first stage in each shift register series fails, a relative time series of a video signal between the shift register series can be changed.

Accordingly, an amount of displacement in time series can be reduced and a displacement of a position of the video signal can be eliminated. Therefore, the image display apparatus can troubleshoot a fault so as not to cause any inconvenience.

When the driving circuit further includes a logical circuit, which receives an output signal from a shift register and a clock signal that determines an output timing of the shift register, between the shift register and output stage in the image display side thereof, a logical operation is performed using a corrected signal obtained when the preceding shift register fails and the clock signal supplied to the preceding shift register, and the result of which is supplied to the image display section side.

Accordingly, if the corrected signal has a mismatching in time series, such as superimposed portion in time series and transposition of the output in time series, the fault can be troubleshooted completely, thereby ensuring the above-explained effect. Also, an image display apparatus capable of realizing an accurate image display can be provided.

The matrix type image display apparatus in accordance with the present invention includes an image display section having a matrix of pixels, and at least one of a data signal line driving circuit and a scanning signal line driving circuit, which is formed on a single substrate monolithically with the pixels, comprise a plurality of shift register series having different clock phases.

The image display apparatus further includes an auxiliary signal line for sending an alternative signal, while each shift register in each shift register series includes disconnecting means for disconnecting an input from and an output from the shift register, and conducting means, which is usually isolated from the driving circuit electrically, for connecting the auxiliary signal line and the output stage of each shift register.

According to the above structure, an alternative signal can be supplied to each shift register by the auxiliary signal line and conducting means, and therefore, if any of the shift registers fails, the alternative signal can be supplied to the output stage thereof.

Accordingly, the backup shift registers can be omitted, and a resulting image display apparatus can improve the operation of the shift register series without increasing an area of the non-display section.

When changeover means for switching signals supplied to the auxiliary signal line is additionally provided, a plurality of clock signals and video signals can be supplied to a single auxiliary signal line.

Accordingly, when the faults are less likely to occur in a plurality of shift register series simultaneously, the auxiliary signal line can be shared with a plurality of shift register series, thereby reducing the number thereof.

The matrix type image display apparatus in accordance with the present invention includes an image display section having a matrix of pixels, and at least one of a data signal line driving circuit and a scanning signal line driving circuit, which is formed on a single substrate monolithically with the pixels, comprise a plurality of shift register series having different clock phases.

The signal line driving circuit comprises a plurality of shift register series having different clock phases, conducting means, which is usually isolated from the driving circuit electrically, for connecting the input stage and an output stage of a shift register in the first stage of each shift register series, and phase changing means for changing a phase of a timing signal supplied to the shift register.

According to this structure, if the shift register in the first stage in the shift register series fails, the output stage of the failing shift register can produce a correct output signal using the timing signal.

Thus, if the shift register in the first stage in the shift register series fails, a resulting image display apparatus can correct the operation of the shift register series of the failing shift register without changing the time series of the output signal.

The invention being thus described, it will be obvious that the same may be varied in may ways. Such variations are not to be regarded as a departure from the spirit and scope of the invention, and all such modification as would be obvious to one skilled in the art are intended to be included within the scope of the following claims.

What is claimed is:

1. A matrix type image display apparatus comprising:

a matrix of display pixels;

a data signal line driving circuit for supplying a video signal to each pixel;

a scanning signal line driving circuit for controlling a writing operation to each pixel, said data signal line driving circuit being composed of:

at least one block including a scanning circuit for outputting a pulse signal in time series, and a video signal output circuit for capturing a video signal in sync with said pulse signal to output said video signal to a data signal line, wherein each block includes:

regular video signal output circuits in an equal number of the scanning circuits and the data signal lines;

at least one backup video signal output circuit; and a plurality of switching means for selectively connecting a scanning circuit and a data signal line to a corresponding regular video signal output circuit, or to either of an adjacent regular video signal output circuit or to an adjacent backup video signal output circuit, and when a regular video signal output fails, said switching means isolates a failed regular video signal output circuit from the scanning circuit and data signal line corresponding to the failed circuit, and disconnects each video signal output circuit between the failed regular video signal output circuit and an unused backup video signal output circuit from corresponding scanning circuits and data signal lines, and said switching means sequentially connects each disconnected video signal output circuit to a scanning circuit and data signal line previously corresponding to an adjacent video signal output circuits and connects the unused backup video signal output circuit to a scanning circuit and data signal line previously corresponding to a video signal output circuit adjacent to the backup video signal output circuit.

2. The matrix type image display apparatus as defined in claim 1, wherein said switching means is controlled by control means composed of a plurality of fuses and a resistance element which are serially connected between two power source terminals and another fuse placed adjacently to said resistance element.

3. The matrix type image display apparatus as defined in claim 1, wherein said switching means is controlled by control means including two series each composed of a plurality of fuses and a resistance element which are serially connected between two power source terminals, said two series having electric potential directions reversed to each other.

4. The matrix type image display apparatus as defined in claim 3, wherein said control means includes another fuse adjacently to said resistance element in each series.

5. The matrix type image display apparatus as defined in claim 1, wherein said switching means is controlled by control means composed of a plurality of fuses which are connected serially between two power source terminals and an anti-fuse provided in one power source side.

6. The matrix type image display apparatus as defined in claim 1, wherein said switching means is controlled by control means in an equal number of said scanning circuits, each control means being composed of a fuse and a resistance element connected to their respective two power source terminals.

7. The matrix type image display apparatus as defined in claim 1, wherein said switching means is controlled by control means in an equal number of said scanning circuits, each control means being composed of a pair of a fuse and an anti-fuse.

8. The matrix type image display apparatus as defined in claim 1 further comprising means for directly outputting the video signal captured in sync with said pulse signal to the data signal line.

9. The matrix type image display apparatus as defined in claim 1 further comprising means for amplifying the video signal captured in sync with said pulse signal and for outputting said amplified video signal to the data signal line.

10. The matrix type image display apparatus as defined in claim 1, wherein said data signal line driving circuit is made of a thin film transistor of non-single crystalline silicon.

11. A matrix type image display apparatus as in claim 1 wherein:

after the failed video signal output circuit is isolated from the scanning circuit and data signal line corresponding to the failed circuit, the switching means sequentially disconnects a series of adjacent video signal output circuits from corresponding scanning circuits and data signal lines, and connects each video signal output circuit of said series to the scanning circuits and data signal lines corresponding to an adjacent video signal output circuit, where a first adjacent video signal output circuits is adjacent the failed circuit and a last adjacent video signal output circuit to be connected is the at least one backup video signal output circuit.

12. A matrix type image display apparatus comprising:

a matrix of display pixels;

a data signal line driving circuit for supplying a video signal to each pixel;

a scanning signal line driving circuit for controlling a writing operation to each pixel, said data signal line driving circuit including:

at least one block including a scanning circuit for outputting a pulse signal in time series; and a video signal output circuit for capturing a video signal in sync with said pulse signal to output said video signal to a data signal line, wherein each block includes:

regular video signal output circuits in an equal number to the scanning circuits and the data signal lines;

at least one backup video signal output circuit; and switching means for selectively connecting each scanning circuit and each data signal line to any of a plurality of adjacent video signal output circuits and said switching means is controlled by a control means having a plurality of fuses and a resistance element which are connected serially between two power source terminals.

13. The matrix type image display apparatus as defined in claim 12, wherein said switching means includes:

a first switching element for receiving a first output between two adjacent fuses; and a second switching element for receiving a second output which is an inverse signal of said first output, whereby an output from each scanning circuit is inputted into adjacent video signal output circuits and outputted from one of said adjacent video signal output circuits by said first and second switching elements.

14. The matrix type image display apparatus as defined in claim 13, wherein said first and second switching elements are n-channel transistors.

15. The matrix type image display apparatus as defined in claim 13, wherein said first and second switching elements are CMOS transistors.

16. The matrix type image display apparatus as defined in claim 12, wherein each fuse is made of a metal wire which is disconnected when thermal energy is conferred and a material making up said metal wire is changed.

17. A matrix type image display apparatus comprising:

a matrix of display pixels;

a data signal line driving circuit for supplying a video signal to each pixel; and a scanning signal line driving circuit for controlling a writing operation to each pixel, said data signal line driving circuit being composed of:

at least a block including a scanning circuit for outputting a pulse signal in time series, and a video signal output circuit for capturing a video signal in sync with said pulse signal to output said video signal to a data signal line, wherein each block includes:

regular scanning circuits and regular video signal output circuits both in an equal number of said data signal lines;

at least one backup scanning circuit and at least one backup video signal output circuit;

a plurality of first switching means that, each selectively connect a corresponding data signal line to a regular video signal output circuits, or to either an adjacent regular video signal output circuit or an adjacent backup video signal output circuit, and a plurality of second switching means that each selectively connect a regular video signal output circuit to a corresponding regular scanning circuit, or to either an adjacent regular scanning circuit or an adjacent backup scanning circuit, wherein when a regular video signal output circuit fails, said first switching means isolates the failed circuit from said corresponding data signal line, and disconnects from a corresponding data signal lines from each video signal output circuit between the failed circuit and an unused backup video signal output circuit, and said first switching means sequentially connects each disconnected video signal output circuit to a data signal line previously corresponding to an adjacent video signal output circuit and connects the unused backup video signal output circuit to a data signal line, and when a regular scanning circuit fails, the second switching means isolates the failed scanning circuit from a corresponding video signal output circuit, and disconnects from a corresponding video signal output circuit each scanning circuit between the failed scanning circuit and an unused backup scanning circuit, and the second switching means sequentially connects the disconnected scanning circuits to a video signal output circuit previously corresponding to an adjacent scanning circuit and connects the unused backup scanning circuit to a video signal output circuit.

18. The matrix type image display apparatus as defined in claim 17, wherein said switching means and second switching means are controlled by control means composed of a plurality of fuses and a resistance element which are connected serially between two power source terminals.

19. The matrix type image display apparatus as defined in claim 17 further comprising means for directly outputting the video signal captured in sync with said pulse signal to the data signal line.

20. The matrix type image display apparatus as defined in claim 17 further comprising means for amplifying the video signal captured in sync with said pulse signal and for outputting the amplified video signal to the data signal line.

21. The matrix type image display apparatus as defined in claim 17, wherein said data signal line driving circuit is made of a thin film transistor of non-single crystalline silicon.

22. A matrix type image display apparatus as in claim 17 wherein:

when the regular video signal output circuit fails and is isolated, said switching means connects an adjacent video signal output circuit to the data signal line previously corresponding to the failed regular video signal output circuit, and sequentially connects disconnected video signal output circuits to a data signal line previously corresponding to an adjacent video signal output circuit, until the backup video signal output circuit is connected to a data signal line, and when the regular scanning circuit fails and is isolated, the switching means connects an adjacent scanning circuit to the video signal output circuit previously corresponding to the failed scanning circuit, and sequentially connects disconnected scanning circuits to video signal output circuit previously corresponding to an adjacent scanning circuit, until the backup scanning circuit is connected to a video signal output circuit.

23. A matrix type image display apparatus comprising:

a matrix of display pixels;

a data signal line driving circuit for supplying a video signal to each pixel; and a scanning signal line driving circuit for controlling a writing operation to each pixel, said scanning signal line driving circuit being composed of:

at least one block including a scanning circuit for outputting a pulse signal in time series, and a scanning signal output circuit for outputting scanning signals sequentially to scanning signal lines in sync with said pulse signal, wherein each block includes:

regular scanning signal output circuits in an equal number of said scanning circuits and scanning signal lines;

at least one backup scanning signal output circuit; and a plurality of switching means for selectively connecting a scanning signal line to a corresponding regular scanning signal output circuit or to either an adjacent regular scanning signal output circuit or to an adjacent backup scanning signal output circuit, wherein when a regular scanning signal output circuit fails, said switching means isolates a failed regular scanning circuit from a corresponding scanning signal line, and disconnects the scanning lines from each scanning signal output circuit between the failed circuit and an unused backup scanning signal output circuit, and the switching means sequentially connects the disconnected scanning signal output circuits to scanning signal lines previously corresponding to adjacent signal output circuits, and connects the unused backup scanning signal output circuit to a scanning signal line.

24. The matrix type image display apparatus as defined in claim 23, wherein said switching means is controlled by control means composed of a plurality of fuses and a resistance element which are serially connected between two power source terminals, and another fuse placed adjacently to said resistance element.

25. The matrix type image display apparatus as defined in claim 23, wherein said switching means is controlled by control means including two series each composed of a plurality of fuses and a resistance element which are serially connected between two power source terminals, said two series having electric potential directions reversed to each other.

26. The matrix type image display apparatus as defined in claim 23, wherein said control means includes another fuse adjacently to said resistance element in each series.

27. The matrix type image display apparatus as defined in claim 23, wherein said switching means is controlled by control means composed of a plurality of fuses which are connected serially between two power source terminals and an anti-fuse provided in one power source side.

28. The matrix type image display apparatus as defined in claim 23, wherein said switching means is controlled by control means in an equal number of said regular scanning circuits, each control means being composed of a fuse and a resistance element connected to their respective two power source terminals.

29. The matrix type image display apparatus as defined in claim 23, wherein said switching means is controlled by control means in an equal number of said regular scanning circuits, each control means being composed of a pair of a fuse and an anti-fuse.

30. The matrix type image display apparatus as defined in claim 23, wherein said scanning signal line driving circuit is made of a thin film transistor of non-single crystalline silicon.

31. A matrix type image display apparatus as in claim 23 wherein:

when said regular scanning signal output circuit fails and is isolated, said switching means connects the scanning signal line previously corresponding to the failed circuit to a scanning signal output circuit adjacent to the failed circuit, and further said switching means sequentially connects scanning signal output circuits to scanning signal lines previously corresponding to adjacent signal output circuits until the switching means connects the backup scanning signal output circuit to a corresponding scanning signal lines for an adjacent regular signal output circuit.

32. A matrix type image display apparatus comprising:

a matrix of display pixels;

a data signal line driving circuit for supplying a video signal to each pixel; and a scanning signal line driving circuit for controlling a writing operation to each pixel, said scanning signal line driving circuit including:

at least one block having a scanning circuit for outputting a pulse signal in time series; and a scanning signal output circuit for outputting scanning signals sequentially to scanning signal lines in sync with said pulse signal, wherein each block includes:

regular scanning signal output circuits in an equal number to said scanning circuits and scanning signal lines;

at least one backup scanning signal output circuit; and switching means for connecting each scanning circuit and each scanning signal line to any of a plurality of adjacent scanning signal output circuits, wherein said switching means is controlled by a control means having a plurality of fuses and a resistance element which are serially connected between two power source terminals.

33. The matrix type image display apparatus as defined in claim 32, wherein said switching means includes a first switching element for receiving a first output between two adjacent fuses, and a second switching element for receiving da second output which is an inverse signal of said first output, whereby an output from each scanning circuit is inputted into adjacent scanning signal output circuits and outputted from one of said adjacent scanning signal output circuit by said first and second switching elements.

34. The matrix type image display apparatus as defined in claim 33, wherein said first and second switching elements are n-channel transistors.

35. The matrix type image display apparatus as defined in claim 33, wherein said first and second switching elements are CMOS transistors.

36. The matrix type image display apparatus as defined in claim 32, wherein each fuse is made of a metal wire which is disconnected when thermal energy is conferred and a material making up said metal wire is changed.

37. A matrix type image display apparatus comprising:

a matrix of display pixels;

a data signal line driving circuit for supplying a video signal to each pixel; and a scanning signal line driving circuit for controlling a writing operation to each pixel, said scanning signal line driving circuit being composed of:

at least one block including a scanning circuit for outputting a pulse signal in time series; and a scanning signal output circuit for outputting scanning signals sequentially to scanning signal lines in sync with said pulse signal, each block including:

regular scanning circuits and regular scanning signal output circuits both in an equal number of the scanning signal lines;

at least one backup scanning circuit and at least one backup scanning signal output circuit;

a plurality of first switching means that each selectively connect a corresponding data signal line to a regular video signal output circuit, or to either an adjacent regular video signal output circuit or an adjacent backup video signal output circuit, and a plurality of second switching means that each selectively connect a regular video signal output circuit to a corresponding regular scanning circuit, or to either an adjacent regular scanning circuit or an adjacent backup scanning circuit, wherein when a regular video signal output circuit fails, said first switching means isolates a failed regular video signal output circuit from a corresponding data signal line, and disconnects from a corresponding data signal line each video signal output circuit between the failed regular video signal output circuit and an unused backup video signal output circuit, and the first switching means sequentially connects each disconnected video signal output circuit to a data signal line previously corresponding to an adjacent video signal output circuits and connects the unused backup video signal output circuit to a data signal line, and when a regular scanning circuit fails, the second switching means isolates a failed regular scanning circuit from a corresponding video signal output circuit, and disconnects from a corresponding video signal output circuit each scanning circuit between the failed circuit and an unused backup scanning circuit, and the second switching means sequentially connects the disconnected scanning circuits to video signal output circuits previously corresponding to adjacent scanning circuits, and connects the backup scanning circuit to a video signal output circuit.

38. The matrix type image display apparatus as defined in claim 37, wherein said scanning signal line driving circuit is made of a thin film transistor of non-single crystalline silicon.

39. A matrix type image display apparatus as in claim 37 wherein:

when the regular video signal output circuit fails and is isolated, said first switching means connects an adjacent video signal output circuit to the data signal line previously corresponding to the failed circuit, and sequentially connects video signal output circuits to data signal lines previously corresponding to adjacent video signal output circuits, until the backup video signal output circuit is connected to a data signal line, and when the regular scanning circuit fails and is isolated, the second switching means connects an adjacent scanning circuit to the video signal output circuit previously corresponding to the failed scanning circuit, and sequentially connects scanning circuits to video signal output circuits previously corresponding to adjacent scanning circuits, until the backup scanning circuit is connected to a video signal output circuit.

40. A matrix type image display apparatus comprising:

a matrix of display pixels;

a data signal line driving circuit for supplying a video signal to each pixel; and a scanning signal line driving circuit for controlling a writing operation to each pixel, said scanning signal line driving circuit including:

at least one block having a scanning circuit for outputting a pulse signal in time series; and a scanning signal output circuit for outputting scanning signals sequentially to scanning signal lines in sync with said pulse signal, where each block includes:

regular scanning circuits and regular scanning signal output circuits both in an equal number of the scanning signal lines;

at least one backup scanning circuit and at least one backup scanning signal output circuit;

switching means for selectively connecting each scanning signal line to any of a plurality of adjacent scanning signal output circuits; and second switching means for connecting each scanning circuit to any of a plurality of adjacent scanning signal output circuits, and wherein said switching means and second switching means are controlled by control means composed of a plurality of fuses and a resistance element which are connected serially between two power source terminals.

41. A matrix type image display apparatus comprising:

an image display section having a matrix of pixels;

a data signal line driving circuit for supplying a video signal to each pixel; and a scanning signal line driving circuit for controlling a writing operation to each pixel, each of said data signal line and scanning signal line driving circuits includes a plurality of shift register series, where each of the shift register series has a different clock phase, and said shift register series and said pixels are formed on a substrate monolithically, at least one of said driving circuits including:

disconnecting means for disconnecting an input into and an output from each individual shift register in each shift register series, and connecting means for, when an individual shift register fails, electrically connecting an output stage and an output signal line of a failed shift register in one of said shift register series to an output signal line of a next shift register following said failed register in another shift register series and to an input shift register signal line connected to the output signal line of the failed shift register; the next shift register having an output timing that is later than an output timing of said failed shift resister, so that conductance is allowed between the output stage of said failed shift register and said output signal line of said next shift register, said connecting means being disconnected electrically from the driving circuit until an individual shift register fails.

42. The matrix type image display apparatus as defined in claim 41, wherein said failed shift register and said next shift register have consecutive output timings.

43. The matrix type image display apparatus as defined in claim 41, wherein two groups of shift register series each having a plurality of shift register series are placed so as to sandwich said image display section, said failed shift register and next shift register being provided in a same group of shift register series.

44. The matrix type image display apparatus as defined in claim 41 further comprising a logical circuit for receiving an output signal from a shift register and a clock signal which determines an output timing of said shift register, said logical circuit being provided between said shift register and an output stage thereof in an image display section side.

45. A matrix type image display apparatus comprising:

an image display section having a matrix of pixels;

a data signal line driving circuit for supplying a video signal to each pixel, and a scanning signal line driving circuit for controlling a writing operation to each pixel, each of said data signal line and scanning signal line driving circuits includes a plurality of shift register series, where each of the shift register series has a different clock phase, and said shift register series and said pixels are formed on a substrate monolithically, at least one of said driving circuits including:

disconnecting means for disconnecting an input into and an output from each shift register in each shift register series;

an auxiliary signal line for sending an alternative signal; and connecting means for, when an individual shift register fails, connecting an output stage of a failed shift register to said auxiliary signal line, so that conductance is allowed between the output stage of said failed shift register and said auxiliary signal line, said connecting means being isolated electrically from the driving circuit until an individual shift register fails.

46. The matrix type image display apparatus as defined in claim 45 further comprising switching means for switching a signal supplied to said auxiliary signal line.

47. A matrix type image display apparatus comprising:

an image display section having a matrix of pixels;

a data signal line driving circuit for supplying a video signal to each pixel; and a scanning signal line driving circuit for controlling a writing operation to each pixel, each of said data signal line and scanning line driving circuits include a plurality of shift register series, where each of the shift register series has a different clock phase, and said shift register series and said pixels are formed on a substrate monolithically, at least one of said driving circuits including:

connecting means for, when an individual shift register in a fairst stage in each shift register series fails, connecting an input stage and an output stage of a failed shift register said connecting means being isolated from the driving circuit until an individual shift register in the first stage in each shift register series fails, and phase changing means for changing a phase of a timing signal supplied to the output stage of said failed shift register from a phase of a timing signal supplied when an individual shift register in a first stage in each shift register operates without causing a failure.

48. A matrix type image display apparatus comprising:

an image display section having a matrix of pixels;

a data signal line driving circuit for supplying a video signal to each pixel; and a scanning signal line driving circuit for controlling a writing operation to each pixel, each of said data signal line and scanning signal line driving circuits being composed of a plurality of shift register series, where each of the shift register series has a different clock phase, and said shift register series and said pixels are formed on a substrate monolithically, at least one of said driving circuits including:

connecting means for, when an individual shift register in a first stage in each shift register series fails, connecting an input stage and an output stage of a failed shift register, said connecting means being isolated from the driving circuit until an individual shift register in the first stage in each shift register series fails; and changing means for, when an individual shift register in the first stare in each shift register series fails, changing a time series of a video signal inputted into shift register series including a failed shift register.

* * * * *